US012668744B2

(12) United States Patent
Nishimura et al.

(10) Patent No.: US 12,668,744 B2
(45) Date of Patent: Jun. 30, 2026

(54) OPTICAL FILM, OPTICAL LAMINATE, AND IMAGE DISPLAY DEVICE

(71) Applicant: FUJIFILM Corporation, Tokyo (JP)

(72) Inventors: Naoya Nishimura, Kanagawa (JP); Takashi Katou, Kanagawa (JP); Shuntaro Ibuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 791 days.

(21) Appl. No.: 18/060,878

(22) Filed: Dec. 1, 2022

(65) Prior Publication Data

US 2023/0120853 A1 Apr. 20, 2023

Related U.S. Application Data

(63) Continuation of application No. PCT/JP2021/020986, filed on Jun. 2, 2021.

(30) Foreign Application Priority Data

Jun. 5, 2020 (JP) ............................. JP2020-098535
Jun. 26, 2020 (JP) ............................. JP2020-110451
May 27, 2021 (JP) ............................. JP2021-089433

(51) Int. Cl.

| | |
|---|---|
| ***C09K 19/60*** | (2006.01) |
| ***C09K 19/38*** | (2006.01) |
| ***G02B 5/00*** | (2006.01) |
| ***G02B 5/22*** | (2006.01) |
| ***G02B 5/24*** | (2006.01) |
| ***G02B 5/30*** | (2006.01) |
| ***G02F 1/1335*** | (2006.01) |

(52) U.S. Cl.

CPC ........ *C09K 19/601* (2013.01); *C09K 19/3852* (2013.01); *G02B 5/003* (2013.01); *G02B 5/223* (2013.01); *G02B 5/24* (2013.01); *G02B 5/30* (2013.01); *G02B 5/3016* (2013.01); *G02F 1/133514* (2013.01); *G02F 1/133533* (2013.01)

(58) Field of Classification Search

CPC .. C09K 19/601; C09K 19/3852; G02B 5/003; G02B 5/24; G02B 5/30; G02B 5/3016; G02B 5/223; G02F 1/133514; G02F 1/133533

USPC .................................................. 428/1.3, 1.31

See application file for complete search history.

(56) References Cited

U.S. PATENT DOCUMENTS

| | | | | |
|---|---|---|---|---|
| 3,005,814 | A | 10/1961 | Schweizer et al. | |
| 2009/0153783 | A1* | 6/2009 | Umemoto .............. | G02B 27/28 359/487.01 |
| 2015/0378068 | A1 | 12/2015 | Hatanaka | |
| 2021/0403811 | A1 | 12/2021 | Kasai et al. | |
| 2023/0120853 | A1 | 4/2023 | Nishimura et al. | |

FOREIGN PATENT DOCUMENTS

| | | | | |
|---|---|---|---|---|
| JP | 2008-090288 | A | | 4/2008 |
| JP | 2009-145776 | A | | 7/2009 |
| JP | 2011-008210 | A | | 1/2011 |
| JP | 2012-068273 | A | | 4/2012 |
| JP | 2012-185508 | A | | 9/2012 |
| JP | 2015-102811 | A | | 6/2015 |
| JP | 2016-027387 | A | | 2/2016 |
| JP | 2018045175 | A | * | 3/2018 |
| JP | 2020-076920 | A | | 5/2020 |
| JP | 7573609 | B2 | | 10/2024 |

OTHER PUBLICATIONS

Office Action, issued by the Japanese Patent Office on Mar. 19, 2024, in connection with Japanese Patent Application No. 2022-528864.
Office Action, issued by the Japanese Patent Office on Nov. 7, 2023, in connection with Japanese Patent Application No. 2022-528864.
Office Action, issued by the Japanese Patent Office on Aug. 19, 2025, in connection with Japanese Patent Application No. 2024-092807.
Office Action, issued by the State Intellectual Property Office of China on Aug. 2, 2025, in connection with Chinese Patent Application No. 202180040049.8.
International Search Report issued in PCT/JP2021/020986 on Aug. 10, 2021.
Written Opinion issued in PCT/JP2021/020986 on Aug. 10, 2021.
International Preliminary Report on Patentability completed by WIPO on Dec. 6, 2022 in connection with International Patent Application No. PCT/JP2021/020986.

* cited by examiner

*Primary Examiner* — Ruiyun Zhang
(74) *Attorney, Agent, or Firm* — Edwards Neils LLC; Jean C. Edwards, Esq.

(57) ABSTRACT

Provided is an optical film capable of neutralizing both the tint as viewed in a transmittance central axis direction and the tint as viewed in a direction inclined from a transmittance central axis, and an optical laminate and an image display device formed of this optical film. The optical film includes a light absorption anisotropic layer in which an angle θ between a transmittance central axis and a normal direction of a layer surface is in a range of 0° to 45°, and a tint adjusting layer containing at least one organic coloring agent compound.

19 Claims, No Drawings

OPTICAL FILM, OPTICAL LAMINATE, AND IMAGE DISPLAY DEVICE

CROSS-REFERENCE TO RELATED APPLICATIONS

This application is a Continuation of PCT International Application No. PCT/JP2021/020986 filed on Jun. 2, 2021, which was published under PCT Article 21 (2) in Japanese, and which claims priority under 35 U.S.C. § 119 (a) to Japanese Patent Application No. 2020-110451 filed on Jun. 26, 2020, Japanese Patent Application No. 2020-098535 filed on Jun. 5, 2020, and Japanese Patent Application No. 2021-089433 filed on May 27, 2021. The above applications are hereby expressly incorporated by reference, in their entirety, into the present application.

BACKGROUND OF THE INVENTION

1. Field of the Invention

The present invention relates to an optical film, an optical laminate, and an image display device.

2. Description of the Related Art

In order to prevent peeping into a liquid crystal display device and control the viewing angle, a technique of using a light absorption anisotropic layer having an absorption axis in the thickness direction together is known. For example, JP2009-145776A suggests a polarizer related to a viewing angle control system formed of a film containing a dichroic substance and having an angle of 0° to 450 between an absorption axis and a normal line of a film surface.

SUMMARY OF THE INVENTION

As a result of examination on an optical film having a light absorption anisotropic layer that contains a dichroic substance, the present inventors found that processing suitability of the optical film is excellent because the film thickness thereof can be reduced, but since the aligning properties of the dichroic substance in a visible region are not uniform, the tint of the optical film as viewed in a transmittance central axis direction of the light absorption anisotropic layer and the tint thereof as viewed in a direction inclined from the transmittance central axis are difficult to control in a neutral manner.

Therefore, an object of the present invention is to provide an optical film capable of neutralizing both the tint as viewed in a transmittance central axis direction and the tint as viewed in a direction inclined from a transmittance central axis, and an optical laminate and an image display device formed of this optical film.

As a result of intensive examination conducted by the present inventors in order to achieve the above-described object, it was found that an optical film having a predetermined light absorption anisotropic layer and a tint adjusting layer that contains at least one kind of organic coloring agent compound is capable of neutralizing both the tint as viewed in the transmittance central axis direction and the tint as viewed in a direction inclined from the transmittance central axis, thereby completing the present invention.

That is, the present inventors found that the above-described object can be achieved by employing the following configurations.

[1] An optical film comprising: a light absorption anisotropic layer in which an angle θ between a transmittance central axis and a normal direction of a layer surface is in a range of 0° to 45°; and a tint adjusting layer containing at least one organic coloring agent compound.

[2] The optical film according to [1], in which the light absorption anisotropic layer contains a liquid crystal compound and at least one dichroic coloring agent compound.

[3] The optical film according to [1] or [2], in which the light absorption anisotropic layer satisfies both Expressions (1) and (2).

[4] The optical film according to [2] or [3], in which at least one dichroic coloring agent compound contained in the light absorption anisotropic layer is represented by Formula (3).

[5] The optical film according to any one of [1] to [4], in which the tint adjusting layer satisfies any one of requirements 1 to 3 described below.

[6] The optical film according to any one of [1] to [5], in which an absorption peak wavelength of the organic coloring agent compound contained in the tint adjusting layer is in a range of 500 to 650 nm.

[7] The optical film according to any one of [1] to [6], in which the organic coloring agent compound contained in the tint adjusting layer has at least one structure of a benzene ring or a heterocyclic ring in a molecule.

[8] The optical film according to any one of [1] to [7], in which the organic coloring agent compound contained in the tint adjusting layer has an anthraquinone structure.

[9] The optical film according to any one of [1] to [8], in which Expression (7) is satisfied.

[10] The optical film according to any one of [1] to [9], in which a transmittance of light having a wavelength of 550 nm in a direction along the transmittance central axis is 65% or greater.

[11] An optical laminate comprising: the optical film according to any one of [1] to [10]; and a polarizer layer in which a dichroic substance is aligned horizontally to a film surface.

[12] An optical laminate comprising: the optical film according to any one of [1] to [10]; and an uneven layer having an arithmetic average roughness Ra of 35 to 125 nm.

[13] An image display device comprising: the optical film according to any one of [1] to [10]; or the optical laminate according to [11] or [12].

According to the present invention, it is possible to provide an optical film capable of neutralizing both the tint as viewed in a transmittance central axis direction and the tint as viewed in a direction inclined from a transmittance central axis, and an optical laminate and an image display device formed of this optical film.

DESCRIPTION OF THE PREFERRED EMBODIMENTS

Hereinafter, the present invention will be described in detail.

The description of constituent elements described below may be made based on typical embodiments of the present invention, but the present invention is not limited to such embodiments.

In the present specification, a numerical range shown using "to" indicates a range including numerical values described before and after "to" as a lower limit and an upper limit.

In the present specification, parallel and orthogonal do not indicate parallel and orthogonal in a strict sense, but respectively indicate a range of parallel ±5° and a range of orthogonal 5°.

In the present specification, visible light denotes an electromagnetic wave having a wavelength of 380 to 800 nm unless otherwise specified.

In the present specification, the room temperature denotes a temperature range of 20° C. to 28° C. unless otherwise specified.

Further, in the present specification, the concepts of the liquid crystal composition and the liquid crystal compound also include those that no longer exhibit liquid crystallinity due to curing or the like.

Further, in the present specification, substances corresponding to respective components may be used alone or in combination of two or more kinds thereof. Here, in a case where two or more kinds of substances corresponding to respective components are used in combination, the content of the components indicates the total content of the combined substances unless otherwise specified.

In the present specification, "(meth)acrylate" is a notation representing "acrylate" or "methacrylate", "(meth)acryl" is a notation representing "acryl" or "methacryl", and "(meth) acryloyl" is a notation representing "acryloyl" or "methacryloyl".

The substituent W in the present specification will be described.

Examples of the substituent W include an alkyl group (preferably an alkyl group having 1 to 20 carbon atoms, more preferably an alkyl group having 1 to 12 carbon atoms, and particularly preferably an alkyl group having 1 to 8 carbon atoms, and examples thereof a methyl group, an ethyl group, an isopropyl group, a tert-butyl group, an n-octyl group, an n-decyl group, an n-hexadecyl group, a cyclopropyl group, a cyclopentyl group, and a cyclohexyl group), an alkenyl group (preferably an alkenyl group having 2 to 20 carbon atoms, more preferably an alkenyl group having 2 to 12 carbon atoms, and particularly preferably an alkenyl group having 2 to 8 carbon atoms, and examples thereof include a vinyl group, an aryl group, a 2-butenyl group, and a 3-pentenyl group), an alkynyl group (preferably an alkynyl group having 2 to 20 carbon atoms, more preferably an alkynyl group 2 to 12 carbon atoms, and particularly preferably an alkynyl group having 2 to 8 carbon atoms, and examples thereof include a propargyl group and a 3-pentynyl group), an aryl group (preferably an aryl group having 6 to 30 carbon atoms, more preferably an aryl group having 6 to 20 carbon atoms, and particularly preferably an aryl group having 6 to 12 carbon atoms, and examples thereof include a phenyl group, a 2,6-diethylphenyl group, a 3,5-ditrifluoromethylphenyl group, a styryl group, a naphthyl group, and a biphenyl group), a substituted or unsubstituted amino group (preferably an amino group having 0 to 20 carbon atoms, more preferably an amino group having 0 to 10 carbon atoms, and particularly preferably an amino group having 0 to 6 carbon atoms, and examples thereof include an unsubstituted amino group, a methylamino group, a dimethylamino group, a diethylamino group, and an anilino group), an alkoxy group (preferably an alkoxy group having 1 to 20 carbon atoms and more preferably an alkoxy group having 1 to 15 carbon atoms, and examples thereof include a methoxy group, an ethoxy group, and a butoxy group), an oxycarbonyl group (preferably an oxycarbonyl group having 2 to 20 carbon atoms, more preferably an oxycarbonyl group having 2 to 15 carbon atoms, and particularly preferably an oxycarbonyl group having 2 to 10 carbon atoms, and examples thereof include a methoxycarbonyl group, an ethoxycarbonyl group, and a phenoxycarbonyl group), an acyloxy group (preferably an acyloxy group having 2 to 20 carbon atoms, more preferably an acyloxy group having 2 to 10 carbon atoms, and particularly preferably an acyloxy group having 2 to 6 carbon atoms, and examples thereof include an acetoxy group, a benzoyloxy group, an acryloyl group, and a methacryloyl group), an acylamino group (preferably an acylamino group having 2 to 20 carbon atoms, more preferably an acylamino group having 2 to 10 carbon atoms, and particularly preferably an acylamino group having 2 to 6 carbon atoms, and examples thereof include an acetylamino group and a benzoylamino group), an alkoxycarbonylamino group (preferably an alkoxycarbonylamino group having 2 to 20 carbon atoms, more preferably an alkoxycarbonylamino group having 2 to 10 carbon atoms, and particularly preferably an alkoxycarbonylamino group having 2 to 6 carbon atoms, and examples thereof include a methoxycarbonylamino group), an aryloxycarbonylamino group (preferably an aryloxycarbonylamino group having 7 to 20 carbon atoms, more preferably an aryloxycarbonylamino group having 7 to 16 carbon atoms, and particularly preferably an aryloxycarbonylamino group having 7 to 12 carbon atoms, and examples thereof include a phenyloxycarbonylamino group), a sulfonylamino group (preferably a sulfonylamino group having 1 to 20 carbon atoms, more preferably a sulfonylamino group having 1 to 10 carbon atoms, and particularly preferably a sulfonylamino group having 1 to 6 carbon atoms, and examples thereof include a methanesulfonylamino group and a benzenesulfonylamino group), a sulfamoyl group (preferably a sulfamoyl group having 0 to 20 carbon atoms, more preferably a sulfamoyl group having 0 to 10 carbon atoms, and particularly preferably a sulfamoyl group having 0 to 6 carbon atoms, and examples thereof include an substituted sulfamoyl group, a methylsulfamoyl group, a dimethylsulfamoyl group, and a phenylsulfamoyl group), a carbamoyl group (preferably a carbamoyl group having 1 to 20 carbon atoms, more preferably a carbamoyl group having 1 to 10 carbon atoms, and particularly preferably a carbamoyl group having 1 to 6 carbon atoms, and examples thereof include an unsubstituted carbamoyl group, a methylcarbamoyl group, a diethylcarbamoyl group, and a phenylcarbamoyl group), an alkylthio group (preferably an alkylthio group having 1 to 20 carbon atoms, more preferably an alkylthio group having 1 to 10 carbon atoms, and particularly preferably an alkylthio group having 1 to 6 carbon atoms, and examples thereof include a methylthio group and an ethylthio group), an arylthio group (preferably an arylthio group having 6 to 20 carbon atoms, more preferably an arylthio group having 6 to 16 carbon atoms, and particularly preferably an arylthio group having 6 to 12 carbon atoms, and examples thereof include a phenylthio group), a sulfonyl group (preferably a sulfonyl group having 1 to 20 carbon atoms, more preferably a sulfonyl group having 1 to 10 carbon atoms, and particularly preferably a sulfonyl group having 1 to 6 carbon atoms, and examples thereof include a mesyl group and a tosyl group), a sulfinyl group (preferably a sulfinyl group having 1 to 20 carbon atoms, more preferably a sulfinyl group having 1 to 10 carbon atoms, and particularly preferably a sulfinyl group having 1 to 6 carbon atoms, and examples thereof include a methanesulfinyl group and a benzenesulfinyl group), a ureido group (preferably a ureido group having 1 to 20 carbon atoms, more preferably a ureido group having 1 to 10 carbon atoms, and particularly preferably a ureido group having 1 to 6 carbon atoms, and examples thereof include an unsubstituted ureido group, a methylureido group, and a phenylureido group), a phosphoric acid amide group (preferably a phosphoric acid amide group having 1 to 20 carbon atoms, more preferably a phosphoric acid amide group having 1 to 10 carbon atoms, and particularly preferably a phosphoric acid amide group having 1 to 6 carbon atoms, and examples thereof include a diethylphosphoric acid amide group and a phenylphosphoric acid amide group), a hydroxy group, a mercapto group, a halogen atom (such as a fluorine atom, a chlorine atom, a bromine atom, and an iodine atom), a cyano group, a nitro group, a hydroxamic acid group, a sulfino group, a hydrazino group, an imino group, an azo group, a heterocyclic group (preferably a heterocyclic group having 1 to 30 carbon atoms and more preferably a heterocyclic group having 1 to 12 carbon atoms, and examples thereof include a heterocyclic group having a heteroatom such as a nitrogen atom, an oxygen atom, or a sulfur atom, and examples of the heterocyclic group having a heteroatom include an epoxy group, an oxetanyl group, an imidazolyl group, a pyridyl group, a quinolyl group, a furyl group, a piperidyl group, a morpholino group, a maleimide group, a benzoxazolyl group, a benzimidazolyl group, and a benzothiazolyl group), a silyl group (preferably a silyl group having 3 to 40 carbon atoms, more preferably a silyl group having 3 to 30 carbon atoms, and particularly preferably a silyl group having 3 to 24 carbon atoms, and examples thereof include a trimethylsilyl group and a triphenylsilyl group), a carboxy group, a sulfonic acid group, and a phosphoric acid group.

Hereinafter, an optical film, an optical laminate, and an image display device will be described.

In the description below, a state in which "both the tint as viewed in a transmittance central axis direction and the tint as viewed in a direction inclined from the transmittance central axis are neutral" is also defined as "property of suppressing a wide-angle tint is excellent".

<Optical Film>

An optical film according to the embodiment of the present invention includes a light absorption anisotropic layer in which an angle θ between a transmittance central axis and a normal direction of a layer surface is in a range of 0° to 45°, and a tint adjusting layer containing at least one organic coloring agent compound.

Here, the mechanism that the optical film according to the embodiment of the present invention is capable of neutralizing both the tint as viewed in a transmittance central axis direction and the tint as viewed in a direction inclined from the transmittance central axis is not necessarily clear, but the present inventors assume as follows.

The reason why both the tints as viewed in the above-described two directions in the light absorption anisotropic layer of the optical film are not neutral is assumed to be that a tint occurs due to the aligning properties of the substance contained in the light absorption anisotropic layer. Therefore, it is considered that the tint can be reduced by a tint adjusting layer containing at least one organic coloring agent compound to neutralize both the tints as viewed in the two directions.

The optical film according to the embodiment of the present invention may include a transparent base material film, an alignment film, a barrier layer, a pressure sensitive adhesive layer, and an adhesive layer in addition to the light absorption anisotropic layer and the tint adjusting layer.

Hereinafter, the light absorption anisotropic layer, the tint adjusting layer, the transparent base material film, the alignment film, and the barrier layer will be described in detail.

Further, a method of producing the optical film will also be described in detail below. The pressure sensitive adhesive layer and the adhesive layer will be described in the method of producing the optical film.

[Light Absorption Anisotropic Layer]

In the light absorption anisotropic layer of the optical film according to the embodiment of the present invention, the angle between the transmittance central axis and the normal direction of the layer surface is in a range of 0° to 45°.

Here, the transmittance central axis is the direction in which the highest transmittance is exhibited in a case where the transmittance is measured by changing the inclination angle (polar angle) and the inclination direction (azimuthal angle) with respect to the normal direction of the surface of the light absorption anisotropic layer. Specifically, the Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the normal direction on the surface of the light absorption anisotropic layer is changed for every 5° from 0° to 900 in the surface (the plane that has the transmittance central axis and is orthogonal to the layer surface) having the normal direction of the light absorption anisotropic layer along the azimuthal angle thereof, and the transmittance of the light absorption anisotropic layer is derived. As a result, the direction at which the highest transmittance is exhibited is defined as the transmittance central axis.

By adjusting the angle between the transmittance central axis of the light absorption anisotropic layer and the normal direction of the layer surface, the viewing angle center of the liquid crystal display device can be deviated from the front not only in the longitudinal and horizontal directions but also in an oblique direction.

In order to control the transmittance central axis of the light absorption anisotropic layer, an aspect of aligning a dichroic substance is preferable, and an aspect of aligning a dichroic substance using alignment of a liquid crystal compound is more preferable. Therefore, it is preferable that the light absorption anisotropic layer contains a liquid crystal compound and a dichroic substance.

Examples of such a light absorption anisotropic layer include a light absorption anisotropic layer in which at least one kind of organic dichroic coloring agent is aligned perpendicular to the in-plane.

It is preferable that the light absorption anisotropic layer is produced by using a composition for forming a light absorption anisotropic layer described below. It is preferable that the composition for forming a light absorption anisotropic layer contains a liquid crystal compound and a dichroic substance.

The composition for forming a light absorption anisotropic layer and a forming method using the composition will be described in detail below.

(Liquid Crystal Compound)

It is preferable that the light absorption anisotropic layer of the optical film according to the embodiment of the present invention contains a liquid crystal compound. In a case where the light absorption anisotropic layer contains a liquid crystal compound during formation of the light absorption anisotropic layer, the alignment degree of the dichroic substance in the light absorption anisotropic layer can be increased while precipitation of the dichroic substance is suppressed.

The liquid crystal compound denotes a liquid crystal compound that does not exhibit dichroic properties with respect to at least visible light.

As the liquid crystal compound, any of a low-molecular-weight liquid crystal compound or a polymer liquid crystal compound can also be used, and it is preferable that both are used in combination. Here, the "low-molecular-weight liquid crystal compound" indicates a liquid crystal compound having no repeating units in the chemical structure. Here, the "polymer liquid crystal compound" is a liquid crystal compound having a repeating unit in the chemical structure.

—Low-Molecular-Weight Liquid Crystal Compound—

Examples of the low-molecular-weight liquid crystal compound include liquid crystal compounds described in JP2013-228706A.

—Polymer Liquid Crystal Compound—

Examples of the polymer liquid crystal compound include thermotropic liquid crystal polymers described in JP2011-237513A. Further, from the viewpoint of enhancing the strength (particularly, the bending resistance) of the light absorption anisotropic film, it is preferable that the polymer liquid crystal compound has a repeating unit containing a crosslinkable group at the terminal. Examples of the cross-linkable group include the polymerizable groups described in paragraphs [0040] to [0050] of JP2010-244038A. Among these, from the viewpoint of improving the reactivity and the synthetic suitability, an acryloyl group, a methacryloyl group, an epoxy group, an oxetanyl group, and a styryl group are preferable, and an acryloyl group and a methacryloyl group are more preferable.

In a case where the light absorption anisotropic layer according to the embodiment of the present invention contains a polymer liquid crystal compound, it is preferable that the polymer liquid crystal compound forms a nematic liquid crystal phase.

The temperature range where the nematic liquid crystal phase is exhibited is preferably room temperature or higher and 450° C. or lower and preferably in a range of 50° C. to 400° C. from the viewpoints of handleability and/or manufacturing suitability.

The content of the liquid crystal compound is preferably in a range of 25 to 2000 parts by mass, more preferably in a range of 100 to 1300 parts by mass, and still more preferably in a range of 200 to 900 parts by mass with respect to 100 parts by mass of the content of the dichroic substance. In a case where the content of the liquid crystal compound is in the above-described ranges, the alignment degree of the dichroic substance of the light absorption anisotropic layer is further improved.

The light absorption anisotropic layer may contain only one or two or more kinds of liquid crystal compounds. In a case where the light absorption anisotropic layer contains two or more kinds of liquid crystal compounds, the content of the liquid crystal compounds denotes the total content of the liquid crystal compounds.

From the viewpoint that the alignment degree of the dichroic substance in the light absorption anisotropic layer is more excellent, it is preferable that the liquid crystal compound is a polymer liquid crystal compound having a repeating unit represented by Formula (1L) (hereinafter, also referred to as "repeating unit (1L)").

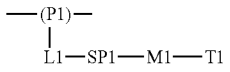

(1L)

In Formula (1L), P1 represents the main chain of the repeating unit, L1 represents a single bond or a divalent linking group, SP1 represents a spacer group, M1 represents a mesogen group, and T1 represents a terminal group.

Specific examples of the main chain of the repeating unit represented by P1 include groups represented by Formulae (P1-A) to (P1-D). Among these, from the viewpoints of diversity and handleability of a monomer serving as a raw material, a group represented by Formula (P1-A) is preferable.

(P1-A)

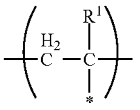

(P1-B)

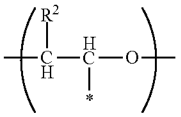

(P1-C)

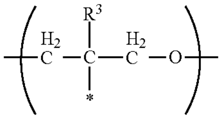

(P1-D)

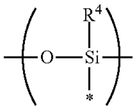

In Formulae (P1-A) to (P1-D), "*" represents a bonding position with respect to L1 in Formula (1L). In Formulae (P1-A) to (P1-D), $R^1$, $R^2$, $R^3$, and $R^4$ each independently represent a hydrogen atom, a halogen atom, an alkyl group having 1 to 10 carbon atoms, or an alkoxy group having 1 to 10 carbon atoms. The alkyl group may be a linear or branched alkyl group or an alkyl group having a cyclic structure (cycloalkyl group). Further, the number of carbon atoms of the alkyl group is preferably in a range of 1 to 5.

It is preferable that the group represented by Formula (P1-A) is a unit of a partial structure of poly(meth)acrylic acid ester obtained by polymerization of (meth)acrylic acid ester.

It is preferable that the group represented by Formula (P1-B) is an ethylene glycol unit formed by ring-opening polymerization of an epoxy group of a compound containing the epoxy group.

It is preferable that the group represented by Formula (P1-C) is a propylene glycol unit formed by ring-opening polymerization of an oxetane group of a compound containing the oxetane group.

It is preferable that the group represented by Formula (P1-D) is a siloxane unit of a polysiloxane obtained by polycondensation of a compound containing at least one of an alkoxysilyl group or a silanol group. Here, examples of the compound containing at least one of an alkoxysilyl group or a silanol group include a compound containing a group represented by Formula $SiR^4(OR^5)_2$—. In the formula, $R^4$ has the same definition as that for $R^4$ in (P1-D), and a plurality of $R^5$'s each independently represent a hydrogen atom or an alkyl group having 1 to 10 carbon atoms.

$L^1$ represents a single bond or a divalent linking group.

Examples of the divalent linking group represented by L1 include —C(O)O—, —OC(O)—, —O—, —S—, —C(O)$NR_3$—, —$NR_3$C(O)—, —$SO_2$—, and —$NR_3R^4$—. In the formulae, $R^3$ and $R^4$ each independently represent a hydrogen atom or an alkyl group having 1 to 6 carbon atoms which may have a substituent W.

In a case where P1 represents a group represented by Formula (P1-A), it is preferable that L1 represents a group represented by —C(O)O— from the viewpoint that the alignment degree of the dichroic substance in the light absorption anisotropic layer is more excellent.

In a case where P1 represents a group represented by any of Formulae (P1-B) to (P1-D), it is preferable that L1 represents a single bond from the viewpoint that the alignment degree of the dichroic substance in the light absorption anisotropic layer is more excellent.

From the viewpoints of easily exhibiting liquid crystallinity and the availability of raw materials, it is preferable that the spacer group represented by SP1 has at least one structure selected from the group consisting of an oxyethylene structure, an oxypropylene structure, a polysiloxane structure, and an alkylene fluoride structure.

Here, as the oxyethylene structure represented by SP1, a group represented by $*-(CH_2-CH_2O)_{n1}-*$ is preferable. In the formula, n1 represents an integer of 1 to 20, and "*" represents a bonding position with respect to L1 or M1 in Formula (1L). From the viewpoint that the alignment degree of the dichroic substance in the light absorption anisotropic layer is more excellent, n1 represents preferably an integer of 2 to 10, more preferably an integer of 2 to 4, and most preferably 3.

Further, from the viewpoint that the alignment degree of the dichroic substance in the light absorption anisotropic layer is more excellent, a group represented by $*-(CH(CH_3)-CH_2O)_{n2}-*$ is preferable as the oxypropylene structure represented by SP1. In the formula, n2 represents an integer of 1 to 3, and "*" represents a bonding position with respect to L1 or M1.

Further, from the viewpoint that the alignment degree of the dichroic substance in the light absorption anisotropic layer is more excellent, a group represented by $*-(Si(CH_3)_2-O)_{n3}-*$ is preferable as the polysiloxane structure represented by SP1. In the formula, n3 represents an integer of 6 to 10, and "*" represents a bonding position with respect to L1 or M1.

Further, from the viewpoint that the alignment degree of the dichroic substance in the light absorption anisotropic layer is more excellent, a group represented by $*-(CF_2-CF_2)_{n4}-*$ is preferable as the alkylene fluoride structure represented by SP1. In the formula, n4 represents an integer of 6 to 10, and "*" represents a bonding position with respect to L1 or M1.

The mesogen group represented by M1 is a group showing a main skeleton of a liquid crystal molecule that contributes to liquid crystal formation. A liquid crystal molecule exhibits liquid crystallinity which is in an intermediate state (mesophase) between a crystal state and an isotropic liquid state. The mesogen group is not particularly limited and for example, particularly description on pages 7 to 16 of "Flussige Kristalle in Tabellen II" (VEB Deutsche Verlag fur Grundstoff Industrie, Leipzig, 1984) and particularly the description in Chapter 3 of "Liquid Crystal Handbook" (Maruzen, 2000) edited by Liquid Crystals Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint that the alignment degree of the dichroic substance in the light absorption anisotropic layer is more excellent, the mesogen group contains preferably an aromatic hydrocarbon group, more preferably 2 to 4 aromatic hydrocarbon groups, and still more preferably 3 aromatic hydrocarbon groups.

From the viewpoints of exhibiting the liquid crystallinity, adjusting the liquid crystal phase transition temperature, and the availability of raw materials and synthetic suitability and from the viewpoint that the alignment degree of the dichroic substance in the light absorption anisotropic layer is more excellent, as the mesogen group, a group represented by Formula (M1-A) or Formula (M1-B) is preferable, and a group represented by Formula (M1-B) is more preferable.

$$*-(A1)_{a1}-* \quad \text{(M1-A)}$$

$$*-(A2-LA1)_{a2}-A3-* \quad \text{(M1-B)}$$

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent W.

It is preferable that the divalent group represented by A1 is a 4- to 6-membered ring. Further, the divalent group represented by A1 may be a monocycle or a fused ring.

Further, "*" represents a bonding position with respect to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoints of design diversity of a mesogenic skeleton and/or the availability of raw materials, a phenylene group or a naphthylene group is preferable, and a phenylene group is more preferable.

The divalent heterocyclic group represented by A1 may be any of aromatic or non-aromatic, but a divalent aromatic heterocyclic group is preferable as the divalent heterocyclic group from the viewpoint that the alignment degree of the dichroic substance in the light absorption anisotropic layer is more excellent.

The atoms other than carbon constituting the divalent aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or greater, a plurality of A1's may be the same as or different from each other.

In Formula (M1-B), A2 and A3 each independently represent a divalent group selected from the group consisting of an aromatic hydrocarbon group, a heterocyclic group, and an alicyclic group. Specific examples and preferred embodiments of A2 and A3 are the same as those for A1 in Formula (M1-A), and thus description thereof will not be repeated.

In Formula (M1-B), a2 represents an integer of 1 to 10. In a case where a2 represents 2 or greater, a plurality of A2's may be the same as or different from each other, a plurality of A3's may be the same as or different from each other, and a plurality of LA1's may be the same as or different from each other. From the viewpoint that the alignment degree of the dichroic substance in the light absorption anisotropic layer is more excellent, a2 represents preferably an integer of 2 or greater and more preferably 2.

In Formula (M1-B), in a case where a2 represents 1, LA1 represents a divalent linking group. In a case where a2 represents 2 or greater, a plurality of LA1's each independently represent a single bond or a divalent linking group, and at least one of the plurality of LA1's is a divalent linking group. In a case where a2 represents 2, from the viewpoint that the alignment degree of the dichroic substance in the light absorption anisotropic layer is more excellent, it is preferable that one of the two LA1's represents a divalent linking group and the other represents a single bond.

In Formula (M1-B), examples of the divalent linking group represented by LA1 include —O—, $-(CH_2)_g-$, $-(CF_2)_g-$, $-Si(CH_3)_2-$, $-(Si(CH_3)_2O)_g-$, $-(OSi(CH_3)_2)_g-$ (here, g represents an integer of 1 to 10), —N(Z)—, —C(Z)=C(Z')—, —C(Z)=N—, —N=C(Z)—, $-C(Z)_2-C(Z')_2-$, —C(O)—, —OC(O)—, —C(O)O—, —O—C(O)O—, —N(Z)C(O)—, —C(O)N(Z)—, —C(Z)=C(Z')—C(O)O—, —O—C(O)—C(Z)=C(Z')—, —C(Z)=N—, —N=C(Z)—, —C(Z)=C(Z')—C(O)N(Z")—, —N(Z")—C(O)—C(Z)=C(Z')—, —C(Z)=C(Z')—C(O)—S—, —S—C(O)—C(Z)=C(Z')—, —C(Z)=N—N=C(Z')— (here, Z, Z', and Z" each independently represent a hydrogen atom, an alkyl group having 1 to 4 carbon atoms, a cycloalkyl group, an aryl group, a cyano group, or a halogen atom), —C≡C—, —N=N—, —S—, —S(O)—, —S(O)(O)—, —(O)S(O)O—, —O(O)S(O)O—, —SC(O)—, and —C(O)S—. Among these, from the viewpoint that the alignment degree of the dichroic substance in the light absorption anisotropic layer is more excellent, —C(O)O— is preferable. LA1 may represent a group obtained by combining two or more of these groups.

Specific examples of M1 include the following structures. In the following specific examples, "Ac" represents an acetyl group.

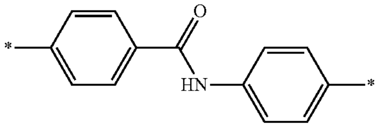
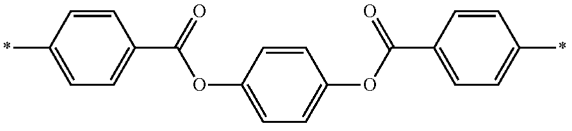
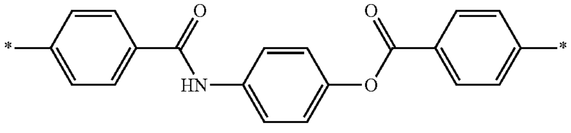
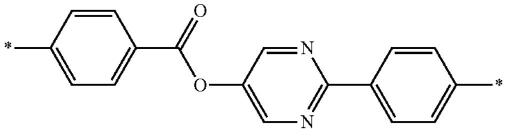
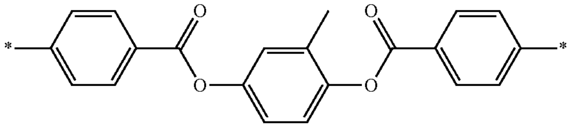
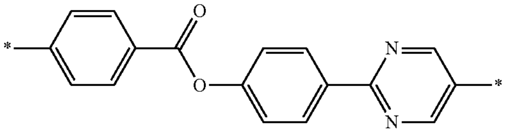
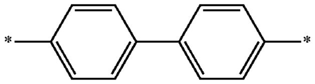
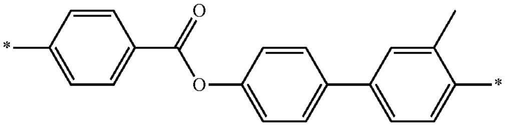
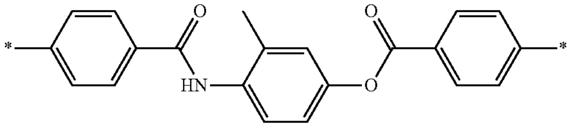
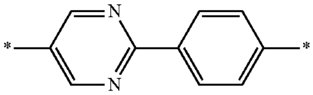
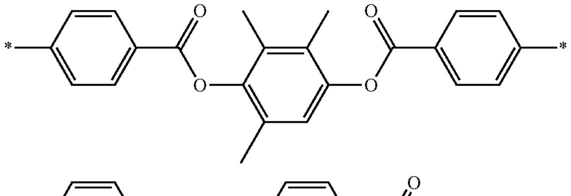
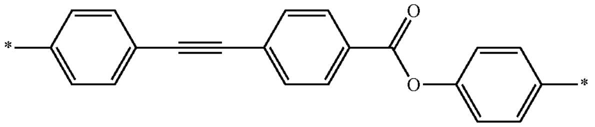
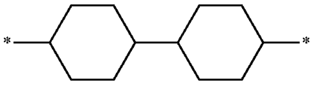
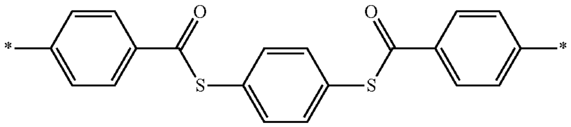

-continued
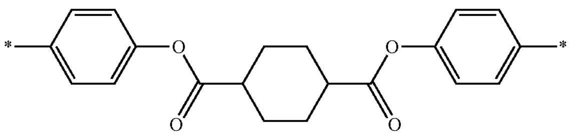
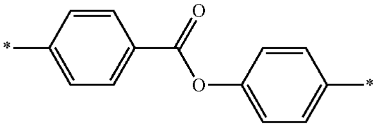
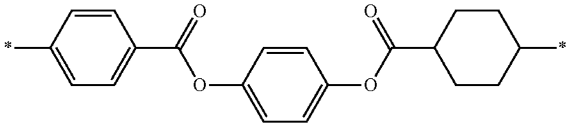
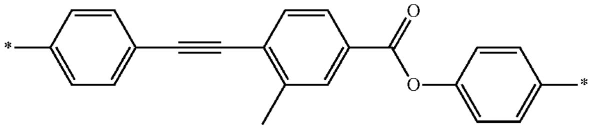
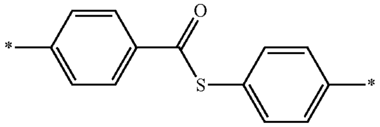
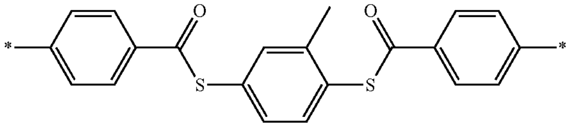
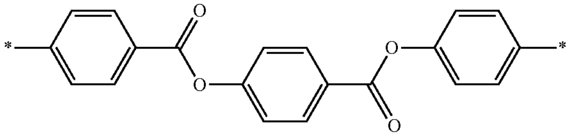
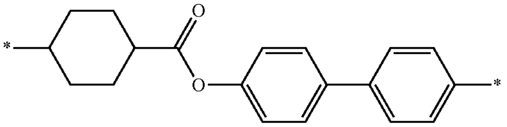
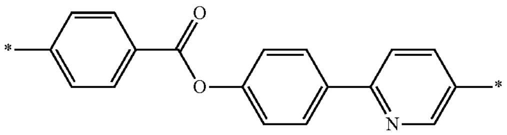
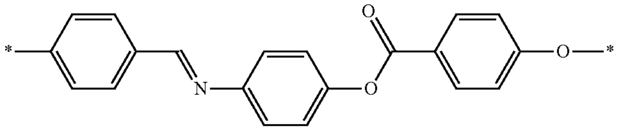
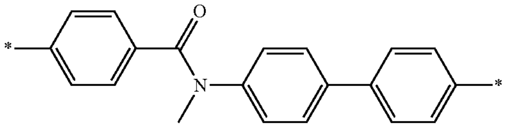
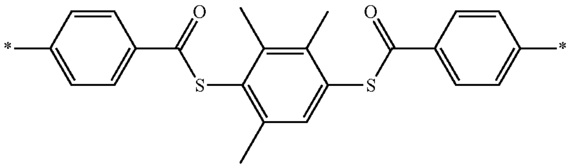
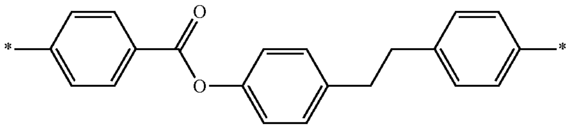
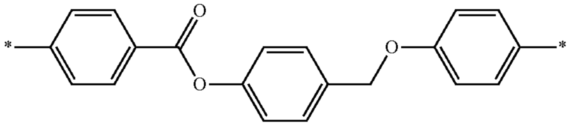
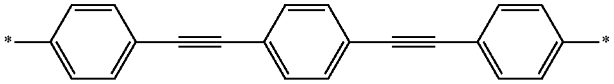
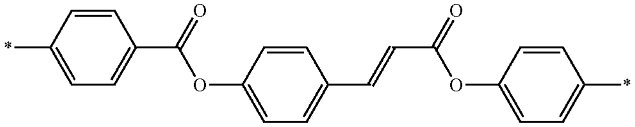
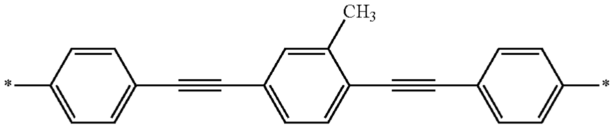
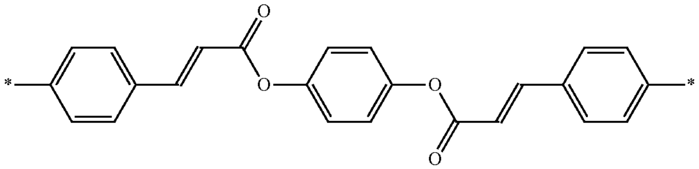

-continued
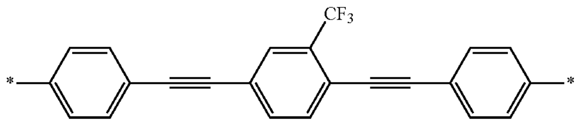
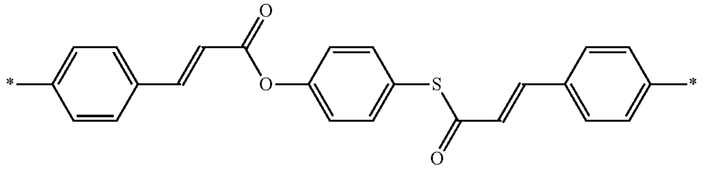
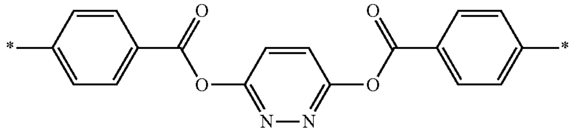
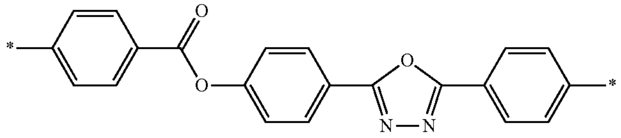
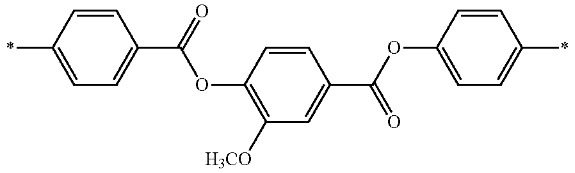
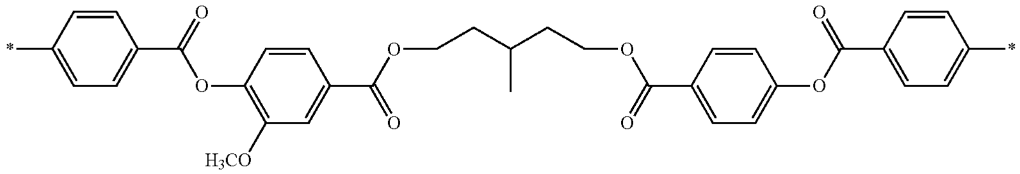
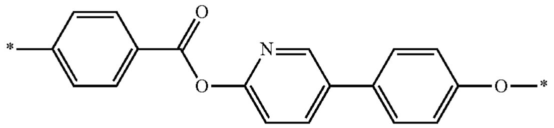
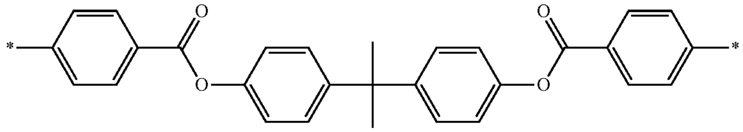
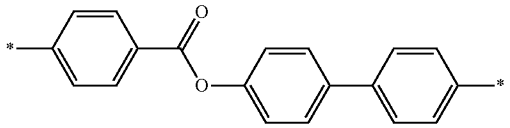
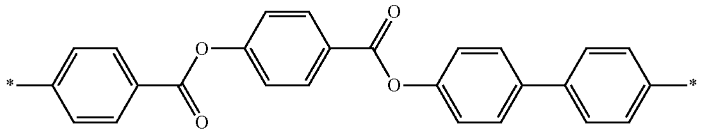
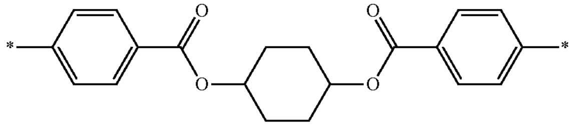
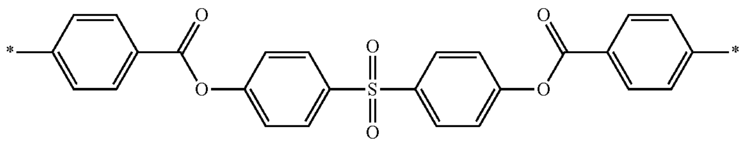

-continued
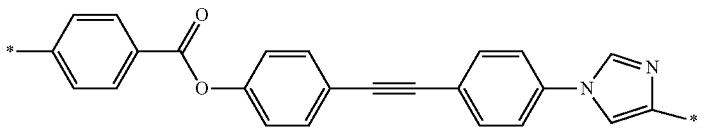
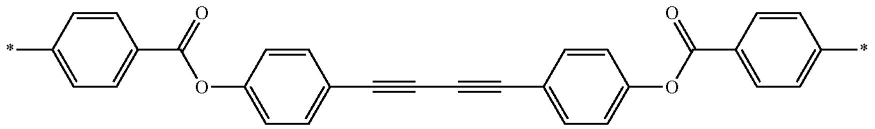
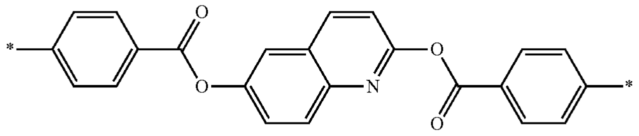
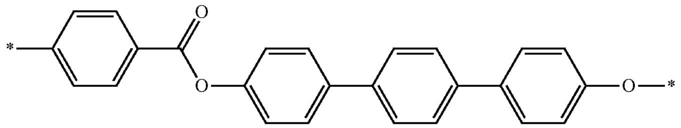
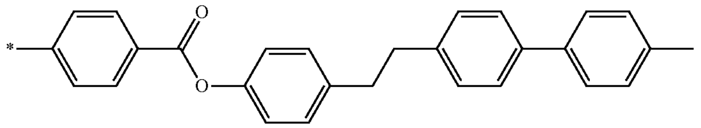
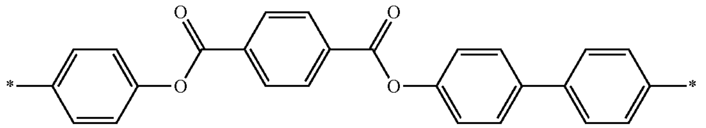
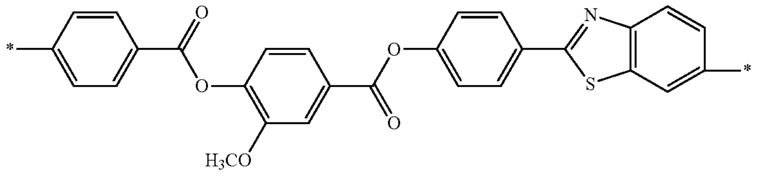
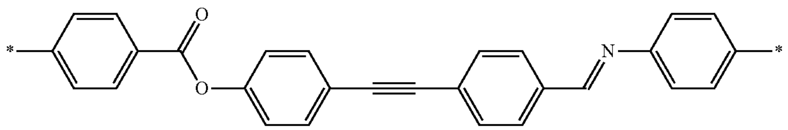
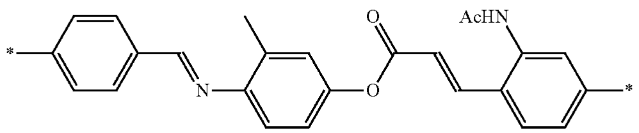
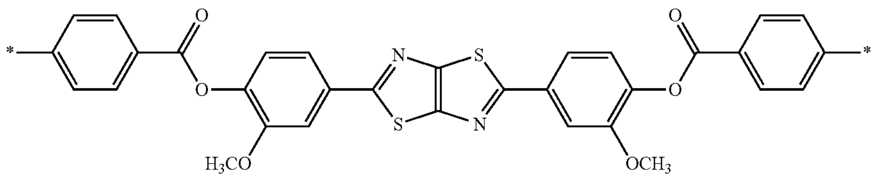
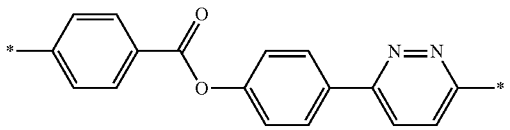
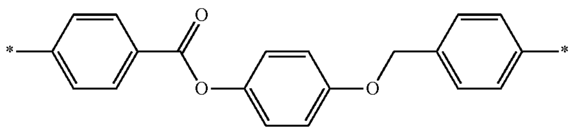
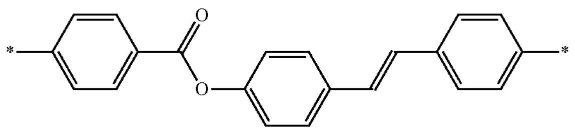

-continued

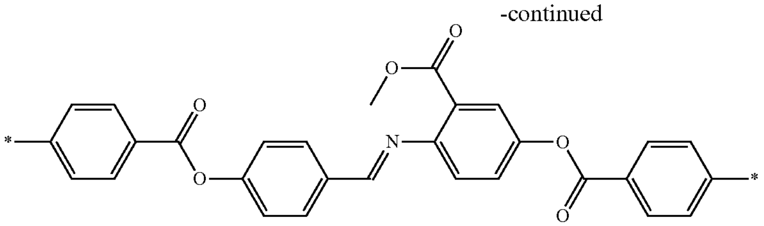

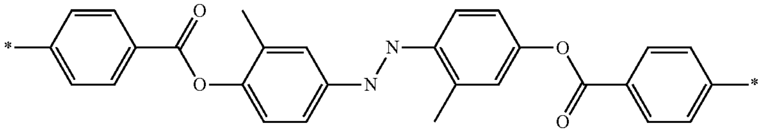

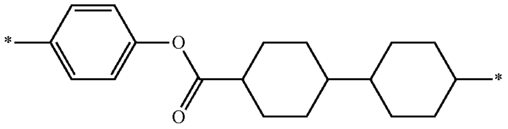

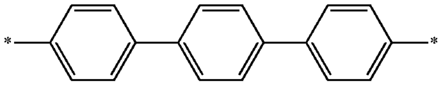

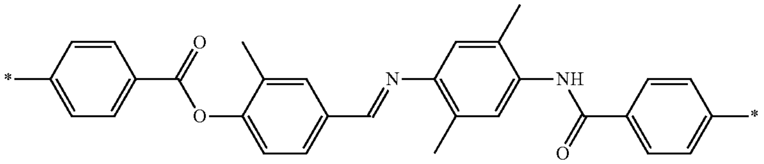

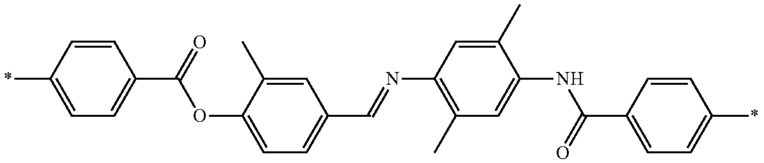

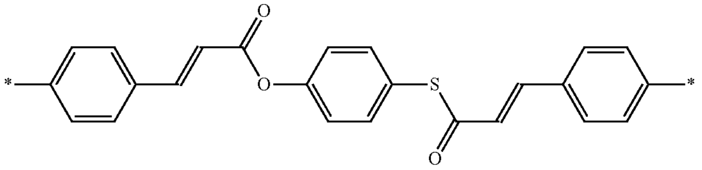

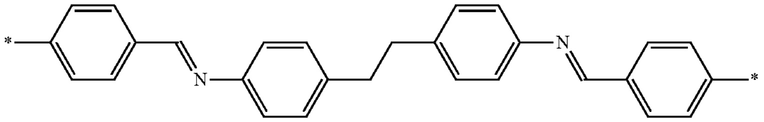

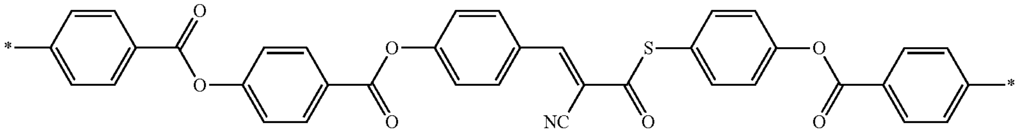

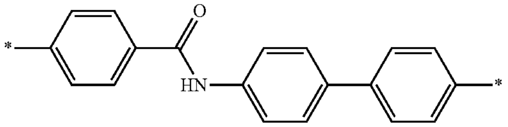

Examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—: R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the (meth)acryloyloxy group-containing group include a group represented by -L-A (L represents a single bond or a linking group, specific examples of the linking group are the same as those for L1 and SP1 described above, and A represents a (meth)acryloyloxy group).

From the viewpoint that the alignment degree of the dichroic substance in the light absorption anisotropic layer is more excellent, T1 represents preferably an alkoxy group having 1 to 10 carbon atoms, more preferably an alkoxy group having 1 to 5 carbon atoms, and still more preferably a methoxy group. These terminal groups may be further substituted with these groups or the above-described cross-linkable groups.

From the viewpoint that the alignment degree of the dichroic substance in the light absorption anisotropic layer is more excellent, the number of atoms in the main chain of T1 is preferably in a range of 1 to 20, more preferably in a range of 1 to 15, still more preferably in a range of 1 to 10, and particularly preferably in a range of 1 to 7. In a case where the number of atoms in the main chain of T1 is 20 or less, the alignment degree of the dichroic substance in the light absorption anisotropic layer is further improved. Here, the "main chain" in T1 indicates the longest molecular chain bonded to M1, and the number of hydrogen atoms is not included in the number of atoms in the main chain of T1. For example, the number of atoms in the main chain is 4 in a case where T1 represents an n-butyl group, the number of atoms in the main chain is 3 in a case where T1 represents a sec-butyl group.

From the viewpoint that the alignment degree of the dichroic substance in the light absorption anisotropic layer is more excellent, the content of the repeating unit (1L) is preferably in a range of 20% to 100% by mass with respect to 100% by mass of all the repeating units of the polymer liquid crystal compound.

In the present invention, the content of each repeating unit contained in the polymer liquid crystal compound is calculated based on the charged amount (mass) of each monomer used for obtaining each repeating unit.

The polymer liquid crystal compound may have only one or two or more kinds of repeating units (1L). Among repeating units, from the viewpoint that the alignment degree of the dichroic substance in the light absorption anisotropic layer is more excellent, the polymer liquid crystal compound may have two kinds of the repeating units (1L).

In a case where the polymer liquid crystal compound has two kinds of the repeating units (1L), from the viewpoint that the alignment degree of the dichroic substance in the light absorption anisotropic layer is more excellent, it is preferable that the terminal group represented by T1 in one (repeating unit A) is an alkoxy group and the terminal group represented by T1 in the other (repeating unit B) is a group other than the alkoxy group.

From the viewpoint that the alignment degree of the dichroic substance in the light absorption anisotropic layer is more excellent, as the terminal group represented by T1 in the repeating unit B, an alkoxycarbonyl group, a cyano group, or a (meth)acryloyloxy group-containing group is preferable, and an alkoxycarbonyl group or a cyano group is more preferable.

From the viewpoint that the alignment degree of the dichroic substance in the light absorption anisotropic layer is more excellent, the ratio (A/B) of the content of the repeating unit A in the polymer liquid crystal compound to the content of the repeating unit B in the polymer liquid crystal compound is preferably in a range of 50/50 to 95/5, more preferably in a range of 60/40 to 93/7, and still more preferably in a range of 70/30 to 90/10.

Further, the polymer liquid crystal compound may have the repeating unit (1L) and a repeating unit containing no mesogen group. Examples of the repeating unit containing no mesogen group include a repeating unit in which M1 in Formula (1L) represents a single bond.

In a case where the polymer liquid crystal compound has a repeating unit containing no mesogen group, from the viewpoint that the alignment degree of the dichroic substance in the light absorption anisotropic layer is more excellent, the content of the repeating unit is preferably greater than 0% by mass and 30% by mass or less and more preferably greater than 10% by mass and 20% by mass or less with respect to 100% by mass of all repeating units of the polymer liquid crystal compound.

—Weight-Average Molecular Weight—

From the viewpoint that the alignment degree of the dichroic substance in the light absorption anisotropic layer is more excellent, the weight-average molecular weight (Mw) of the polymer liquid crystal compound is preferably in a range of 1000 to 500000 and more preferably in a range of 2000 to 300000. In a case where the Mw of the polymer liquid crystal compound is in the above-described range, the polymer liquid crystal compound is easily handled.

In particular, from the viewpoint of suppressing cracking during the coating, the weight-average molecular weight (Mw) of the polymer liquid crystal compound is preferably 10000 or greater and more preferably in a range of 10000 to 300000.

In addition, from the viewpoint of the temperature latitude of the alignment degree, the weight-average molecular weight (Mw) of the polymer liquid crystal compound is preferably less than 10000 and preferably 2000 or greater and less than 10000.

Here, the weight-average molecular weight and the number average molecular weight in the present invention are values measured according to gel permeation chromatography (GPC).

Solvent (eluent): N-methylpyrrolidone

Equipment name: TOSOH HLC-8220GPC

Column: Connect and use three of TOSOH TSKgel Super AWM-H (6 mm×15 cm)

Column temperature: 25° C.

Sample concentration: 0.1% by mass

Flow rate: 0.35 mL/min

Calibration curve: TSK standard polystyrene (manufactured by TOSOH Corporation), calibration curves of 7 samples with Mw of 2800000 to 1050 (Mw/Mn=1.03 to 1.06) are used.

(Dichroic Substance)

It is preferable that the light absorption anisotropic layer according to the embodiment of the present invention contains a dichroic substance.

The dichroic substance denotes a substance having different absorbances depending on the direction. The dichroic substance is not particularly limited, and examples thereof include a visible light absorbing substance (such as a dichroic coloring agent compound or a dichroic azo coloring agent compound), a light emitting substance (such as a fluorescent substance or a phosphorescent substance), an ultraviolet absorbing substance, an infrared absorbing substance, a non-linear optical substance, a carbon nanotube, and an inorganic substance (for example, a quantum rod). Further, known dichroic substances (dichroic coloring agent compounds) of the related art can be used.

Among these, a dichroic coloring agent compound is preferable, and a dichroic azo coloring agent compound is more preferable.

The dichroic azo coloring agent compound is not particularly limited, and known dichroic azo coloring agent compounds of the related art can be used, but the compounds described below are preferably used.

Hereinafter, the dichroic azo coloring agent compound will be described.

The dichroic azo coloring agent compound may or may not exhibit liquid crystallinity.

In a case where the dichroic azo coloring agent compound exhibits liquid crystallinity, the dichroic azo coloring agent compound may exhibit any of nematic liquid crystallinity or smectic liquid crystallinity. The temperature range where the liquid crystal phase is exhibited is preferably room temperature or higher and 300° C. or lower and more preferably in a range of 50° C. to 200° C. from the viewpoints of handleability and manufacturing suitability.

From the viewpoint of adjusting the tint, as the dichroic azo coloring agent compound, the light absorption anisotropic layer contains preferably at least one coloring agent compound having a maximal absorption wavelength in a wavelength range of 560 to 700 nm (hereinafter, also referred to as "first dichroic azo coloring agent compound") and at least one coloring agent compound having a maximal absorption wavelength in a wavelength range of 455 nm or greater and less than 560 nm (hereinafter, also referred to as "second dichroic azo coloring agent compound") and specifically more preferably at least a dichroic azo coloring agent compound represented by Formula (3) and a dichroic azo coloring agent compound represented by Formula (4).

Further, three or more kinds of dichroic azo coloring agent compounds may be used in combination. For example, from the viewpoint of making the color of the light absorption anisotropic layer close to black, it is preferable to use a first dichroic azo coloring agent compound, a second dichroic azo coloring agent compound, and at least one coloring agent compound having a maximal absorption wavelength in a wavelength range of 380 nm or greater and less than 455 nm (hereinafter, also referred to as "third dichroic azo coloring agent compound") in combination.

From the viewpoint of enhancing the pressing resistance, it is preferable that the dichroic azo coloring agent compound contains a crosslinkable group.

Examples of the crosslinkable group include a (meth)acryloyl group, an epoxy group, an oxetanyl group, and a styryl group. Among these, a (meth)acryloyl group is preferable.

—First Dichroic Azo Coloring Agent Compound—

As described above, the first dichroic azo coloring agent compound is a dichroic azo coloring agent compound having a maximal absorption wavelength in a wavelength range of 560 to 700 nm.

As the first dichroic azo coloring agent compound, a dichroic azo coloring agent compound having a maximum absorption wavelength in a wavelength range of 560 to 700 nm is preferable, a dichroic azo coloring agent compound having a maximum absorption wavelength in a wavelength range of 560 to 650 nm is more preferable from the viewpoint of adjusting the tint of the polarizer, and a dichroic azo coloring agent compound having a maximum absorption wavelength in a wavelength range of 560 to 640 nm is still more preferable.

The maximum absorption wavelength (nm) of the dichroic azo coloring agent compound in the present specification is acquired from an ultraviolet visible spectrum in a wavelength range of 380 to 800 nm measured by a spectrophotometer using a solution prepared by dissolving the dichroic azo coloring agent compound in a good solvent.

It is preferable that the first dichroic azo coloring agent compound is a compound having a chromophore and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic ring group and an azo group is preferable, and a bisazo structure containing an aromatic heterocyclic group (preferably a thienothiazole group) and two azo groups is more preferable.

The side chain is not particularly limited, and examples thereof include a group represented by $L^3$, $R^2$, or $L^4$ in Formula (3).

From the viewpoint of further improving the alignment degree of the dichroic azo coloring agent compound in the light absorption anisotropic layer to be formed, it is preferable that the first dichroic azo coloring agent compound is a compound represented by Formula (3).

(3)

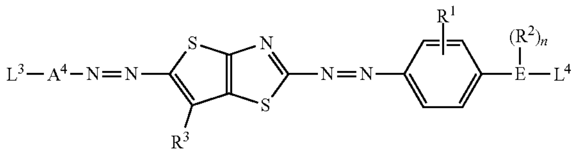

In Formula (3), $A^4$ represents a divalent aromatic group which may have a substituent.

In Formula (3), $L^3$ and $L^4$ each independently represent a substituent.

In Formula (3), E represents any of a nitrogen atom, an oxygen atom, or a sulfur atom.

In Formula (3), $R^1$ represents a hydrogen atom, a halogen atom, an alkyl group which may have a substituent, or an alkoxy group which may have a substituent.

In Formula (3), $R^2$ represents a hydrogen atom or an alkyl group which may have a substituent.

In Formula (3), $R^3$ represents a hydrogen atom or a substituent.

In Formula (3), n represents 0 or 1. Here, n is 1 in a case where E represents a nitrogen atom, and n is 0 in a case where E represents an oxygen atom or a sulfur atom.

Further, the substituent W is preferable as the substituent.

In Formula (3), "divalent aromatic group which may have a substituent" as $A^4$ will be described.

Examples of the substituent include a substituent group G described in paragraphs [0237] to [0240] of JP2011-237513A. Among these, a halogen atom, an alkyl group, an alkoxy group, an alkoxycarbonyl group (such as methoxycarbonyl or ethoxycarbonyl), and an aryloxycarbonyl group (such as phenoxycarbonyl, 4-methylphenoxycarbonyl, or 4-methoxyphenylcarbonyl) are suitable, an alkyl group is more suitable, and an alkyl group having 1 to 5 carbon atoms is still more suitable.

In addition, examples of the divalent aromatic group include a divalent aromatic hydrocarbon group and a divalent aromatic heterocyclic group.

Examples of the divalent aromatic hydrocarbon group include an arylene group having 6 to 12 carbon atoms, and specific examples thereof include a phenylene group, a cumenylene group, a mesitylene group, a tolylene group, and a xylylene group. Among these, a phenylene group is preferable.

In Formula (3), examples of the substituent represented by $L^3$ and $L^4$ include the substituent W. Among these, as the substituent, an alkyl group which may have a substituent, an alkenyl group which may have a substituent, an alkynyl group which may have a substituent, an aryl group which may have a substituent, an alkoxy group which may have a substituent, an oxycarbonyl group which may have a substituent, an acyloxy group which may have a substituent, an acylamino group which may have a substituent, an amino group which may have a substituent, an alkoxycarbonylamino group which may have a substituent, a sulfonylamino group which may have a substituent, a sulfamoyl group which may have a substituent, a carbamoyl group which may have a substituent, an alkylthio group which may have a substituent, a sulfonyl group which may have a substituent, a ureido group which may have a substituent, a nitro group, a hydroxy group, a cyano group, an imino group, an azo group, a halogen atom, and a heterocyclic group are preferable, and an alkyl group which may have a substituent, an alkenyl group which may have a substituent, an aryl group which may have a substituent, an alkoxy group which may have a substituent, an oxycarbonyl group which may have a substituent, an acyloxy group which may have a substituent, an amino group which may have a substituent, a nitro group, an imino group, and an azo group are more preferable.

It is preferable that at least one of $L^3$ or $L^4$ contains a crosslinkable group (polymerizable group) and more preferable that both $L^3$ and $L^4$ contain a crosslinkable group.

Specific examples of the crosslinkable group include the polymerizable groups described in paragraphs [0040] to [0050] of JP2010-244038A. Among these, from the viewpoints of the reactivity and the synthetic suitability, an acryloyl group, a methacryloyl group, an epoxy group, an oxetanyl group, and a styryl group are preferable, and an acryloyl group and a methacryloyl group are more preferable.

In Formula (3), E represents any of a nitrogen atom, an oxygen atom, or a sulfur atom. Among these, from the viewpoint of the synthetic suitability, a nitrogen atom is preferable.

In Formula (3), $R^1$ represents any group or atom of a hydrogen atom, a halogen atom, an alkyl group which may have a substituent, or an alkoxy group which may have a substituent. Among these, a hydrogen atom or an alkyl group which may have a substituent is preferable.

Examples of the substituent include a halogen atom.

Examples of the alkyl group include a linear, branched, or cyclic alkyl group having 1 to 8 carbon atoms. Among these, a linear alkyl group having 1 to 6 carbon atoms is preferable, a linear alkyl group having 1 to 3 carbon atoms is more preferable, and a methyl group or an ethyl group is still more preferable.

Examples of the alkoxy group include an alkoxy group having 1 to 8 carbon atoms. Among these, an alkoxy group having 1 to 6 carbon atoms is preferable, an alkoxy group having 1 to 3 carbon atoms is more preferable, and a methoxy group or an ethoxy group is still more preferable.

In Formula (3), $R^2$ represents a hydrogen atom or an alkyl group which may have a substituent and preferably an alkyl group which may have a substituent.

Specific examples and preferred embodiments of "alkyl group which may have a substituent" as Rare the same as those for "alkyl group which may have a substituent" as $R^1$ in Formula (3). Therefore, the description thereof will not be provided.

In Formula (3), $R^3$ represents a hydrogen atom or a substituent.

Specific examples and preferred embodiments of the "substituent" represented by $R^3$ are the same as those for the substituents in the "divalent aromatic group which may have a substituent", and preferred embodiments are also the same as described above. Therefore, the description thereof will not be provided.

From the viewpoint of the light resistance, it is preferable that $L^3$ represents an electron-withdrawing group and that $R^2$ and $L^4$ represent a group having a low electron-donating property.

Specific examples of such groups as $L^3$ include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and examples of such groups as $R^2$ and $L^4$ include groups having the following structures. In addition, the groups having the following structures are shown in the form having a nitrogen atom to which $R^2$ and $L^4$ are bonded in Formula (3).

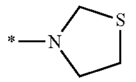
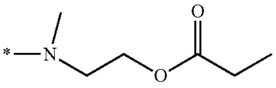
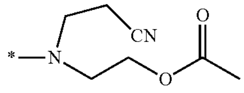
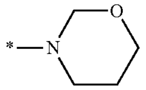
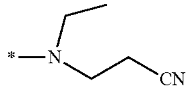
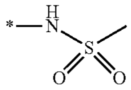
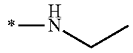
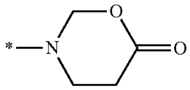
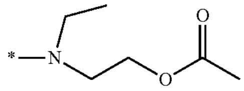
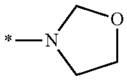
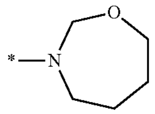
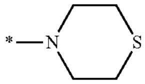
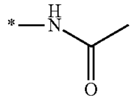
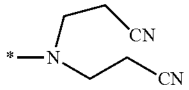
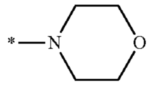
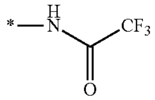
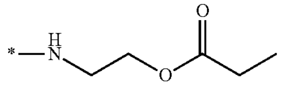
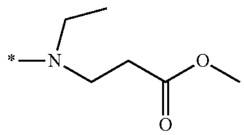
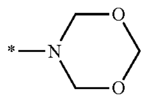
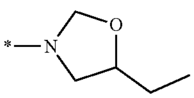

-continued
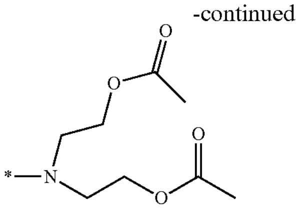
-continued
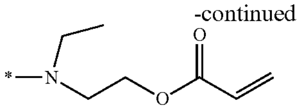
Specific examples of the first dichroic azo coloring agent compound are shown below, but the present invention is not limited thereto.
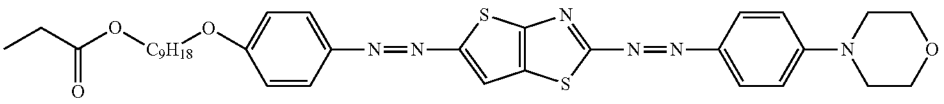
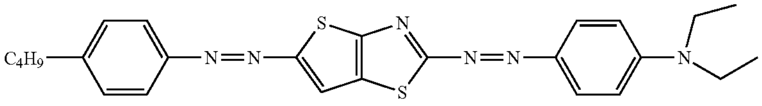
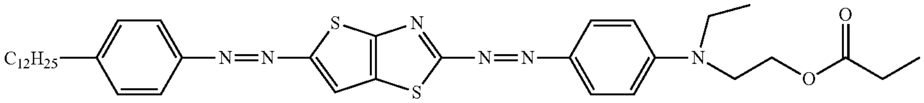
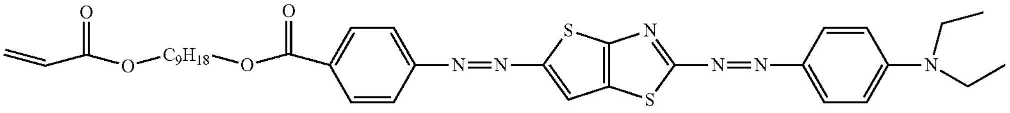
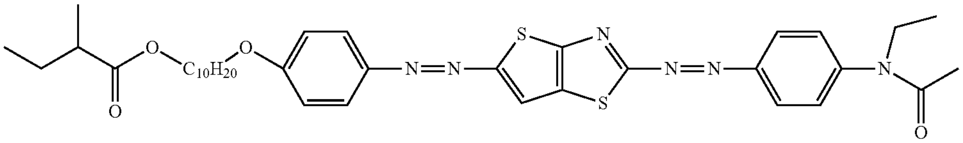
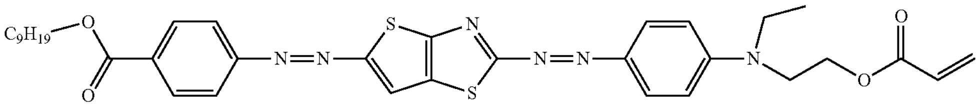
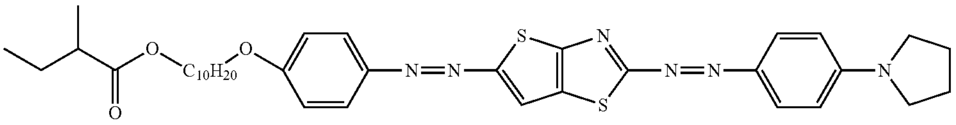
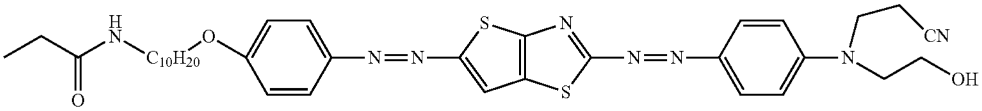
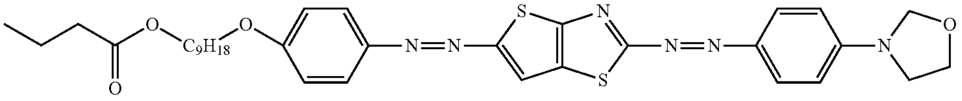
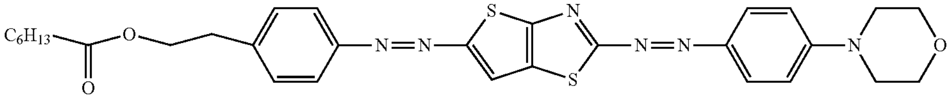
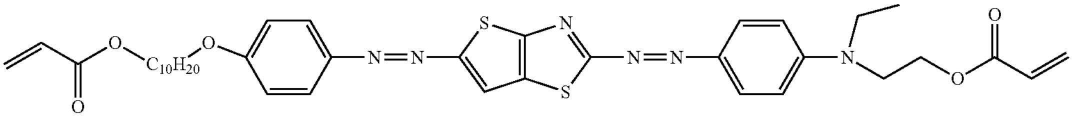
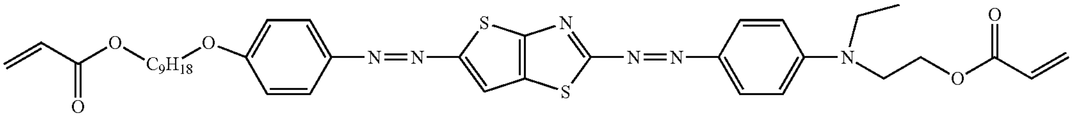
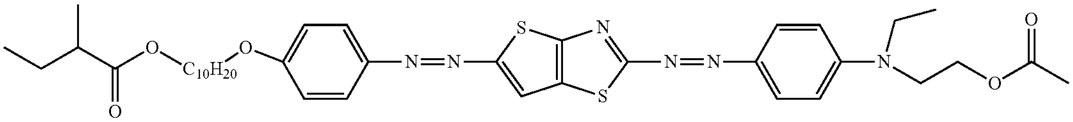

-continued

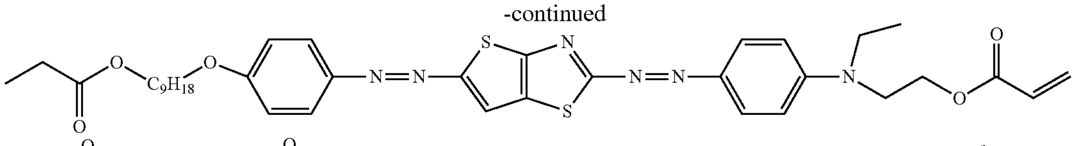

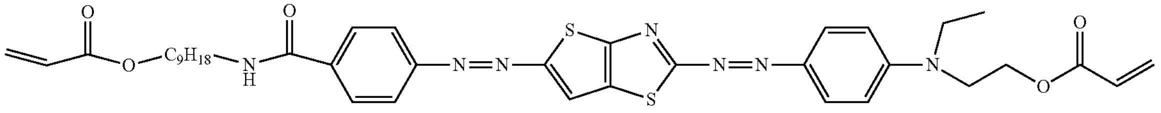

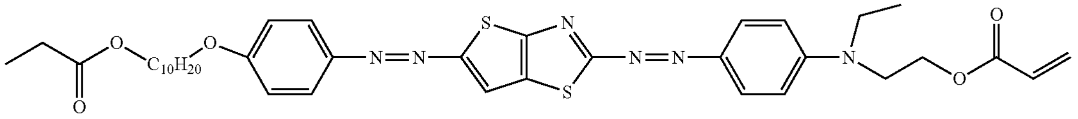

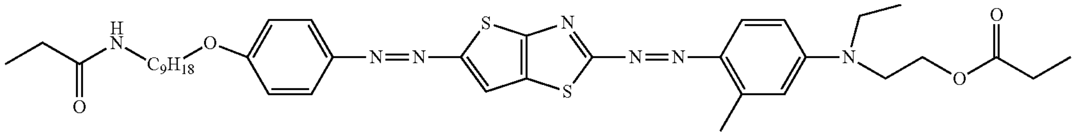

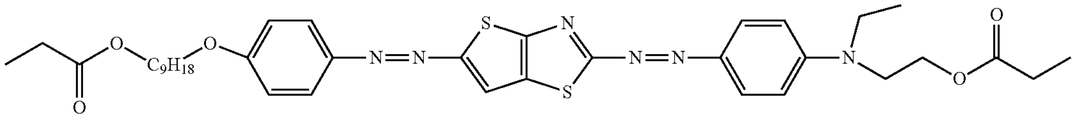

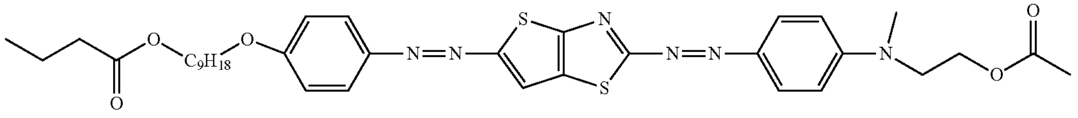

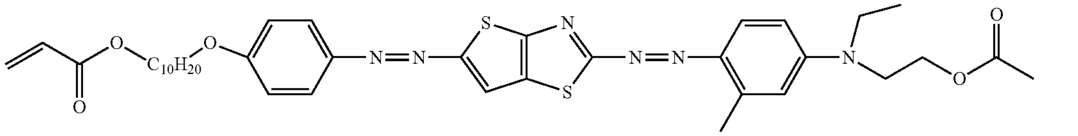

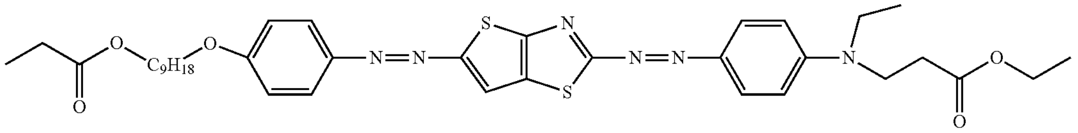

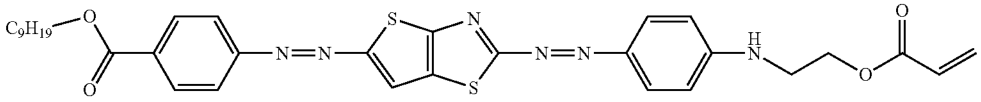

—Second Dichroic Azo Coloring Agent Compound—

The second dichroic azo coloring agent compound is a compound different from the first dichroic azo coloring agent compound, and specifically, the chemical structure thereof is different from that of the first dichroic azo coloring agent compound.

In addition, as described above, the second dichroic azo coloring agent compound is a dichroic azo coloring agent compound having a maximal absorption wavelength in a wavelength range of 455 nm or greater and less than 560 nm.

As the second dichroic azo coloring agent compound, from the viewpoint of adjusting the tint of the polarizer, a dichroic azo coloring agent compound having a maximum absorption wavelength in a wavelength range of 455 nm or greater and less than 560 nm is preferable, a dichroic azo coloring agent compound having a maximum absorption wavelength in a wavelength range of 455 to 555 nm is more preferable, and a dichroic azo coloring agent compound having a maximum absorption wavelength in a wavelength range of 455 to 550 nm is still more preferable.

In particular, the tint of the polarizer is easily adjusted by using a first dichroic azo coloring agent compound having a maximum absorption wavelength of 560 to 700 nm and a second dichroic azo coloring agent compound having a maximum absorption wavelength of 455 nm or greater and less than 560 nm.

It is preferable that the second dichroic azo coloring agent compound is a compound having a chromophore which is a nucleus of a dichroic azo coloring agent compound and a side chain bonded to a terminal of the chromophore.

Specific examples of the chromophore include an aromatic ring group (such as an aromatic hydrocarbon group or an aromatic heterocyclic group) and an azo group. In addition, a structure containing both an aromatic hydrocarbon group and an azo group is preferable, and a bisazo or trisazo structure containing an aromatic hydrocarbon group and two or three azo groups is more preferable.

The side chain is not particularly limited, and examples thereof include a group represented by $R^4$, $R^5$, or $R^6$ in Formula (4).

From the viewpoint of further improving the alignment degree of the polarizer, it is preferable that the second dichroic azo coloring agent compound is a compound represented by Formula (4).

Formula (4)

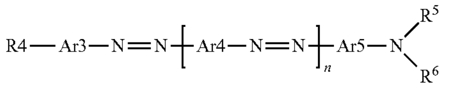

In Formula (4), n represents 1 or 2.

In Formula (4), Ar3, Ar4, and Ar5 each independently represent a phenylene group which may have a substituent or a heterocyclic group which may have a substituent. The substituent is not particularly limited, and examples thereof include the substituent W.

The heterocyclic group may be aromatic or non-aromatic.

The atoms other than carbon constituting the aromatic heterocyclic group include a nitrogen atom, a sulfur atom, and an oxygen atom. In a case where the aromatic heterocyclic group has a plurality of atoms constituting a ring other than carbon, these may be the same as or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

In Formula (4), R4 has the same definition as that for $L^3$ in Formula (3).

In Formula (4), R5 and R6 each have the same definition as that for $R^2$ and $L^4$ in Formula (3).

From the viewpoint of the light resistance, it is preferable that R4 represents an electron-withdrawing group and that R5 and R6 represent a group having a low electron-donating property.

Among such groups, specific examples of the electron-withdrawing group as R4 are the same as the specific examples of the electron-withdrawing group as $L^3$, and specific examples of the group having a low electron-donating property as R5 and R6 are the same as the specific examples of the group having a low electron-donating property as $R^2$ and $L^4$.

Specific examples of the second dichroic azo coloring agent compound are shown below, but the present invention is not limited thereto.

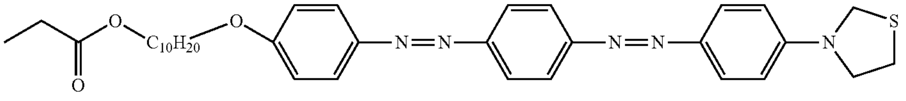

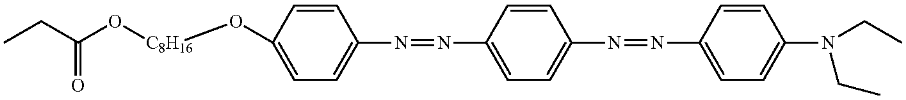

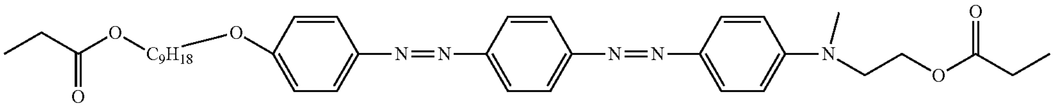

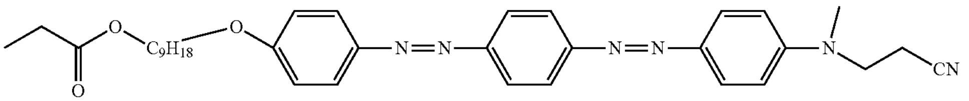

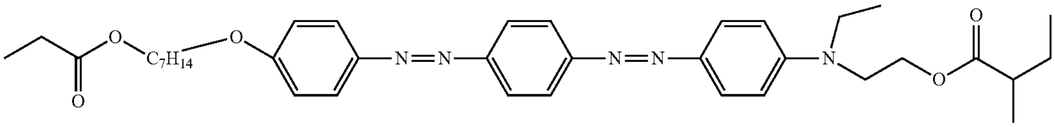

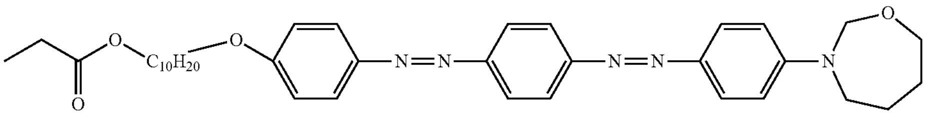

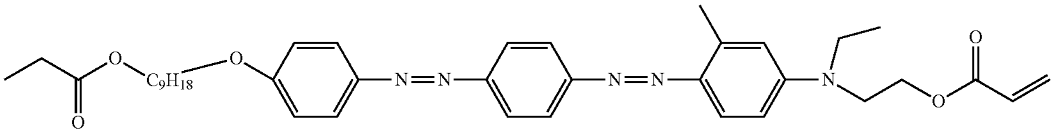

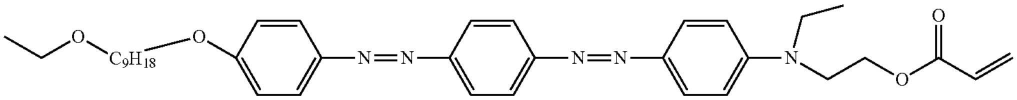

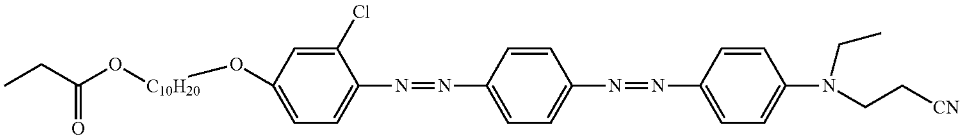

-continued
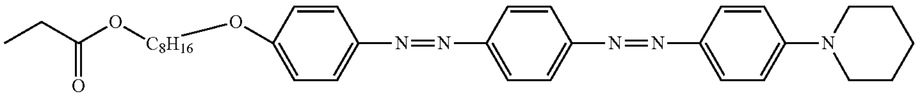
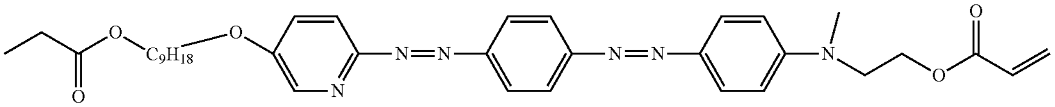
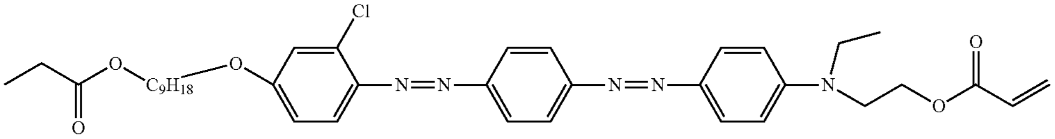
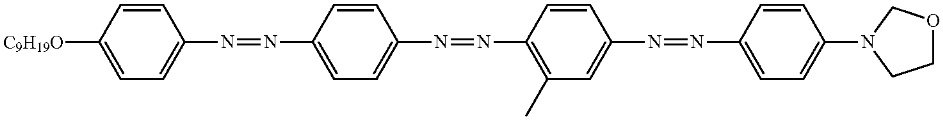
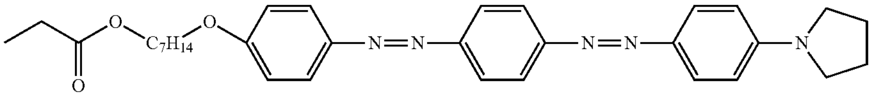
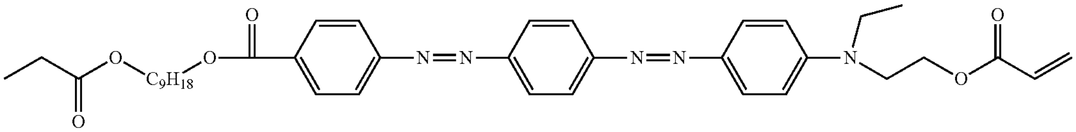
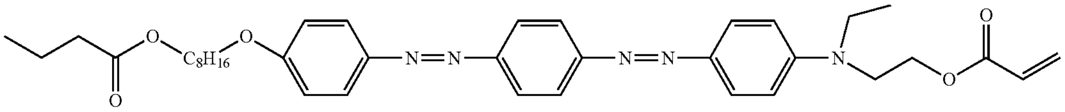
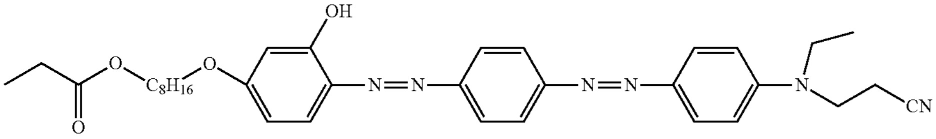
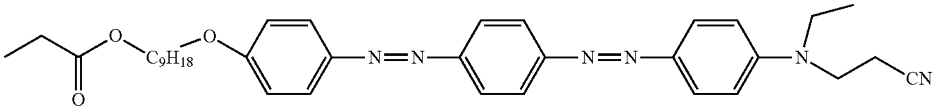
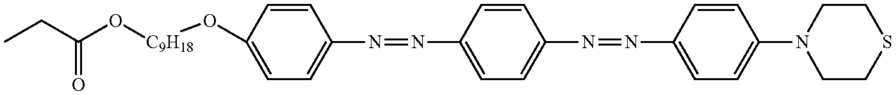
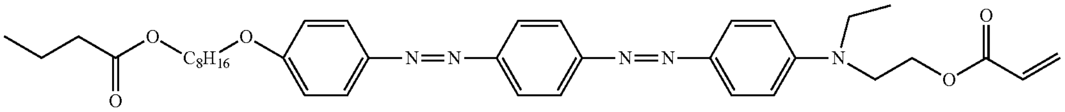
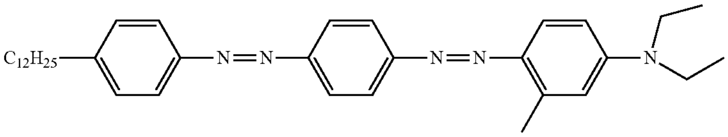
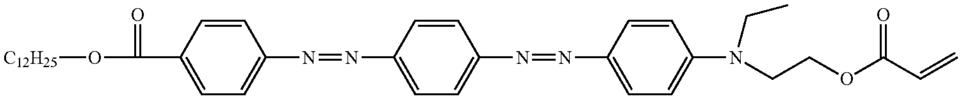
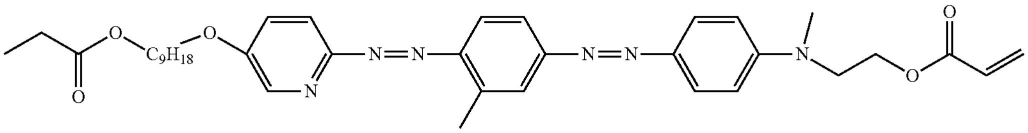

-continued
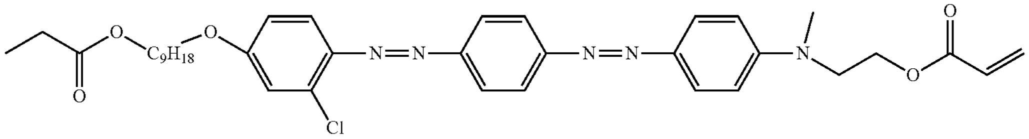
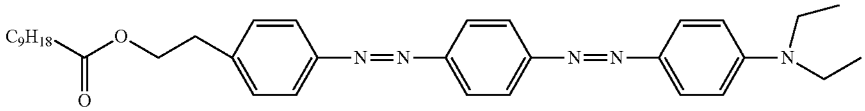
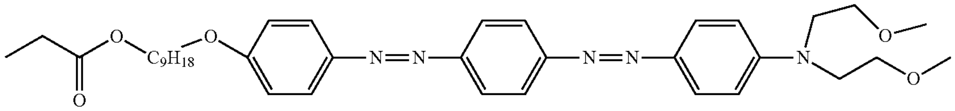
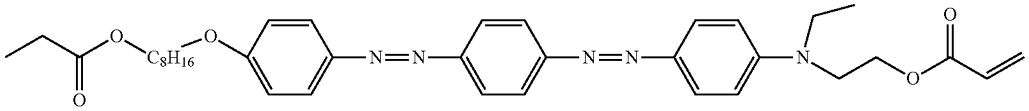
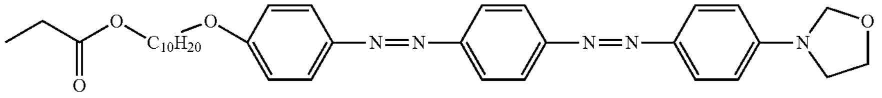
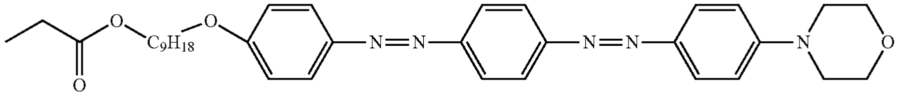
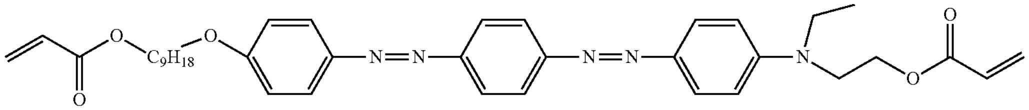
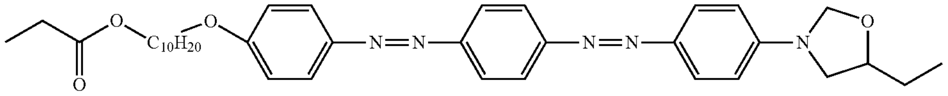
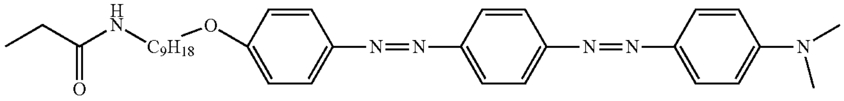
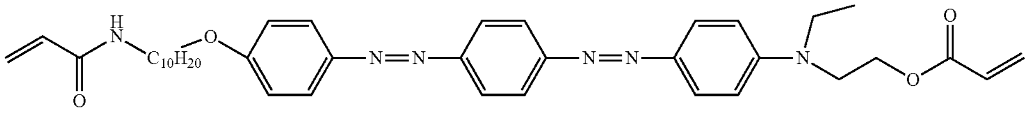
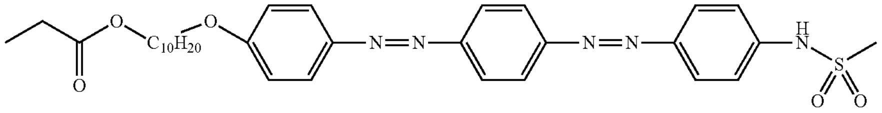
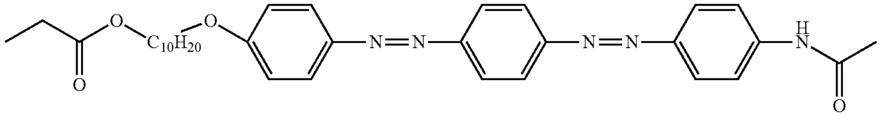
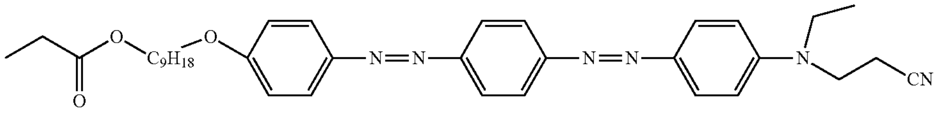
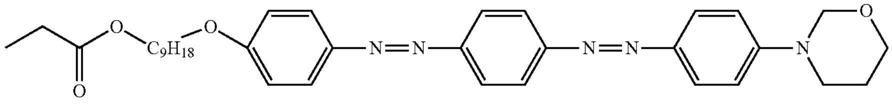
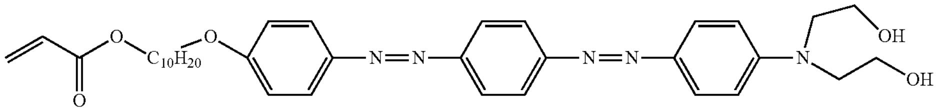

-continued

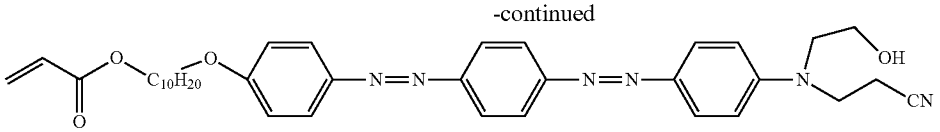

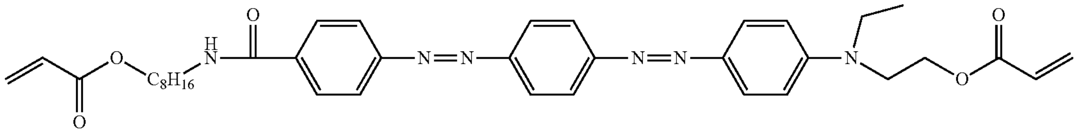

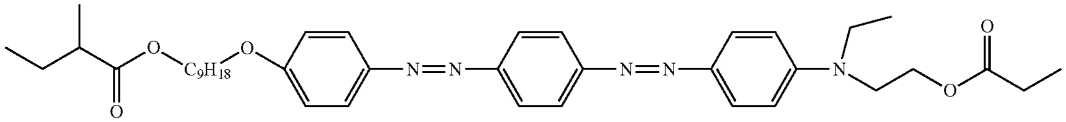

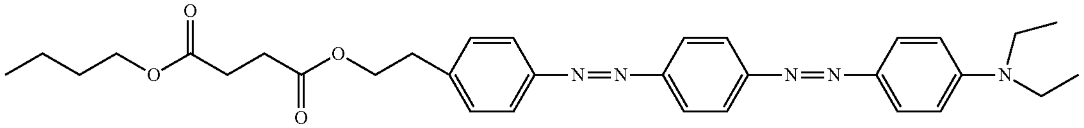

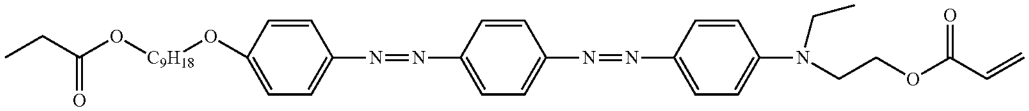

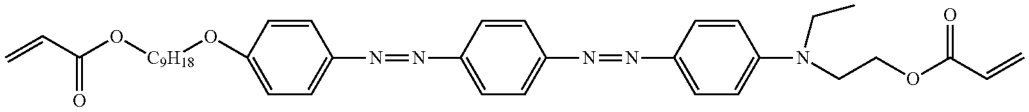

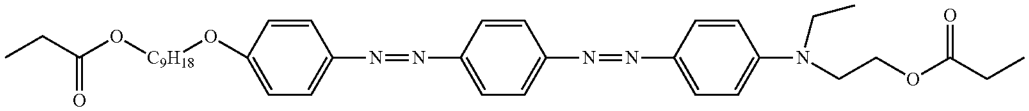

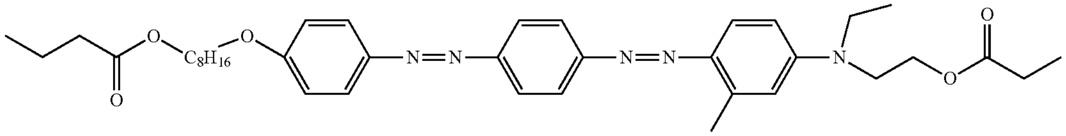

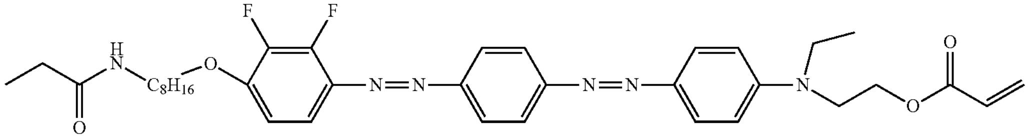

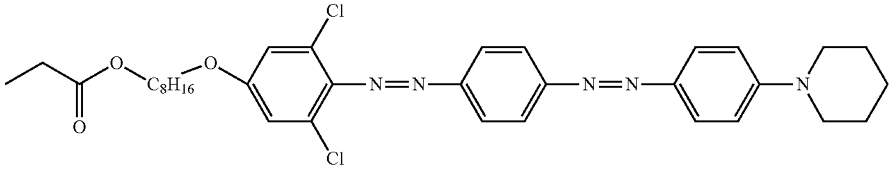

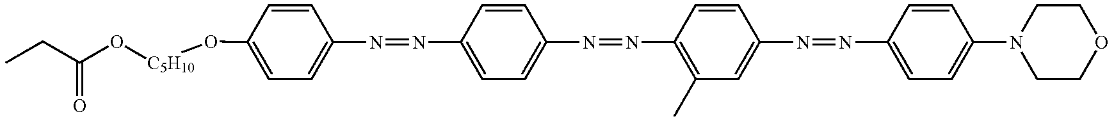

—Difference in Log P Value—

The log P value is an index expressing the properties of the hydrophilicity and the hydrophobicity of a chemical structure.

An absolute value of a difference (hereinafter, also referred to as "difference in log P value") between the log P value of a side chain of the first dichroic azo coloring agent compound and the log P value of a side chain of the second dichroic azo coloring agent compound is preferably 2.30 or less, more preferably 2.0 or less, still more preferably 1.5 or less, and particularly preferably 1.0 or less. In a case where the difference in log P value is 2.30 or less, since the affinity between the first dichroic azo coloring agent compound and the second dichroic azo coloring agent compound is enhanced and an arrangement structure is more easily formed, the alignment degree of the dichroic azo coloring agent compound is further improved.

Further, in a case where the first dichroic azo coloring agent compound or the second dichroic azo coloring agent compound has a plurality of side chains, it is preferable that at least one difference in log P value is in the above-described ranges.

Here, the side chain of the first dichroic azo coloring agent compound and the side chain of the second dichroic azo coloring agent compound denote a group bonded to the terminal of the above-described chromophore. For example, $L^3$, $L^4$, and $R^2$ in Formula (3) represent a side chain in a case where the first dichroic azo coloring agent compound is a compound represented by Formula (3), and $R^4$, $R^5$, and $R^6$ in Formula (4) represent a side chain in a case where the second dichroic azo coloring agent compound is a compound represented by Formula (4). Particularly, in a case where the first dichroic azo coloring agent compound is a compound represented by Formula (3) and the second dichroic azo coloring agent compound is a compound represented by Formula (4), it is preferable that at least one of the difference in log P value between $L^3$ and $R^4$, the difference in log P value between $L^3$ and $R^5$, the difference in log P value between $L^4$ and $R^4$, or the difference in log P value between $L^4$ and $R^5$ is in the above-described ranges.

Further, the log P value may be referred to as a hydrophilicity/hydrophobicity parameter. The log P value can be calculated using software such as ChemBioDraw Ultra or HSPiP (Ver. 4.1.07). Further, the log P value can be acquired experimentally by the method of the OECD Guidelines for the Testing of Chemicals, Sections 1, Test No. 117 or the like. In the present specification, a value calculated by inputting the structural formula of a compound to HSPiP (Ver. 4.1.07) is employed as the log P value unless otherwise specified.

—Third Dichroic Azo Coloring Agent Compound—

The third dichroic azo coloring agent compound is a dichroic azo coloring agent compound other than the first dichroic azo coloring agent compound and the second dichroic azo coloring agent compound, and specifically, the chemical structure thereof is different from those of the first dichroic azo coloring agent compound and the second dichroic azo coloring agent compound. In a case where the light absorption anisotropic layer contains the third dichroic azo coloring agent compound, there is an advantage that the tint of the light absorption anisotropic layer is easily adjusted.

In addition, as described above, the third dichroic azo coloring agent compound is a dichroic azo coloring agent compound having a maximal absorption wavelength in a wavelength range of 380 nm or greater and less than 455 nm.

As the third dichroic azo coloring agent compound, from the viewpoint of adjusting the tint of the polarizer, a dichroic azo coloring agent compound having a maximum absorption wavelength in a wavelength range of 380 nm or greater and less than 455 nm is preferable, a dichroic azo coloring agent compound having a maximum absorption wavelength in a wavelength range of 400 to 455 nm is more preferable, and a dichroic azo coloring agent compound having a maximum absorption wavelength in a wavelength range of 410 to 455 nm is still more preferable.

It is preferable that the third dichroic azo coloring agent compound contains a dichroic azo coloring agent compound represented by Formula (6).

(6)

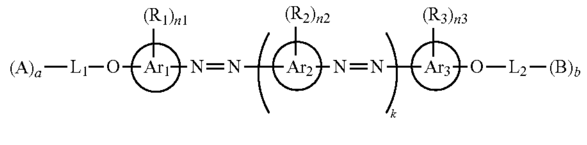

In Formula (6), A and B each independently represent a crosslinkable group or a monovalent substituent.

In Formula (6), a and b each independently represent 0 or 1. From the viewpoint that the alignment degree at 420 nm is excellent, it is preferable that both a and b represent 0.

In Formula (6), $L_1$ represents a monovalent substituent in a case where a represents 0, and $L_1$ represents a single bond or a divalent linking group in a case where a represents 1.

Further, $L_2$ represents a monovalent substituent in a case where b represents 0, and $L_2$ represents a single bond or a divalent linking group in a case where b represents 1.

In Formula (6), $Ar_1$ represents a (n1+2)-valent aromatic hydrocarbon group or a heterocyclic group, $Ar_2$ represents a (n2+2)-valent aromatic hydrocarbon group or a heterocyclic group, and $Ar_3$ represents a (n3+2)-valent aromatic hydrocarbon group or a heterocyclic group.

In Formula (6), $R_1$, $R_2$, and $R_3$ each independently represent a monovalent substituent. A plurality of $R_1$'s may be the same as or different from each other in a case of "n1>2", a plurality of R2's may be the same as or different from each other in a case of "n2>2", and a plurality of $R_3$'s may be the same as or different from each other in a case of "n3>2".

In Formula (6), k represents an integer of 1 to 4. In a case of "k>2", a plurality of $Ar_2$'s may be the same as or different from each other and a plurality of $R_2$'s may be the same as or different from each other.

In Formula (6), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k≥2".

In Formula (6), examples of the crosslinkable group represented by A and B include the polymerizable groups described in paragraphs [0040] to [0050] of JP2010-244038A. Among these, an acryloyl group, a methacryloyl group, an epoxy group, an oxetanyl group, and a styryl group are preferable from the viewpoint of improving the reactivity and the synthetic suitability, and an acryloyl group and a methacryloyl group are more preferable from the viewpoint of further improving the solubility.

In Formula (6), examples of the monovalent substituent represented by A and B include the substituent W.

As the monovalent substituent represented by $L_1$ and $L_2$, a group to be introduced to increase the solubility of the dichroic substance or a group having an electron-donating property or an electron-withdrawing property which is to be introduced to adjust the color tone of the coloring agent is preferable. Examples of the substituent include the substituent W.

The substituent W may be further substituted with the substituent W. Further, in a case where two or more substituents are present, these may be the same as or different from each other. Further, these may be bonded to each other to form a ring where possible.

Examples of the group in which the substituent W is further substituted with the substituent W include an $R_B$—(O—$R_A$)$_{na}$— group in which the alkoxy group is substituted with an alkyl group, and an $R_B$—OCO—$R_A$— group in which the carboxy group is substituted with an alkyl group. Here, in the formula, $R_A$ represents an alkylene group having 1 to 5 carbon atoms, $R_B$ represents an alkyl group having 1 to 5 carbon atoms, and na represents an integer of 1 to 10 (preferably an integer of 1 to 5 and more preferably an integer of 1 to 3).

Among these, as the monovalent substituent represented by $L_1$ and $L_2$, an alkyl group, an alkenyl group, an alkoxy group, and groups in which these groups are further substituted with these groups (for example, the $R_B$—(O—$R_A$)$_{na}$— group the $R_B$—OCO—$R_A$— group) are preferable, an alkyl group, an alkoxy group, and groups in which these groups are further substituted with these groups (for example, the $R_B$—(O—$R_A$)$_{na}$— group and the $R_B$—OCO—$R_A$— group described above) are more preferable.

Examples of the divalent linking group represented by $L_1$ and $L_2$ include —O—, —S—, —CO—, —COO—, —OCO—, —O—CO—O—, —CO—NRN—, —O—CO—NRN—, —NRN—CO—NRN—, —$SO_2$—, —SO—, an alkylene group, a cycloalkylene group, an alkenylene group, and a group obtained by combining two or more of these groups.

Among these, a group formed by combining an alkylene group with one or more groups selected from the group consisting of —O—, —COO—, —OCO—, and —O—

B is not present, "number of atoms in the main chain" in $L_2$ denotes the number of atoms in $L_2$ that does not have a branched chain.

Specifically, in Formula (D1), the number of atoms in the main chain of $L_1$ is 5 (the number of atoms in the dotted frame on the left side of Formula (D1)), and the number of atoms in the main chain of $L_2$ is 5 (the number of atoms in the dotted frame on the right side of Formula (D1)). Further, in Formula (D10), the number of atoms in the main chain of $L_1$ is 7 (the number of atoms in the dotted frame on the left side of Formula (D10)), and the number of atoms in the main chain of $L_2$ is 5 (the number of atoms in the dotted frame on the right side of Formula (D10)).

D1

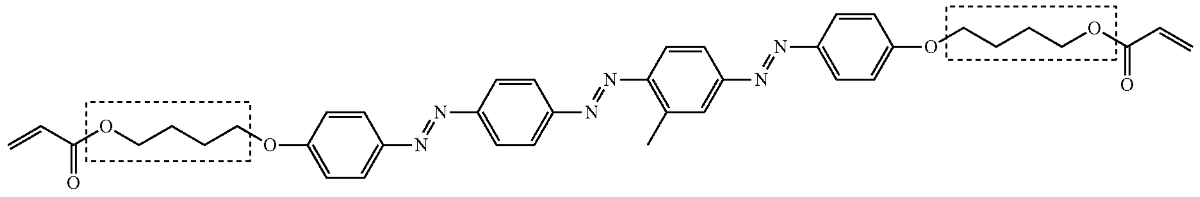

D10

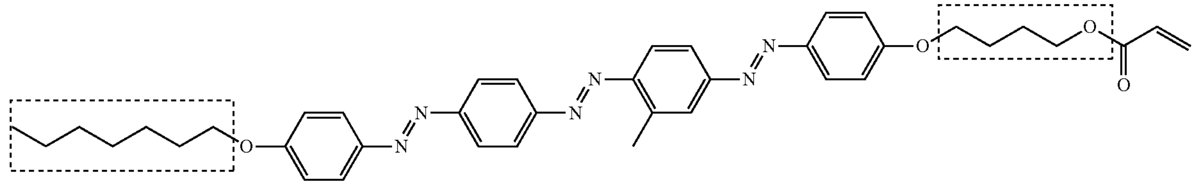

CO—O— is preferable, and a group formed by combining an alkylene group with —OCO— is particularly preferable.

Here, $R_N$ represents a hydrogen atom or an alkyl group. In a case where a plurality of $R_N$'s are present, the plurality of $R_N$'s may be the same as or different from each other.

From the viewpoint of further improving the solubility of the dichroic substance, the number of atoms in the main chain of at least one of $L_1$ or $L_2$ is preferably 3 or greater, more preferably 5 or greater, still more preferably 7 or greater, and particularly preferably 10 or greater. Further, the upper limit value of the number of atoms in the main chain is preferably 20 or less and more preferably 12 or less.

In addition, from the viewpoint of further improving the alignment degree of the dichroic substance in the light absorption anisotropic layer, the number of atoms of the main chain of at least one of $L_1$ or $L_2$ is preferably in a range of 1 to 5.

Here, in a case where A is present in Formula (6), "main chain" of $L_1$ denotes a portion required for directly linking "A" with the "O" atom linked to $L_1$, and "number of atoms in the main chain" denotes the number of atoms constituting the above-described portion. Similarly, in a case where B is present in Formula (6), "main chain" of $L_2$ denotes a portion required for directly linking "B" with the "O" atom linked to $L_2$, and "number of atoms in the main chain" denotes the number of atoms constituting the above-described portion. Further, "number of atoms in the main chain" does not include the number of atoms in a branched chain described below.

Further, in a case where A is not present, "number of atoms in the main chain" in $L_1$ denotes the number of atoms in $L_1$ that does not have a branched chain. In a case where $L_1$ and $L_2$ may have a branched chain.

Here, in a case where A is present in Formula (6), "branched chain" of $L_1$ denotes a portion other than a portion required for directly linking "A" with the "O" atom linked to $L_1$ in Formula (6). Similarly, in a case where B is present in Formula (6), "branched chain" of $L_2$ denotes a portion other than a portion required for directly linking "B" with the "O" atom linked to $L_2$ in Formula (6).

Further, in a case where A is not present in Formula (6), "branched chain" of $L_1$ denotes a portion other than the longest atomic chain (that is, the main chain) extending from the "O" atom linked to $L_1$ in Formula (6) which is the starting point. Similarly, in a case where B is not present in Formula (6), "branched chain" of $L_2$ denotes a portion other than the longest atomic chain (that is, the main chain) extending from the "O" atom linked to $L_2$ in Formula (6) which is a starting point.

The number of atoms in the branched chain is preferably 3 or less. In a case where the number of atoms of the branched chain is 3 or less, there is an advantage that the alignment degree of the dichroic substance in the light absorption anisotropic layer is further improved. Further, the number of atoms in the branched chain does not include the number of hydrogen atoms.

In Formula (6), $Ar_1$ represents an (n1+2)-valent (for example, trivalent in a case where n1 represents 1) aromatic hydrocarbon group or heterocyclic group, $Ar_2$ represents an (n2+2)-valent (for example, trivalent in a case where n2 represents 1) aromatic hydrocarbon group or heterocyclic group, and $A_r$ represents an (n3+2)-valent (for example, trivalent in a case where n3 represents 1) aromatic hydrocarbon group or heterocyclic group. Here, $Ar_1$ to $Ar_3$ can be respectively rephrased as a divalent aromatic hydrocarbon group or a divalent heterocyclic group substituted with n1 to n3 substituents ($R_1$ to $R_3$ described below).

The divalent aromatic hydrocarbon group represented by $Ar_1$ to $Ar_3$ may be monocyclic or may have a bicyclic or higher cyclic fused ring structure. From the viewpoint of further improving the solubility, the number of rings of the divalent aromatic hydrocarbon group is preferably 1 to 4, more preferably 1 or 2, and still more preferably 1 (that is, a phenylene group).

Specific examples of the divalent aromatic hydrocarbon group include a phenylene group, an azulene-diyl group, a naphthylene group, a fluorene-diyl group, an anthracene-diyl group, and a tetracene-diyl group. From the viewpoints of further improving the solubility, a phenylene group or a naphthylene group is preferable, and a phenylene group is more preferable.

Specific examples of the third dichroic coloring agent compound are shown below, but the present invention is not limited thereto. In the following specific examples, n represents an integer of 1 to 10.

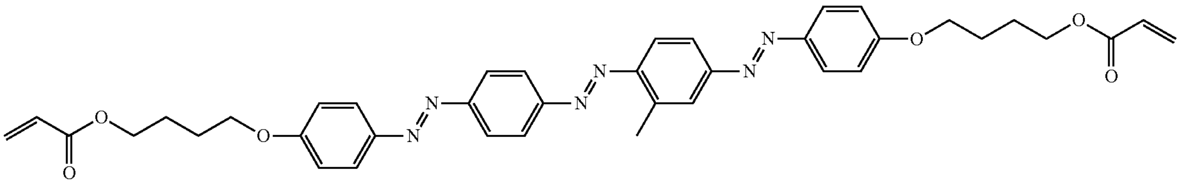

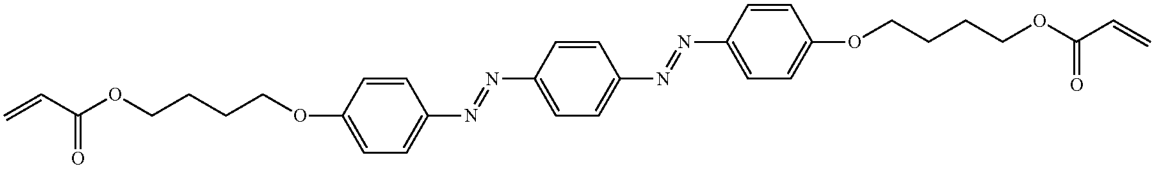

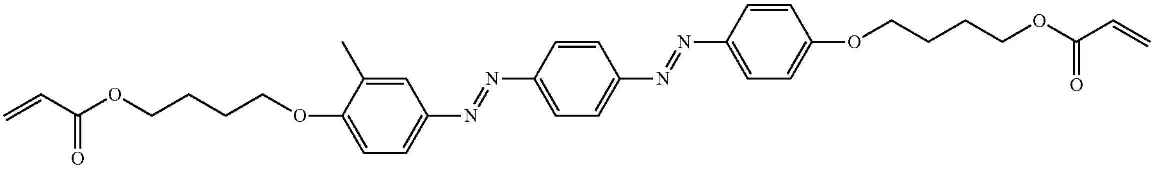

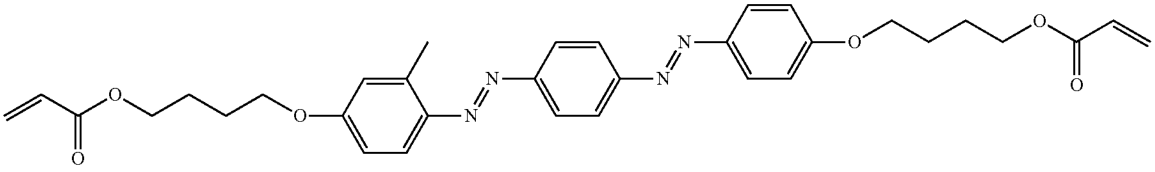

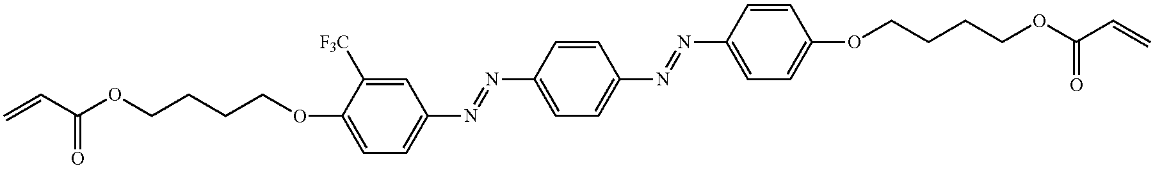

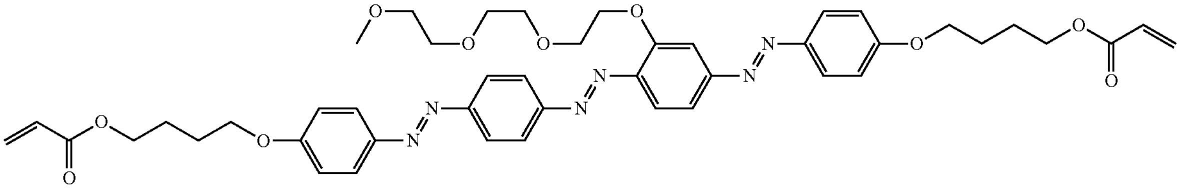

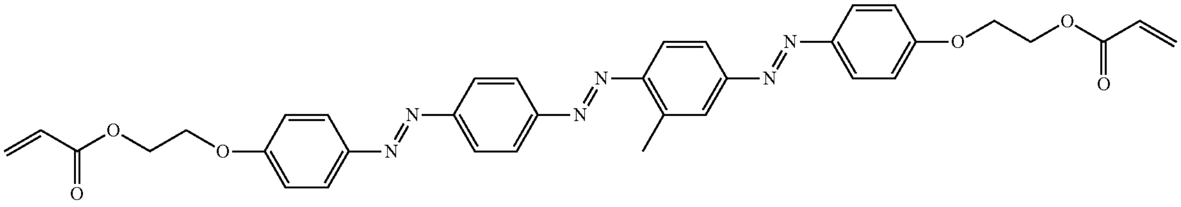

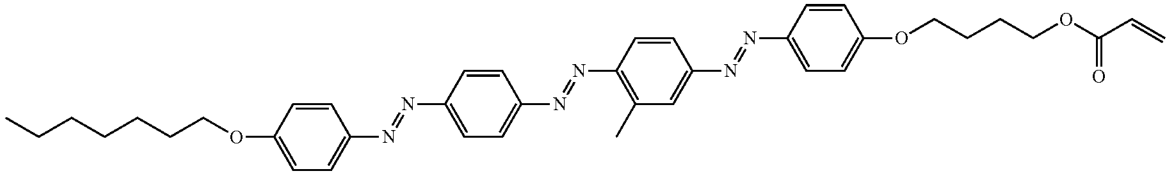

-continued

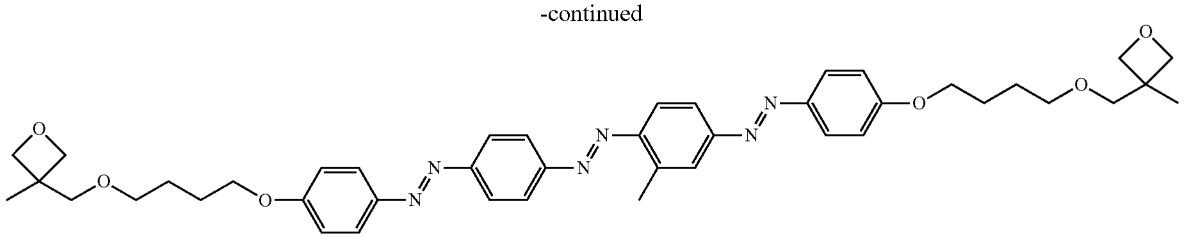

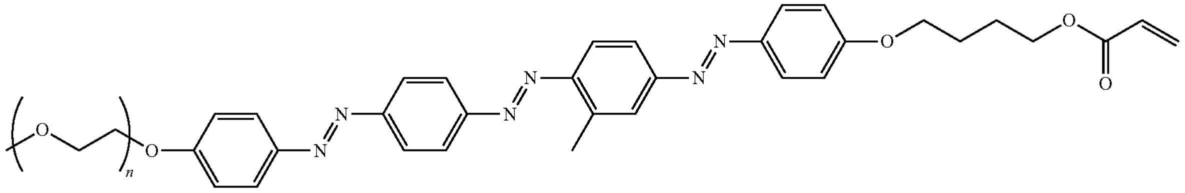

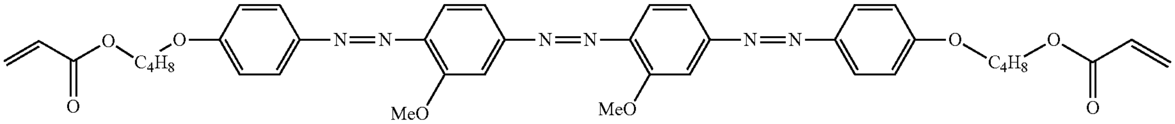

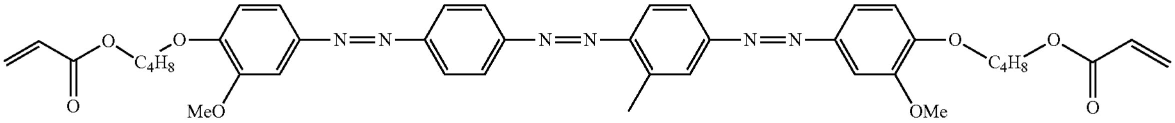

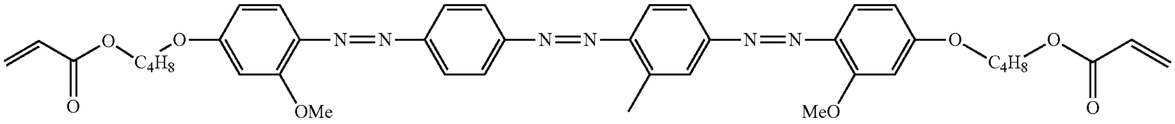

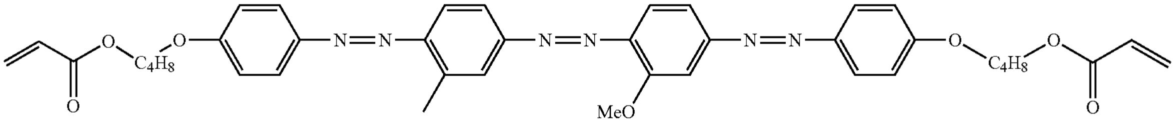

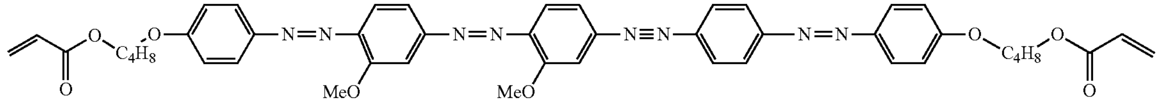

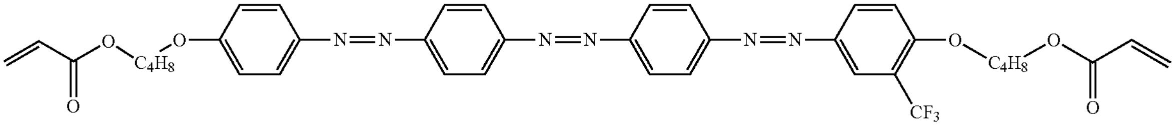

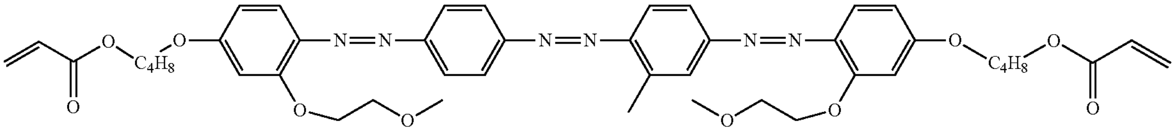

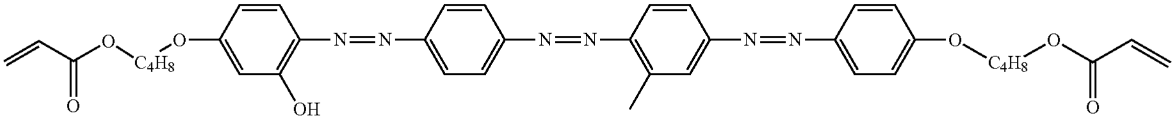

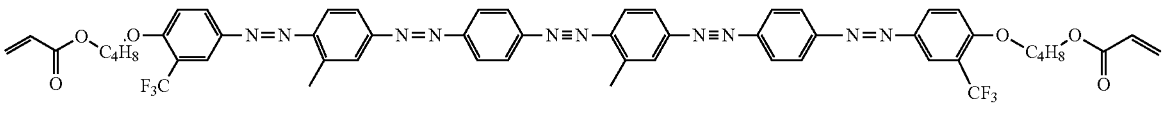

Further, it is also preferable that the third dichroic azo coloring agent has a structure having no radically polymerizable group. In a case of the structure having no radically polymerizable group, the alignment degree is excellent in a case where the measurement wavelength of the alignment degree described below is 420 nm.

Examples of the structure having no radically polymerizable group include the following structures.

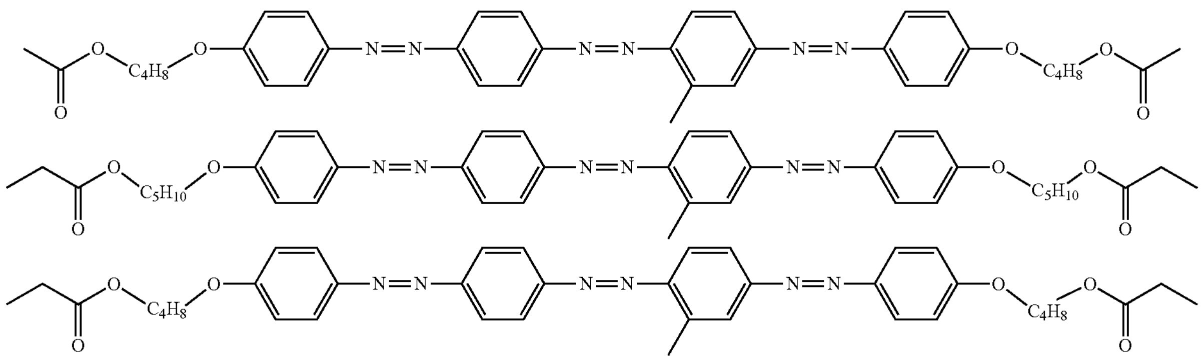

From the viewpoint that the alignment degree in a case where the measurement wavelength of the alignment degree described below is 420 nm is particularly excellent, a dichroic azo coloring agent compound having a structure represented by Formula (1-1) is more preferable as the third dichroic azo coloring agent compound.

(1-1)

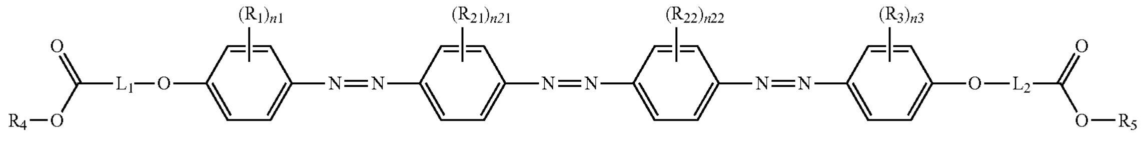

In Formula (1-1), $R_1$, $R_3$, n1, n3, $L_1$, and $L_2$ each have the same definition as that for $R_1$, $R_3$, n1, n3, $L_1$, and $L_2$ of Formula (6).

In Formula (1-1), $R_4$ and $R_5$ each have the same definition as that for the substituent W.

In Formula (1-1), $R_{21}$ and $R_{22}$ each independently have the same definition as that for $R_2$ in Formula (6).

In Formula (1-1), n21 and n22 each independently have the same definition as that for n2 in Formula (6).

An expression of "n1+n21+n22+n3>1" is satisfied, and "n1+n21+n22+n3" is preferably in a range of 1 to 9 and more preferably in a range of 1 to 5.

Specific examples of the third dichroic azo coloring agent compound are shown below, but the present invention is not limited thereto.

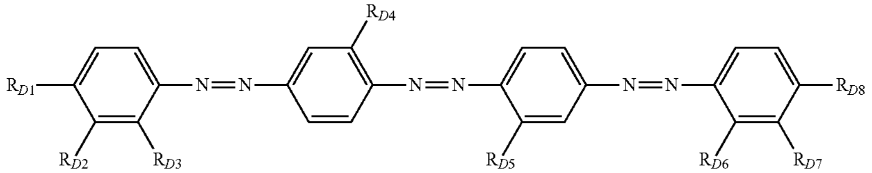

| No | $R_{D1}$ | $R_{D2}$ | $R_{D3}$ | $R_{D4}$ | $R_{D5}$ | $R_{D6}$ | $R_{D7}$ | $R_{D8}$ |
|---|---|---|---|---|---|---|---|---|
| D1 | $OC_4H_8C(O)OCH_2CH_3$ | H | H | H | $CH_3$ | H | H | $OC_4H_8C(O)OCH_2CH_3$ |
| D2 | $OC_4H_8C(O)OCH_3$ | H | H | H | $CH_3$ | H | H | $OC_4H_8C(O)OCH_3$ |
| D3 | $OC_4H_8C(O)OCH_2CH_3$ | H | H | H | $CH_3$ | H | H | $OC_{11}H_{23}$ |
| D4 | $OC_4H_8C(O)OCH_2CH_3$ | H | H | H | $CH_3$ | H | H | $OC_5H_{11}$ |
| D5 | $OC_4H_8C(O)OCH_2CH_3$ | H | H | H | $CH_3$ | H | H | $OCH_2CH_3$ |
| D6 | $OC_4H_8C(O)OCH_2CH_3$ | H | H | H | $CH_3$ | H | Cl | $OC_4H_8C(O)OCH_2CH_3$ |
| D7 | $OC_3H_6C(O)OCH_2CH_3$ | H | H | H | $CH_3$ | H | H | $OC_3H_6C(O)OCH_2CH_3$ |
| D8 | $OC_3H_6C(O)OCH_2CH_3$ | H | H | Cl | H | Cl | H | $OC_3H_6C(O)OCH_2CH_3$ |
| D9 | $OC_9H_{18}C(O)OCH_2CH_3$ | H | H | H | $CH_3$ | H | H | $OC_9H_{18}C(O)OCH_2CH_3$ |
| D10 | $OC_4H_8C(O)OCH_2CH{=}CH_2$ | H | H | H | $CH_3$ | H | H | $OC_4H_8C(O)OCH_2CH{=}CH_2$ |
| D11 | $OC_4H_8C(O)OCH_2CH_3$ | H | H | H | Cl | H | H | $OC_4H_8C(O)OCH_2CH_3$ |
| D12 | $OC_6H_4C(O)OCH_2CH_3$ | H | H | H | $CH_3$ | H | H | $OC_6H_4C(O)OCH_2CH_3$ |

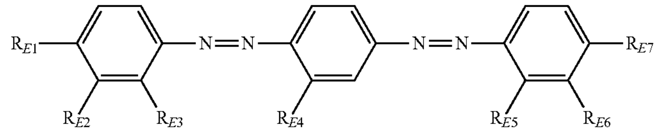

| No | $R_{E1}$ | $R_{E2}$ | $R_{E3}$ | $R_{E4}$ | $R_{E5}$ | $R_{E6}$ | $R_{E7}$ |
|---|---|---|---|---|---|---|---|
| E1 | $OC_4H_8C(O)OCH_2CH_3$ | H | H | H | H | H | $OC_4H_8C(O)OCH_2CH_3$ |
| E2 | $OC_4H_8C(O)OCH_3$ | H | H | H | H | H | $OC_4H_8C(O)OCH_3$ |
| E3 | $OC_4H_8C(O)OCH_2CH_3$ | Cl | H | H | H | Cl | $OC_4H_8C(O)OCH_2CH_3$ |
| E4 | $OC_4H_8C(O)OCH_2CH_3$ | H | H | H | H | Cl | $OC_5H_{11}$ |
| E5 | $OC_4H_8C(O)OCH_2CH_3$ | H | H | $CH_3$ | H | H | $OCH_2CH_3$ |
| E6 | $OC_3H_6C(O)OCH_2CH_3$ | H | H | H | H | H | $OC_3H_6C(O)OCH_2CH_3$ |
| E7 | $OC_9H_{18}C(O)OCH_2CH_3$ | H | H | H | H | H | $OC_9H_{18}C(O)OCH_2CH_3$ |
| E8 | $OC_4H_8C(O)OCH_2CH{=}CH_2$ | H | H | H | H | H | $OC_4H_8C(O)OCH_2CH{=}CH_2$ |

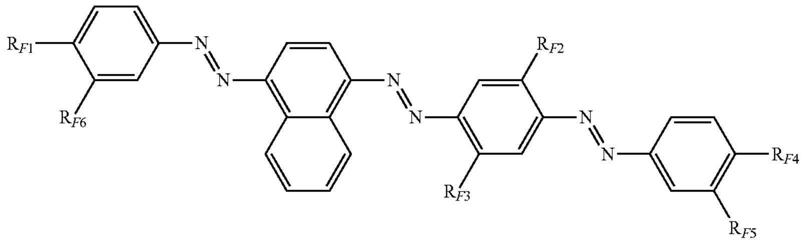

| No | $R_{F1}$ | $R_{F2}$ | $R_{F3}$ | $R_{F4}$ | $R_{F5}$ | $R_{F6}$ |
|---|---|---|---|---|---|---|
| F1 | $OC_4H_8C(O)OCH_2CH_3$ | H | H | $OC_4H_8C(O)OCH_2CH_3$ | H | H |
| F2 | $OC_4H_8C(O)OCH_3$ | H | $CH_3$ | $OC_4H_8C(O)OCH_3$ | H | H |
| F3 | $OC_3H_6C(O)OCH_2CH_3$ | H | H | $OC_3H_6C(O)OCH_2CH_3$ | H | Cl |

[Composition for Forming Light Absorption Anisotropic Layer]

It is preferable that the light absorption anisotropic layer of the optical film according to the embodiment of the present invention is, for example, formed of a composition for forming a light absorption anisotropic layer, which contains a liquid crystal compound and a dichroic substance.

The composition for forming a light absorption anisotropic layer may contain components other than the liquid crystal compound and the dichroic substance, and examples thereof include a solvent, an interface improver, a vertical alignment agent, a polymerizable component, a polymerization initiator (such as a radical polymerization initiator), and a leveling agent suitable for vertical alignment. In this case, the light absorption anisotropic layer according to the embodiment of the present invention contains a solid component other than a liquid component (such as a solvent).

Hereinafter, the components that the composition for forming the light absorption anisotropic layer may contain will be described.

Further, the examples and the preferred embodiments of the liquid crystal compound and the dichroic substance are as described above.

(Solvent)

It is preferable that the composition for forming a light absorption anisotropic layer contains a solvent.

Examples of the solvent include organic solvents such as ketones (such as acetone, 2-butanone, methyl isobutyl ketone, cyclopentanone, and cyclohexanone), ethers (such as dioxane, tetrahydrofuran, 2-methyltetrahydrofuran, cyclopentyl methyl ether, tertrahydropyran, and dioxolane), aliphatic hydrocarbons (such as hexane), alicyclic hydrocarbons (such as cyclohexane), aromatic hydrocarbons (such as benzene, toluene, xylene, and trimethylbenzene), halogenated carbons (such as dichloromethane, trichloromethane, dichloroethane, dichlorobenzene, and chlorotoluene), esters (such as methyl acetate, ethyl acetate, butyl acetate, and ethyl lactate), alcohols (such as ethanol, isopropanol, butanol, cyclohexanol, isopentyl alcohol, neopentyl alcohol, diacetone alcohol, and benzyl alcohol), cellosolves (such as methyl cellosolve, ethyl cellosolve, and 1,2-dimethoxyethane), cellosolve acetates, sulfoxides (such as dimethyl sulfoxide), amides (such as dimethylformamide, dimethylacetamide, N-methylpyrrolidone, and N-ethylpyrrolidone), and heterocyclic compounds (such as pyridine), and water. These solvents may be used alone or in combination of two or more kinds thereof.

Among these solvents, ketones (particularly cyclopentanone and cyclohexanone), ethers (particularly tetrahydrofuran, cyclopentyl methyl ether, tetrahydropyran, and dioxolane), alcohols (particularly benzyl alcohol), and amides (particularly dimethylformamide, dimethylacetamide, N-methylpyrrolidone, and N-ethylpyrrolidone) are preferable.

In a case where the liquid crystal composition contains a solvent, the content of the solvent is preferably in a range of 80% to 99% by mass, more preferably in a range of 83% to 98% by mass, and still more preferably in a range of 85% to 96% by mass with respect to the total mass of the liquid crystal composition.

In a case where the liquid crystal composition contains two or more kinds of solvents, the content of the solvent indicates the total content of the solvents.

(Interface Improver)

It is preferable that the composition for forming a light absorption anisotropic layer contains an interface improver.

As the interface improver, the interface improver described in the columns of the examples described below can be used.

In a case where the composition for forming a light absorption anisotropic layer contains an interface improver, the content of the interface improver is preferably in a range of 0.001 to 5 parts by mass with respect to 100 parts by mass of the total amount of the dichroic coloring agent compound and the liquid crystal compound in the composition for forming a light absorption anisotropic layer.

amide group, a styryl group, a vinyl ketone group, a butadiene group, a vinyl ether group, an oxiranyl group, an aziridinyl group, or an oxetane group. Among these, a vinyl group, an acrylate group, a methacrylate group, a styryl group, an oxiranyl group, or an oxetane group is preferable, and a vinyl group, an acrylate group, an acrylamide group, or a styryl group is more preferable.

Specific examples of the boronic acid compound include a boronic acid compound represented by General Formula (I) described in paragraphs [0023] to [0032] of JP2008-225281A.

As the boronic acid compound, compounds shown below are also preferable.

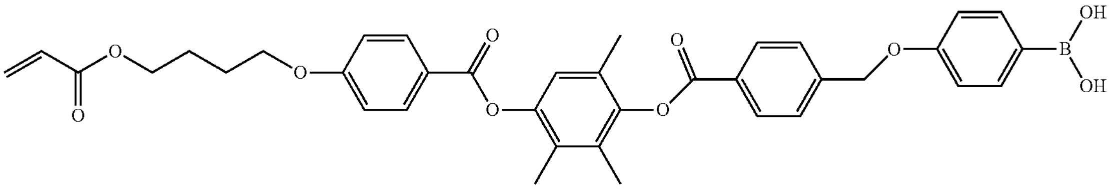

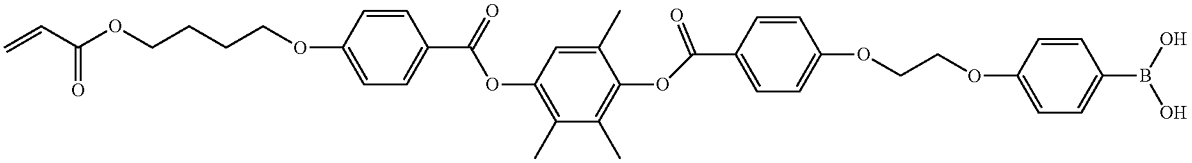

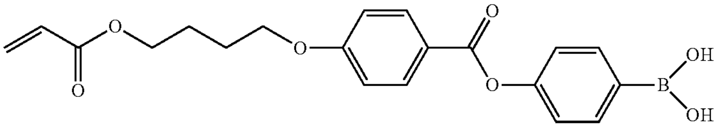

(Vertical Alignment Agent)

It is preferable that the composition for forming a light absorption anisotropic layer contains a vertical alignment agent.

The vertical alignment agent denotes a substance having an action of vertically aligning a dichroic substance.

Examples of the vertical alignment agent include a boronic acid compound and an onium salt.

As the boronic acid compound, a compound represented by Formula (30) is preferable.

Formula (30)

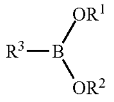

In Formula (30), $R_1$ and $R_2$ each independently represent a hydrogen atom, a substituted or unsubstituted aliphatic hydrocarbon group, a substituted or unsubstituted aryl group, or a substituted or unsubstituted heterocyclic group.

$R_3$ represents a substituent containing a functional group that can be bonded to a (meth)acrylic group. It is preferable that $R_3$ represents a substituted or unsubstituted aliphatic hydrocarbon group, aryl group, or heterocyclic group containing a functional group that can be bonded to a (meth) acrylic group.

Examples of the functional group that can be bonded to an acrylic group include a polymerizable group such as a vinyl group, an acrylate group, a methacrylate group, an acryl- As the onium salt, a compound represented by Formula (31) is preferable.

Formula (31)

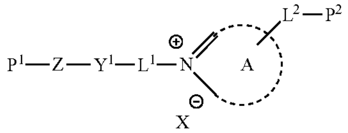

In Formula (31), the ring A represents a quaternary ammonium ion consisting of a nitrogen-containing heterocyclic ring. X represents an anion. $L^1$ represents a divalent linking group. $L^2$ represents a single bond or a divalent linking group. $Y^1$ represents a divalent linking group having a 5- or 6-membered ring as a partial structure. Further, Z represents a divalent linking group containing an alkylene group having 2 to 20 carbon atoms as a partial structure. Further, $P^1$ and $P^2$ each independently represent a monovalent substituent having a polymerizable ethylenically unsaturated bond.

Specific examples of the onium salt include the onium salts described in paragraphs 0052 to 0058 of JP2012-208397A, the onium salts described in paragraphs 0024 to 0055 of JP2008-026730A, and the onium salts described in JP2002-37777A.

The content of the vertical alignment agent in the composition for forming a light absorption anisotropic layer is preferably in a range of 0.1% to 400% by mass and more preferably in a range of 0.5% to 350% by mass with respect to the total mass of the liquid crystal compound.

The vertical alignment agent may be used alone or in combination of two or more kinds thereof. In a case where two or more kinds of vertical alignment agents are used, the total amount thereof is preferably in the above-described ranges.

—Leveling Agent Suitable for Vertical Alignment—

In a case where the dichroic substance is vertically aligned using the composition for forming a light absorption anisotropic layer which contains a vertical alignment agent, it is preferable that the composition for forming a light absorption anisotropic layer contains the following leveling agent. In a case where the composition for forming a light absorption anisotropic layer contains a leveling agent, the surface roughness due to dry air applied to the surface of the light absorption anisotropic layer is suppressed, and the dichroic substance is more uniformly aligned.

The leveling agent is not particularly limited, and a leveling agent having a fluorine atom (fluorine-based leveling agent) or a leveling agent having a silicon atom (silicon-based leveling agent) is preferable, and a fluorine-based leveling agent is more preferable.

Examples of the fluorine-based leveling agent include fatty acid esters of polyvalent carboxylic acids in which a part of a fatty acid is substituted with a fluoroalkyl group and polyacrylates having a fluoro substituent. Particularly in a case where a rod-like compound is used as the dichroic substance and the liquid crystal compound, a leveling agent having a repeating unit derived from a compound represented by Formula (40) is preferable from the viewpoint of promoting the vertical alignment of the dichroic substance and the liquid crystal compound.

Formula (40)

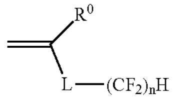

$R^0$ represents a hydrogen atom, a halogen atom, or a methyl group.

L represents a divalent linking group. It is preferable that L represents an alkylene group having 2 to 16 carbon atoms, and optional $—CH_2—$ that is not adjacent to the alkylene group may be substituted with —O—, —COO—, —CO—, or —CONH—.

n represents an integer of 1 to 18.

The leveling agent having a repeating unit derived from a compound represented by Formula (40) may further have other repeating units.

Examples of the other repeating units include a repeating unit derived from a compound represented by Formula (41).

Formula (41)

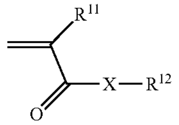

$R^{11}$ represents a hydrogen atom, a halogen atom, or a methyl group.

X represents an oxygen atom, a sulfur atom, or $—N(R^{13})—$. $R^{13}$ represents a hydrogen atom or an alkyl group having 1 to 8 carbon atoms.

$R^{12}$ represents a hydrogen atom, an alkyl group which may have a substituent, or an aromatic group which may have a substituent. Further, the number of carbon atoms of the alkyl group is preferably in a range of 1 to 20. The alkyl group may be any of linear, branched, or cyclic.

Further, examples of the substituent that the alkyl group may have include a poly(alkyleneoxy) group and a polymerizable group. Examples of the polymerizable group are as described above.

In the case where the leveling agent has a repeating unit derived from a compound represented by Formula (40) and a repeating unit derived from a compound represented by Formula (41), the content of the repeating unit derived from the compound represented by Formula (40) is preferably in a range of 10% to 95% by mole and more preferably in a range of 15% to 90% by mole with respect to all the repeating units of the leveling agent.

In the case where the leveling agent has a repeating unit derived from a compound represented by Formula (40) and a repeating unit derived from a compound represented by Formula (41), the content of the repeating unit derived from the compound represented by Formula (41) is preferably in a range of 10% to 90% by mole and more preferably in a range of 20% to 80% by mole with respect to all the repeating units of the leveling agent.

Further, examples of the leveling agent include a leveling agent having a repeating unit derived from a compound represented by Formula (42) in place of the repeating unit derived from a compound represented by Formula (40).

Formula (42)

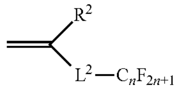

$R^2$ represents a hydrogen atom, a halogen atom, or a methyl group.

$L^2$ represents a divalent linking group.

n represents an integer of 1 to 18.

Specific examples of the leveling agent include the compounds described in paragraphs 0046 to 0052 of JP2004-331812A and the compounds described in paragraphs 0038 to 0052 of JP2008-257205A.

The content of the leveling agent in the composition is preferably in a range of 0.001% to 10% by mass and more preferably in a range of 0.01% to 5% by mass with respect to the total mass of the liquid crystal compound.

The leveling agent may be used alone or in combination of two or more kinds thereof. In a case where two or more leveling agents are used, it is preferable that the total amount thereof is in the above-described ranges.

(Polymerizable Component)

It is preferable that the composition for forming a light absorption anisotropic layer contains a polymerizable component.

Examples of the polymerizable component include a compound containing an acrylate (such as an acrylate monomer). In this case, the light absorption anisotropic layer according to the embodiment of the present invention contains a polyacrylate obtained by polymerizing the compound containing an acrylate. Specific examples thereof include the compounds described in paragraph 0058 of JP2017-122776A.

In a case where the composition for forming a light absorption anisotropic layer contains a polymerizable component, the content of the polymerizable component is preferably in a range of 3 to 20 parts by mass with respect to 100 parts by mass of the total amount of the dichroic substance and the liquid crystal compound in the composition for forming a light absorption anisotropic layer.

(Polymerization Initiator)

It is preferable that the composition for forming a light absorption anisotropic layer contains a polymerization initiator.

The polymerization initiator is not particularly limited, but a compound having photosensitivity, that is, a photopolymerization initiator is preferable.

As the photopolymerization initiator, various compounds can be used without any particular limitation. Examples of the photopolymerization initiator include α-carbonyl compounds (U.S. Pat. Nos. 2,367,661A and 2,367,670A), acyloin ether (U.S. Pat. No. 2,448,828A), α-hydrocarbon-substituted aromatic acyloin compounds (U.S. Pat. No. 2,722,512A), polynuclear quinone compounds (U.S. Pat. Nos. 3,046,127A and 2,951,758A), a combination of a triarylimidazole dimer and a p-aminophenyl ketone (U.S. Pat. No. 3,549,367A), acridine and phenazine compounds (JP1985-105667A (JP-S60-105667A) and U.S. Pat. No. 4,239,850A), oxadiazole compounds (U.S. Pat. No. 4,212,970A), o-acyloxime compounds (paragraph [0065] of JP2016-27384A), and acylphosphine oxide compounds (JP1988-40799B (JP-S63-40799B), JP1993-29234B (JP-H5-29234B), JP1998-95788A (JP-H10-95788A), and JP1998-29997A (JP-H10-29997A)).

A commercially available product can also be used as such a photopolymerization initiator, and examples thereof include IRGACURE 184, IRGACURE 907, IRGACURE 369, IRGACURE 651, IRGACURE 819, IRGACURE 2959, IRGACURE OXE-01, and IRGACURE OXE-02 (all manufactured by BASF SE).

In a case where the composition for forming a light absorption anisotropic layer contains a polymerization initiator, the content of the polymerization initiator is preferably in a range of 0.01 to 30 parts by mass and more preferably in a range of 0.1 to 15 parts by mass with respect to 100 parts by mass of the total amount of the dichroic substance and the polymer liquid crystal compound in the composition for forming a light absorption anisotropic layer. The durability of the light absorption anisotropic film is enhanced in a case where the content of the polymerization initiator is 0.01 parts by mass or greater, and the alignment degree of the dichroic substance in the light absorption anisotropic layer is further enhanced in a case where the content thereof is 30 parts by mass or less.

The polymerization initiator may be used alone or in combination of two or more kinds thereof. In a case where the composition contains two or more kinds of polymerization initiators, it is preferable that the total amount of the polymerization initiators is in the above-described ranges.

(Content of Dichroic Substance)

The content of the dichroic substance is preferably in a range of 10% to 30% by mass, more preferably in a range of 15% to 30% by mass, still more preferably in a range of 18% to 28% by mass, and particularly preferably in a range of 20% to 26% by mass with respect to the total mass of the solid content of the light absorption anisotropic layer. The total mass of the solid content denotes the mass obtained by subtracting the mass of a solvent component from the mass of the composition for forming a light absorption anisotropic layer.

In a case where the content of the dichroic substance is in the above-described ranges, a light absorption anisotropic layer having a high alignment degree can be obtained even in a case where the light absorption anisotropic layer is formed into a thin film. Therefore, a light absorption anisotropic layer having excellent flexibility is likely to be obtained.

The content of the first dichroic azo coloring agent compound is preferably in a range of 40 to 90 parts by mass and more preferably in a range of 45 to 75 parts by mass with respect to 100 parts by mass of the total content of the dichroic substances.

The content of the second dichroic azo coloring agent compound is preferably in a range of 6 to 50 parts by mass and more preferably in a range of 8 to 35 parts by mass with respect to 100 parts by mass of the total content of the dichroic substances.

The content of the third dichroic azo coloring agent compound is preferably in a range of 3 to 50 parts by mass and more preferably in a range of 5 to 40 parts by mass with respect to 100 parts by mass of the content of the dichroic azo coloring agent compounds.

The content ratio between the first dichroic azo coloring agent compound, the second dichroic azo coloring agent compound, and the third dichroic azo coloring agent compound used as necessary can be optionally set in order to adjust the tint of the light absorption anisotropic layer. Here, the content ratio of the second dichroic azo coloring agent compound to the first dichroic azo coloring agent compound (second dichroic azo coloring agent compound/first dichroic azo coloring agent compound) is preferably in a range of 0.1 to 10, more preferably in a range of 0.2 to 5, and still more preferably in a range of 0.3 to 0.8 in terms of moles. In a case where the content ratio of the second dichroic azo coloring agent compound to the first dichroic azo coloring agent compound is in the above-described ranges, the alignment degree is increased.

[Properties of Light Absorption Anisotropic Layer]

The transmittance of the light absorption anisotropic layer according to the embodiment of the present invention at an angle inclined by 300 from the transmittance central axis (hereinafter, referred to as the transmittance at a wavelength of 550 nm unless otherwise specified) is preferably 60% or less, more preferably 40% or less, and still more preferably 20% or less. In this manner, the contrast of the illuminance between the direction of the transmittance central axis and the direction deviated from the transmittance central axis can be increased, and thus the viewing angle can be sufficiently narrowed.

The transmittance of the transmittance central axis of the light absorption anisotropic layer used in the present invention is preferably 65% or greater, more preferably 75% or greater, and still more preferably 85% or greater. The upper limit thereof is not particularly limited and may be less than 100%. In a case where the transmittance is in the above-described ranges, the illuminance at the center of the viewing angle of the image display device formed of the light absorption anisotropic layer can be increased, and thus the visibility can be enhanced.

For the purpose of decreasing the illuminance of the peripheral portion as much as possible without decreasing the illuminance at the center of the viewing angle in the liquid crystal display device according to the embodiment of the present invention, the alignment degree measured at a wavelength of 550 nm of the light absorption anisotropic layer is preferably 0.80 or greater, more preferably 0.90 or greater, and still more preferably 0.95 or greater.

Here, the alignment degree measured at a wavelength of X nm is defined as follows in the present specification.

In the measurement, the Mueller matrix at a wavelength of 550 nm at each polar angle is measured while the polar angle which is the angle with respect to the normal direction of the light absorption anisotropic layer is changed for every 5° from 0° to 90° using AxoScan OPMF-1 (manufactured by Opto Science, Inc.), and the minimum transmittance (Tmin) is derived. Next, after removal of the influence of surface reflection, Tmin at a polar angle at which Tmin is highest is defined as Tm (0), and Tmin in a direction in which the polar angle is further increased by 40° from the polar angle at which Tmin is highest is defined as Tm (40). The absorbance is calculated by the following equation based on the obtained Tm (0) and Tm (40), and A (0) and A (40) are calculated.

$$A = -\log(Tm)$$

Here, Tm represents the transmittance and A represents the absorbance.

An alignment degree S at a wavelength of 550 nm defined by the following equation is calculated based on the calculated A (0) and A (40).

$$S = (4.6 \times A(40) - A(0))/(4.6 \times A(40) + 2 \times A(0))$$

By changing the wavelength from 550 nm to 420 nm or 650 nm, the alignment degrees S at a wavelength of 420 nm and at a wavelength of 650 nm are calculated.

The optical film formed of the light absorption anisotropic layer according to the embodiment of the present invention can increase the transmittance of the transmittance central axis and can decrease the transmittance in a direction deviated from the transmittance central axis. The reason for this is assumed as follows.

The transmittance in a direction deviated from the transmittance central axis can be decreased by increasing the thickness of the light absorption anisotropic layer, but the transmittance of the transmittance central axis is decreased at the same time. Here, in a case where the alignment degree measured at a wavelength of 550 nm is 0.95 or greater, the dichroic substance is considered to mainly contribute to the alignment degree measured at a wavelength of 550 nm, and thus the frequency of presence is considered to decrease even though the absorption axis of the dichroic substance is deviated from the transmittance central axis. In this manner, the transmittance in the transmittance central axis direction is assumed to be increased as a result of suppression of absorption due to the dichroic substance as viewed from the transmittance central axis.

In addition, it is preferable that the light absorption anisotropic layer satisfies both Expression (1) and Expression (2).

$$S_P(420\text{ nm}) < S_P(550\text{ nm}) \quad \text{Expression (1)}$$

$$S_P(420\text{ nm}) < S_P(650\text{ nm}) \quad \text{Expression (2)}$$

Here, $S_P$ (λ) represents the alignment degree of the light absorption anisotropic layer measured at a wavelength of λ nm.

The thickness of the light absorption anisotropic layer is not particularly limited, but is preferably in a range of 100 to 8000 nm and more preferably in a range of 300 to 5000 nm from the viewpoint of the flexibility in a case where the optical laminate according to the embodiment of the present invention described below is used in a polarizer.

[Method of Forming Light Absorption Anisotropic Layer]

A method of forming the light absorption anisotropic layer is not particularly limited, and examples thereof include a method of sequentially performing a step of applying a composition for forming a light absorption anisotropic layer to form a coating film (hereinafter, also referred to as "coating film forming step") and a step of aligning the liquid crystal component and the dichroic substance contained in the coating film (hereinafter, also referred to as "aligning step").

Further, the liquid crystal component is a component that also includes a dichroic substance having liquid crystallinity in a case where the above-described dichroic substance has liquid crystallinity, in addition to the above-described liquid crystal compound.

As a technique for aligning an organic dichroic coloring agent as desired, a technique for preparing a polarizer formed of an organic dichroic coloring agent, a technique for preparing a guest-host liquid crystal cell, and the like can be referred to. For example, techniques used in the method of preparing a dichroic polarizer described in JP1999-305036A (JP-H11-305036A) or JP2002-90526A and the method of preparing a guest-host type liquid crystal display device described in JP2002-99388A or JP2016-27387A can be used for preparation of the light absorption anisotropic layer used in the present invention.

For example, molecules of the organic dichroic coloring agent can be desirably aligned as described above in association with the alignment of host liquid crystals using the technique of the guest-host type liquid crystal cell. Specifically, the light absorption anisotropic layer used in the present invention can be prepared by mixing an organic dichroic coloring agent serving as a guest and a rod-like liquid crystal compound serving as a host liquid crystal, aligning the host liquid crystal, aligning molecules of the organic dichroic coloring agent along the alignment of the liquid crystal molecules, and fixing the alignment state.

It is preferable that the alignment of the organic dichroic coloring agent is fixed by forming a chemical bond in order to prevent fluctuation of the light absorption characteristics of the light absorption anisotropic layer used in the present invention depending on the use environment. For example, the alignment can be fixed by advancing polymerization of the host liquid crystal, the organic dichroic coloring agent, or a polymerizable component added as desired.

Further, the guest-host type liquid crystal cell having a liquid crystal layer that contains at least an organic dichroic coloring agent and a host liquid crystal on a pair of substrates may be used as the light absorption anisotropic layer used in the present invention. The alignment of the host liquid crystal (the alignment of the organic dichroic coloring agent molecules in association of the alignment of the host liquid crystal) is made such that the alignment state thereof is maintained as long as the alignment can be controlled by the alignment film formed on the inner surface of the substrate and an external stimulus such as an electric field is not applied, and the light absorption characteristics of the light absorption anisotropic layer used in the present invention can be set to be constant.

Further, a polymer film that satisfies the light absorption characteristics required for the light absorption anisotropic layer used in the present invention can be prepared by allowing the organic dichroic coloring agent to permeate into the polymer film and aligning the organic dichroic coloring agent along the alignment of the polymer molecules in the polymer film. Specifically, the polymer film can be prepared by coating a surface of the polymer film with a solution of an organic dichroic coloring agent and allowing the solution to permeate into the film. The alignment of the organic dichroic coloring agent can be adjusted by the alignment of a polymer chain in the polymer film, the properties thereof (chemical and physical properties of the polymer chain, a functional group of the polymer chain, and the like), the coating method, and the like. The details of this method are described in JP2002-90526A.

Hereinafter, the coating film forming step, the aligning step, and other steps will be described below.

(Coating Film Forming Step)

The coating film forming step is a step of applying a composition for forming a light absorption anisotropic layer to form a coating film.

The composition for forming a light absorption anisotropic layer can be easily applied by using the composition for forming a light absorption anisotropic layer which contains the above-described solvent or using a liquid material such as a melt obtained by heating the composition for forming a light absorption anisotropic layer.

Examples of the coating method for the composition for forming a light absorption anisotropic layer include known methods such as a roll coating method, a gravure printing method, a spin coating method, a wire bar coating method, an extrusion coating method, a direct gravure coating method, a reverse gravure coating method, a die coating method, a spraying method, and an ink jet method.

(Aligning Step)

The aligning step is a step of aligning the liquid crystal component contained in the coating film. In this manner, a light absorption anisotropic layer is obtained. The aligning step may include a drying treatment, a heat treatment, and a cooling treatment. Hereinafter, each of the above-described treatments will be described.

The aligning step may include a drying treatment. The components such as a solvent can be removed from the coating film by performing the drying treatment. The drying treatment may be performed according to a method of allowing the coating film to stand at room temperature for a predetermined time (for example, natural drying) or a method of heating the coating film and/or blowing air to the coating film.

Here, the liquid crystal component contained in the composition for forming a light absorption anisotropic layer may be aligned by the coating film forming step or the drying treatment described above. For example, in an aspect in which the composition for forming a light absorption anisotropic layer is prepared as a coating solution containing a solvent, a coating film having light absorption anisotropy (that is, a light absorption anisotropic film) is obtained by drying the coating film and removing the solvent from the coating film.

In a case where the drying treatment is performed at a temperature higher than or equal to the transition temperature of the liquid crystal component contained in the coating film to the liquid crystal phase, the heat treatment described below may not be performed.

The transition temperature of the liquid crystal component contained in the coating film to the liquid crystal phase is preferably in a range of 10° C. to 250° C. and more preferably in a range of 25° C. to 190° C. from the viewpoint of the manufacturing suitability or the like. It is preferable that the transition temperature is 10° C. or higher from the viewpoint that a cooling treatment or the like for lowering the temperature to a temperature range in which a liquid crystal phase is exhibited is not necessary. Further, it is preferable that the transition temperature is 250° C. or lower from the viewpoint that a high temperature is not required even in a case of setting an isotropic liquid state at a temperature higher than the temperature range in which a liquid crystal phase is temporarily exhibited, and waste of thermal energy and deformation and deterioration of a substrate can be reduced.

It is preferable that the aligning step includes a heat treatment. In this manner, since the liquid crystal component contained in the coating film can be aligned, the coating film after being subjected to the heat treatment can be suitably used as the light absorption anisotropic film.

From the viewpoint of the manufacturing suitability, the heat treatment is performed at a temperature of preferably 10° C. to 250° C. and more preferably 25° C. to 190° C. Further, the heating time is preferably in a range of 1 to 300 seconds and more preferably in a range of 1 to 60 seconds.

The aligning step may include a cooling treatment performed after the heat treatment. The cooling treatment is a treatment of cooling the coating film after being heated to room temperature (20° C. to 25° C.). In this manner, the alignment of the liquid crystal component contained in the coating film can be fixed. The cooling means is not particularly limited and can be performed according to a known method.

The light absorption anisotropic film can be obtained by performing the above-described steps.

In the present aspect, examples of the method of aligning the liquid crystal component contained in the coating film include a drying treatment and a heat treatment, but the method is not limited thereto, and the liquid crystal component can be aligned by a known alignment treatment.

(Other Steps)

The method of forming the light absorption anisotropic layer may include a step of curing the light absorption anisotropic layer after the aligning step (hereinafter, also referred to as a "curing step").

The curing step is performed by heating the light absorption anisotropic layer and/or irradiating the layer with light (exposing the layer to light), for example, in a case where the light absorption anisotropic layer contains a crosslinkable group (polymerizable group). Between these, it is preferable that the curing step is performed by irradiating the film with light.

Various light sources such as infrared rays, visible light, and ultraviolet rays can be used as the light source for curing, but ultraviolet rays are preferable. In addition, ultraviolet rays may be applied while the layer is heated during curing, or ultraviolet rays may be applied through a filter that transmits only a specific wavelength.

In a case where the exposure is performed while the layer is heated, the heating temperature during the exposure depends on the transition temperature of the liquid crystal components contained in the liquid crystal film to a liquid crystal phase, but is preferably in a range of 250 to 140° C.

Further, the exposure may be performed under a nitrogen atmosphere. In a case where the curing of the liquid crystal film proceeds by radical polymerization, from the viewpoint of reducing inhibition of polymerization by oxygen, it is preferable that exposure is performed in a nitrogen atmosphere.

The thickness of the light absorption anisotropic layer is not particularly limited, but is preferably in a range of 100 to 8000 nm and more preferably in a range of 300 to 5000 nm from the viewpoint of the flexibility in a case where the laminate according to the embodiment of the present invention is used in a polarizer.

(Patterning of Light Absorption Anisotropic Layer)

The light absorption anisotropic layer according to the embodiment of the present invention may be a light absorption anisotropic layer which has a region A and a region B in a plane and in which the oblique transmittances as viewed at a polar angle of 300 of the region A and at a polar angle of 300 of the region B (hereinafter, referred to as a polar angle 300 transmittance) are different from each other. In this case, it is preferable that the light absorption anisotropic layer is formed such that the polar angle 300 transmittance of the region A is 10% or less and the polar angle 300 transmittance of the region B is 80% or greater.

The viewing angle dependence in the above-described regions can be strengthened or weakened by performing patterning. In this manner, highly confidential information can also be displayed only in the region where the viewing angle dependence is strengthened. Further, design with excellent designability can be carried out by freely controlling the viewing angle dependence as a display device. In order to prevent light leakage from a light emitting unit to a peripheral region in a display device such as a LED, the contrast of lightness and darkness in a screen can be increased by performing patterning such that a region other than the light emitting unit is set as a region with a high polar angle 300 transmittance and the light emitting unit is set as a region with a low polar angle 30° transmittance.

—Pattern Forming Method—

As described above, the method of forming a patterned light absorption anisotropic layer having two or more different regions in a plane is not particularly limited, and various known methods as described in, for example, WO2019/176918A can be used. Examples thereof include a method of controlling the thickness of a patterned light absorption anisotropic layer in a plane, a method of unevenly distributing a dichroic coloring agent compound in a patterned light absorption anisotropic layer, and a method of post-processing an optically uniform patterned light absorption anisotropic layer.

Examples of the method of controlling the thickness of the patterned light absorption anisotropic layer in a plane include a method of using lithography, a method of using imprinting, and a method of forming a patterned light absorption anisotropic layer on a base material having an uneven structure. Examples of the method of unevenly distributing a dichroic coloring agent compound in a patterned light absorption anisotropic layer include a method of extracting a dichroic coloring agent compound by solvent immersion (bleaching). Further, examples of the method of post-processing an optically uniform patterned light absorption anisotropic layer include a method of cutting a part of a flat light absorption anisotropic layer by laser processing or the like.

[Tint Adjusting Layer]

The optical film according to the embodiment of the present invention includes a tint adjusting layer containing at least one organic coloring agent compound.

Hereinafter, the description (principle of tint adjustment) of obtaining an optical film with an excellent property of suppressing a wide-angle tint using the tint adjusting layer will be made, and the organic coloring agent compound contained in the tint adjusting layer and the properties of the tint adjusting layer will be described in detail.

(Principle of Tint Adjustment)

The tint of the optical film containing the dichroic substance is typically controlled by adjusting the addition amount and/or the addition amount ratio of the dichroic substance contained in the film. However, in a case where the alignment degree calculated by the wavelength changes, an optical film with an excellent property of suppressing a wide-angle tint is difficult to obtain only by adjusting the addition amount and/or the addition amount ratio of the dichroic substance.

For example, in a case where the dichroic substance having a thienothiazole skeleton is used, the dichroic substance may have different absorption wavelengths in a plurality of directions, and as a result, a problem of a decrease in the alignment degree measured at a wavelength outside the main absorption wavelength range of the dichroic substance may occur.

Specifically, for example, in a case where a dichroic coloring agent compound having a thienothiazole skeleton is used for the light absorption anisotropic layer, the alignment degree measured in a short wavelength range decreases, and thus the relationships of Expression (1) and Expression (2) are easily satisfied in a case where the alignment degree measured at each wavelength is defined as S (λ).

In a case where the relationships of Expression (1) and Expression (2) are satisfied, since $S_P$ (420 nm) is less than $S_P$ (550 nm) and $S_P$ (650 nm), the alignment degree only in a short wavelength range is apparently low. Here, for example, even in a case where a plurality of dichroic substances are blended and the tint as viewed in the transmittance central axis direction is neutralized, the tint as viewed in an oblique direction is not neutralized. That is, in a case where the relationships of Expression (1) and Expression (2) are satisfied, an optical film with an excellent property of suppressing a wide-angle tint is difficult to obtain only by adjusting the addition amount and/or the addition amount ratio of the dichroic substance in the optical film.

In addition, in a case where the optical film contains a plurality of dichroic substances, the alignment degree calculated by the wavelength at which the alignment degree is measured may change even in a case where the ease of alignment of each dichroic substance in the optical film varies, and thus an optical film with an excellent property of suppressing a wide-angle tint is difficult to obtain only by adjusting the addition amount and/or the addition amount ratio of the dichroic substance in the optical film.

In the present invention, a change in tint as viewed in an oblique direction of the transmittance central axis may increase in a case where the tint in the transmittance central axis direction is neutralized by adjusting the addition amount and/or the addition amount ratio of the dichroic substance in the light absorption anisotropic layer. Here, it is considered that a change in tint as viewed in the transmittance central axis direction and a change in tint as viewed in an oblique direction are easily suppressed by adjusting the addition amount and/or the addition amount ratio of the dichroic substance and adjusting the tint using a tint adjusting layer satisfying any one of the following requirements 1 to 3, that is, an optical film with a further enhanced property of suppressing a wide-angle tint can be obtained.

Here, in a case where the tint adjusting layer satisfies any one of the following requirements 1 to 3, the tint adjusting layer has a small change in tint as viewed in the transmittance central axis direction and a small change in tint as viewed in an oblique direction so that the changes in tint of the light absorption anisotropic layer are offset, and as a result, an optical film with a more enhanced property of suppressing a wide-angle tint is considered to be obtained.

Requirement 1: $S_C$(420 nm)<0.1

Requirement 2: $S_C$(550 nm)<0.1

Requirement 3: $S_C$(650 nm)<0.1

Here, $S_C$ ($\lambda$ nm) represents the alignment degree of the tint adjusting layer, which is measured at a wavelength of $\lambda$ nm.

(Organic Coloring Agent Compound Contained in Tint Adjusting Layer)

The tint adjusting layer contains at least one organic coloring agent compound.

Examples of the structure of the coloring agent compound contained in the tint adjusting layer include an azo structure, a methine structure, an anthraquinone structure, a triarylmethane structure, an oxazine structure, an azomethine structure, a phthalocyanine structure, a porphyrin structure, a perylene structure, a pyrrolopyrrole structure, and a squarylium structure. Here, from the viewpoint that the absorption waveform, the heat resistance, and the light resistance are excellent, a methine structure, an azomethine structure, an azo structure, a phthalocyanine structure, or an anthraquinone structure is preferable, a compound having an azo structure, a phthalocyanine structure, or an anthraquinone structure is more preferable, and a compound having an anthraquinone structure is still more preferable.

Specific examples of the compound having the above-described structure include coloring agent compounds described in "Functional Dyes", co-written by Shin Okawara, Ken Matsuoka, Tsuneaki Hirashima, and Teijiro Kitao (Kodansha Ltd., 1992), and "Electronics Materials", supervised by Sumio Tokita (CMC, Publishing Co., Ltd., 1998).

Further, it is also preferable that the coloring agent compound contained in the tint adjusting layer has at least one structure of a benzene ring or a heterocyclic ring in a molecule.

As a structure having a benzene ring, a part of the structure may have a benzene ring. Examples of the structure having a benzene ring include a benzene ring, a naphthalene ring, an anthracene ring, a phenanthrene ring, a fluorene ring, a pyrene ring, an anthraquinone structure, an oxazine structure, a phthalocyanine structure, a porphyrin structure, and a perylene structure.

Examples of the structure having a heterocyclic ring include a cyclic structure having heteroatoms other than a carbon atom. The structure having a heterocyclic ring may or may not have aromaticity, but it is preferable that the structure has aromaticity. Examples of the structure having a heterocyclic ring include a pyrrole ring, a furan ring, a thiophene ring, an imidazole ring, a pyrazole ring, an oxazole ring, a benzoimidazole ring, an indole ring, a purine ring, a benzotriazole ring, an oxazine structure, a phthalocyanine structure, and a porphyrin structure.

The absorption peak wavelength of the coloring agent compound contained in the tint adjusting layer used in the present invention is preferably in a range of 500 to 650 nm and more preferably in a range of 550 to 600 nm. The tint of the optical film according to the embodiment of the present invention can be adjusted to be more neutral by setting the absorption peak wavelength of the coloring agent compound to be in the above-described ranges.

In the present specification, the absorption peak wavelength of the coloring agent compound denotes the maximal absorption wavelength in the absorption spectrum measured by the following method.

A solution is prepared by dissolving 1.0 mg of a coloring agent compound which is an object to be measured in 100 ml of chloroform or 100 ml of water.

Next, the prepared solution is placed in a quartz cell (1 cm long square cell), and the absorbance of the solution in a wavelength range of 200 to 800 nm is measured using a UV-visible infrared spectrophotometer U-3150 (Shimadzu Corporation).

Next, the maximal absorption wavelength is acquired in the obtained absorption spectrum.

Specific examples of the coloring agent compound used in the present invention are shown below, but the present invention is not limited thereto.

—Compound Having Anthraquinone Structure—

A-1

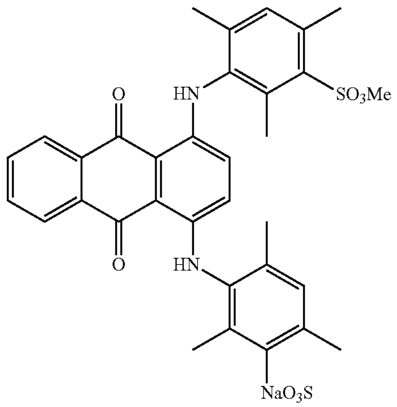

A-2

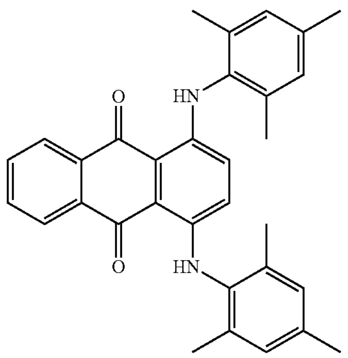

A-3

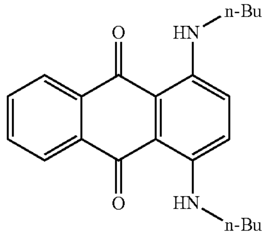

-continued
A-4
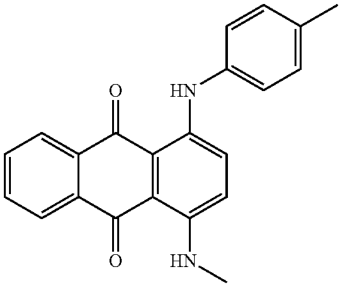
A-5
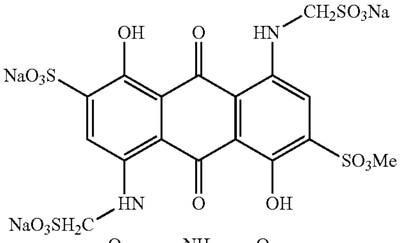
A-6
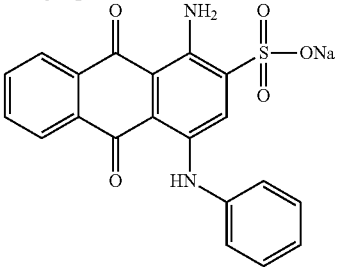
A-7
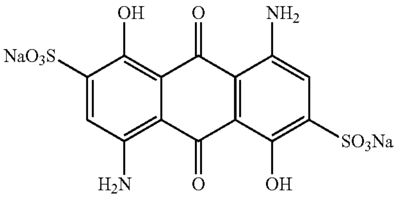
A-8
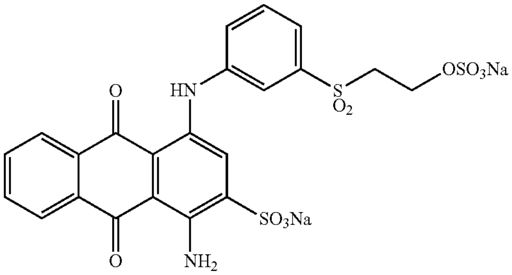
-continued
A-9
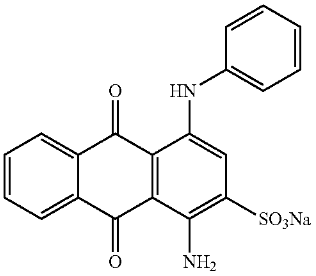
A-10
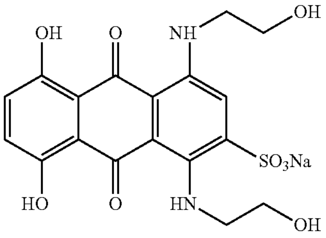
A-11
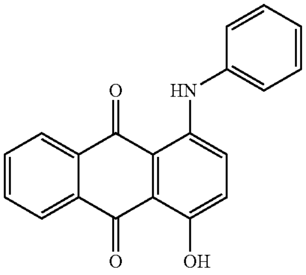
A-12
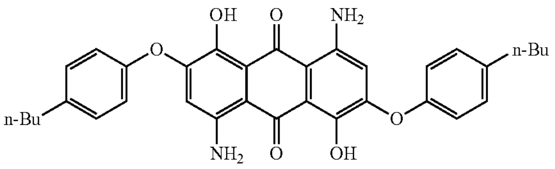
—Compound Having Azo Structure—
B-1
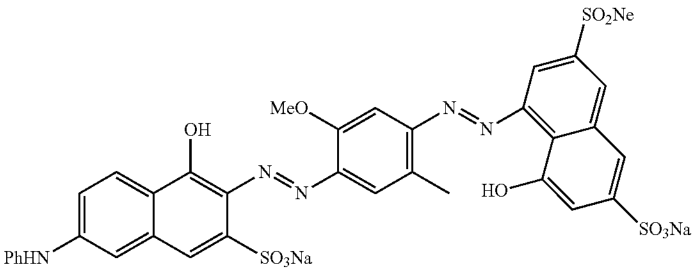

-continued
B-2
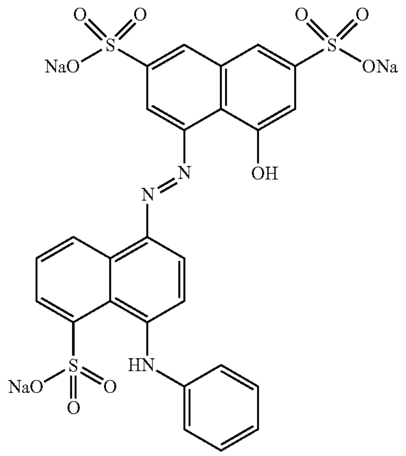
B-3
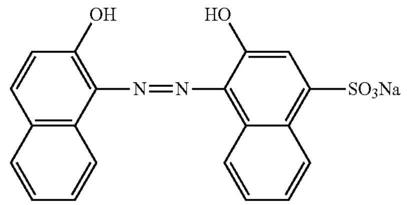
B-4
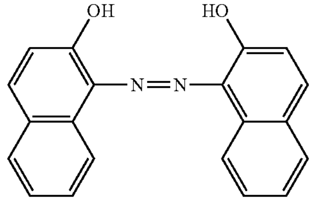
B-5
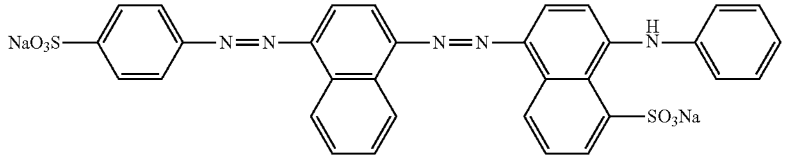
B-6
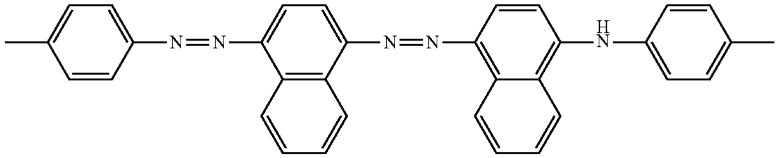
—Compound Having Triarylmethane Structure—
T-1
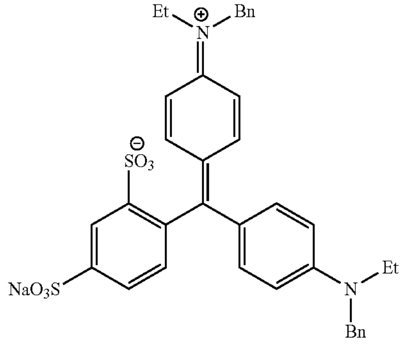
-continued
T-2
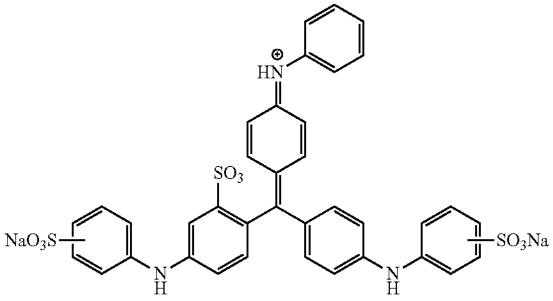

—Compound Having Oxazine Structure—

O-1

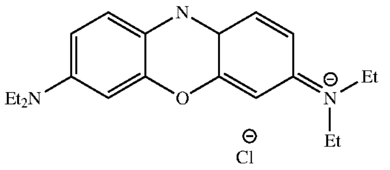

O-2

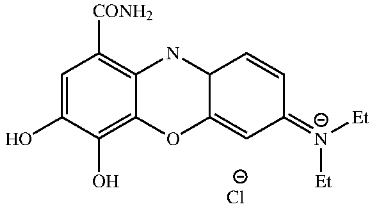

—Compound Having Phthalocyanine Structure—

PH-1

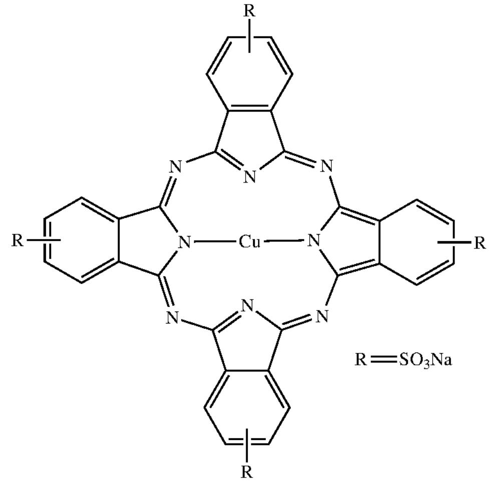

(Properties of Tint Adjusting Layer)

Further, the tint adjusting layer satisfies preferably any one of the following requirements 1 to 3, more preferably two of the following requirements 1 to 3, and still more preferably all the following requirements 1 to 3.

Requirement 1: $S_C$(420 nm)<0.1

Requirement 2: $S_C$(550 nm)<0.1

Requirement 3: $S_C$(650 nm)<0.1

In addition, $S_C$ ($\lambda$ nm) represents the alignment degree of the tint adjusting layer measured at a wavelength $\lambda$ nm. The alignment degree measured at the wavelength $\lambda$ nm is measured by the same method as the method of measuring the alignment degree of the light absorption anisotropic layer described above, and is obtained by setting the object to be measured as the tint adjusting layer.

In a case where an optical film is obtained by laminating the tint adjusting layer, the tint adjusting layer before being transferred and laminated may be provided for the measurement, the tint adjusting layer may be formed on another base material and provided for measurement, or the tint adjusting layer may be separated from the laminated optical film and provided for measurement. In the present specification, the alignment degree in a case where the tint adjusting layer separated from the laminated optical film is used as an object to be measured is described.

The tint adjusting layer satisfies any one of the above-described requirements 1 to 3, but may satisfy all the requirements 1 to 3 or two requirements selected from among the requirements 1 to 3.

Further, it is preferable that the above-described requirements satisfied by the tint adjusting layer are appropriately selected depending on the alignment degree of the dichroic substance contained in the light absorption anisotropic layer. Hereinafter, combinations of the relationship of the alignment degree of the light absorption anisotropic layer and a preferable requirement satisfied by the tint adjusting layer in a case of the relationship of the alignment degree will be described.

For example, the following "Combination 1: $S_P$ (420 nm)<$S_P$ (650 nm): Requirement 3" denotes that the light absorption anisotropic layer contains the first dichroic azo coloring agent compound and the third dichroic azo coloring agent compound and it is preferable that the tint adjusting layer satisfies the requirement 3 in a case where $S_P$ (420 nm) is less than $S_P$ (650 nm).

Combination 1: $S_P$ (420 nm)<$S_P$ (650 nm): Requirement 3

Combination 2: $S_P$ (420 nm)<$S_P$ (550 nm): Requirement 2

Combination 3: $S_P$ (550 nm)<$S_P$ (420 nm): Requirement 1

Combination 4: $S_P$ (550 nm)<$S_P$ (650 nm): Requirement 3

Combination 5: $S_P$ (650 nm)<$S_P$ (420 nm): Requirement 1

Combination 6: $S_P$ (650 nm)<$S_P$ (550 nm): Requirement 2

Among the above-described combinations, Combination 1, 2, 5, or 6 is preferable, and Combination 1 or 5 is more preferable.

In addition, it is preferable that the tint adjusting layer satisfies Expression (7).

$$0.005 \le (c(C)\times d(C))/(c(P)\times d(P)) \le 0.06 \quad \text{Expression (7)}$$

In Expression (7), c(C) represents the mass ratio of the organic coloring agent compound in the tint adjusting layer with respect to the total mass of the tint adjusting layer.

In Expression (7), d(C) represents the film thickness (m) of the tint adjusting layer.

In Expression (7), c(P) represents the mass ratio of the dichroic coloring agent compound in the light absorption anisotropic layer with respect to the total mass of the light absorption anisotropic layer.

In Expression (7), d(P) represents the film thickness (m) of the light absorption anisotropic layer.

In Expression (7), the lower limit is more preferably 0.01 or greater and the upper limit is more preferably 0.03 or less. In a case where the tint adjusting layer satisfies Expression (7), the tint as viewed in the transmittance central axis direction can be neutralized, and the transmittance in the transmittance central axis direction can be increased.

Further, in the present specification, the film thickness can be measured by cutting a cross section of an optical film obtained by using a microtome cutting machine, observing the cross section with a scanning electron microscope (SEM), and measuring the length.

The tint adjusting layer may have only the function of the tint adjusting layer or may have functions integrated with functions of other layers. That is, the light absorption anisotropic layer, the transparent base material film, the alignment film, and the barrier layer may have the function of the tint adjusting layer.

In a case where the tint adjusting layer of the optical film is a layer separate from the light absorption anisotropic layer, the position where the tint adjusting layer is laminated in the optical film is not particularly limited, but it is preferable that the tint adjusting layer is in direct contact with the light absorption anisotropic layer and is provided on the viewing side with respect to the light absorption anisotropic layer.

[Transparent Base Material Film]

The transparent base material film is not particularly limited, and examples thereof include known transparent resin films, known transparent resin plates, and known transparent resin sheets.

Examples of the transparent resin films include a cellulose acylate film (such as a cellulose triacetate film (refractive index of 1.48), a cellulose diacetate film, a cellulose acetate butyrate film, or a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyether ketone film, and a (meth)acrylonitrile film.

Among these, from the viewpoints of high transparency, a small optical birefringence, and ease of production, a cellulose acylate film that has been typically used as a protective film of a polarizing plate is preferable, and a cellulose triacetate film is more preferable.

The thickness of the transparent base material film is typically in a range of 20 μm to 100 μm.

[Alignment Film]

The optical film according to the embodiment of the present invention may have an alignment film between the transparent base material film and the light absorption anisotropic layer.

The alignment film is not particularly limited as long as the dichroic coloring agent compound can be in a desired alignment state on the alignment film. Examples of the alignment film include a film formed of a polyfunctional acrylate compound and a polyvinyl alcohol film.

Among these, a polyvinyl alcohol film is preferable. The polyvinyl alcohol used for the polyvinyl alcohol film may be modified polyvinyl alcohol.

[Barrier Layer]

The optical laminate according to the embodiment of the present invention may include a barrier layer together with the light absorption anisotropic layer.

Here, the barrier layer is also referred to as a gas barrier layer (oxygen barrier layer) and has a function of protecting the polarizer of the present invention from gas such as oxygen in the atmosphere, the moisture, or the compound contained in an adjacent layer.

In regard to the barrier layer, for example, the description in paragraphs [0014] to [0054] of JP2014-159124A, paragraphs [0042] to [0075] of JP2017-121721A, paragraphs [0045] to [0054] of JP2017-115076A, paragraphs [0010] to [0061] of JP2012-213938A, and paragraphs [0021] to [0031] of JP2005-169994A can be referred to.

[Refractive Index Adjusting Layer]

In the optical laminate according to the embodiment of the present invention, the above-described light absorption anisotropic layer contains a dichroic substance, and internal reflection due to a high refractive index of the light absorption anisotropic layer may be a problem. In that case, it is preferable that the refractive index adjusting layer is present.

The refractive index adjusting layer is a layer disposed to be in contact with the light absorption anisotropic layer, and the in-plane average refractive index at a wavelength of 550 nm is preferably 1.55 or greater and 1.70 or less. It is preferable that the refractive index adjusting layer is a refractive index adjusting layer for performing so-called index matching.

[Properties of Optical Film]

The transmittance of the optical film according to the embodiment of the present invention in the transmittance central axis direction is preferably 65% or greater, more preferably 75% or greater, and still more preferably 85% or greater. The upper limit thereof is not particularly limited and may be less than 100%.

The film thickness of the optical film according to the embodiment of the present invention is preferably in a range of 30 to 90 μm, more preferably in a range of 35 to 70 μm, and still more preferably in a range of 40 to 50 μm.

<Method of Producing Optical Film>

A known method can be used for producing the optical film according to the embodiment of the present invention without particular limitation. A known method can also be used for each step in the production without particular limitation.

Examples of a method of producing the optical film according to the embodiment of the present invention include a method including a step of coating the transparent base material film with a composition for forming an alignment film to form an alignment film, a step of coating the alignment film with the composition for forming a light absorption anisotropic layer and aligning a dichroic coloring agent compound contained in the coating film to obtain the light absorption anisotropic layer, and a step of forming the tint adjusting layer such that the tint adjusting layer and the light absorption anisotropic layer are adjacent to each other, in this order.

Hereinafter, layers that may be provided in a case of producing the optical film will be described. Specifically, a pressure sensitive adhesive layer and an adhesive layer will be described.

[Pressure Sensitive Adhesive Layer]

In the production of the optical film, a pressure sensitive adhesive layer may be provided.

It is preferable that the pressure sensitive adhesive layer in the present invention is a transparent and optically isotropic adhesive similar to that used in a typical liquid crystal display device, and a pressure sensitive type adhesive is typically used.

The pressure sensitive adhesive layer in the present invention may be blended with additives such as a crosslinking agent (such as an isocyanate-based crosslinking agent or an epoxy-based crosslinking agent), a viscosity imparting agent (such as a rosin derivative resin, a polyterpene resin, a petroleum resin, or an oil-soluble phenol resin), a plasticizer, a filler, an antiaging agent, a surfactant, an ultraviolet absorbing agent, a light stabilizer, and an antioxidant in addition to a parent material (pressure sensitive adhesive), conductive particles, and thermally expandable particles used as necessary.

The thickness of the pressure sensitive adhesive layer is typically in a range of 20 to 500 μm and preferably in a range of 20 to 250 μm. The required adhesive strength and/or rework suitability may not be obtained in a case where the thickness thereof is less than 20 μm, and the pressure sensitive adhesive may protrude or bleed out from the peripheral end portion of the image display device in a case where the thickness thereof is greater than 500 μm.

The pressure sensitive adhesive layer can be formed by an appropriate method such as a method of directly coating a support 110 for a protective member with a coating solution containing a parent material, conductive particles, and as necessary, thermally expandable particles, an additive, a solvent, and the like and pressure-bonding the support via a release liner or a method of coating an appropriate release liner (release paper or the like) with a coating solution to form a thermally expandable pressure sensitive adhesive layer, and pressure bonding and transferring (transporting) the layer onto the support 110 for a protective member.

In addition, for example, a configuration in which conductive particles are added to a configuration of a thermally-releasable pressure sensitive adhesive sheet described in JP2003-292916A can be employed as the protective member.

Further, a member in which conductive particles are sprayed on the surface of a pressure sensitive adhesive layer in commercially available products such as "REVALPHA" (manufactured by Nitto Denko Corporation) may be used as the protective member.

The method of forming the pressure sensitive adhesive layer is not particularly limited. Details will be collectively described in the method of forming an adhesive layer in the subsequent stage.

[Adhesive Layer]

In the production of the optical film, an adhesive layer may be provided. The adhesive layer denotes a layer formed of an adhesive. The adhesive exhibits adhesiveness due to drying or reaction after bonding.

Examples of the adhesive that exhibits adhesiveness by drying include a polyvinyl alcohol-based adhesive (PVA-based adhesive).

Specific examples of the curable adhesive that exhibits adhesiveness due to reaction include an active energy ray-curable adhesive such as a (meth)acrylate-based adhesive and a cationic polymerization curable adhesive. Further, the (meth)acrylate denotes acrylate and/or methacrylate.

Examples of the curable component in the (meth)acrylate-based adhesive include a compound containing a (meth) acryloyl group and a compound containing a vinyl group.

Further, as the cationic polymerization curable adhesive, a compound containing an epoxy group and/or an oxetanyl group can also be used. The compound containing an epoxy group is not particularly limited as long as the compound contains at least two epoxy groups in a molecule, and various generally known curable epoxy compounds can be used. Preferred examples of the epoxy compound include a compound (aromatic epoxy compound) containing at least two epoxy groups and at least one aromatic ring in a molecule and a compound (alicyclic epoxy compound) containing at least two epoxy groups in a molecule, in which at least one of the epoxy groups is formed between two adjacent carbon atoms constituting an alicyclic ring.

Among these, an ultraviolet curable adhesive that is cured by irradiation with ultraviolet rays is preferably used from the viewpoint of heat deformation resistance.

[Forming Method]

A method of forming the adhesive layer and/or the pressure sensitive adhesive layer will be described.

Each of the adhesive layer and/or the pressure sensitive adhesive layer may contain a compound having an ultraviolet absorbing ability, such as a salicylic acid ester-based compound, a benzophenol-based compound, a benzotriazole-based compound, a cyanoacrylate-based compound, and a nickel complex salt-based compound. In addition, the adhesive layer and/or the pressure sensitive adhesive layer may be treated by being irradiated with ultraviolet rays.

The adhesive layer and/or the pressure sensitive adhesive layer can be attached to the optical film by an appropriate method. For example, a base polymer or a polymer composition of the pressure sensitive adhesive layer or the adhesive layer is dispersed or dissolved in a solvent containing an appropriate solvent such as toluene or ethyl acetate, thereby preparing approximately 10% to 40% by mass of a pressure sensitive adhesive solution. Examples of the method include a method of casting the prepared solution and directly attaching the solution onto the film by an appropriate developing method such as coating and a method of forming a pressure sensitive adhesive layer or an adhesive layer on another base material which is not an optical film and transporting the layer.

The pressure sensitive adhesive layer and/or the adhesive layer can be formed by superimposing different kinds of layers with different compositions.

In addition, the pressure sensitive adhesive layer and/or the adhesive layer may be provided on one surface or both surfaces of the optical film. In a case where the pressure sensitive adhesive layer and/or the adhesive layer is provided on both surfaces of the optical film, the compositions, the kinds, and the thicknesses of the pressure sensitive adhesive layer and/or the adhesive layer to be provided on both surfaces of the film may be different from each other.

Further, the optical film may have a protective film, and the protective film may be subjected to a surface modification treatment for the purpose of improving the adhesiveness or the like before application of the adhesive or the pressure sensitive adhesive. Specific examples of the surface modification treatment include a corona treatment, a plasma treatment, a primer treatment, and a saponification treatment.

<Optical Laminate>

The optical laminate according to the embodiment of the present invention is an optical laminate obtained by laminating the optical film according to the embodiment of the present invention, in which the angle θ between the transmittance central axis and the film normal line is in a range of 0° to 450 and a polarizer layer in which the dichroic substance is aligned horizontally to the film surface. In this manner, the transmittance of light in an oblique direction with respect to the transmittance central axis can be decreased, and the optical laminate can be used as a privacy film or the like by decreasing the viewing angle.

The polarizer layer in which the dichroic substance is horizontally aligned is not particularly limited. For example, the polarizer may be a polarizer in which a dichroic substance is horizontally aligned by dyeing and stretching the dichroic substance on polyvinyl alcohol or another polymer resin or a polarizer in which a dichroic substance is horizontally aligned by applying alignment of a liquid crystal compound as in a case of the light absorption anisotropic layer according to the embodiment of the present invention. Among these, a polarizer in which a dichroic substance is horizontally aligned using the aligning properties of the liquid crystal compound is preferable.

The polarizer in which a dichroic substance is aligned using the aligning properties of the liquid crystal has various advantages that the thickness thereof is in a range of 0.1 to 5 m, which is extremely small, cracking is unlikely to occur during bending as described in JP2019-194685A, thermal deformation is less likely to occur, and the durability is excellent even in a case of a polarizing plate with a high transmittance of greater than 50% as described in JP6483486B.

The optical laminate according to the embodiment of the present invention can be used for applications requiring a high brightness and/or a small size and a light weight, applications for fine optical systems, applications for molding into a portion with a curved surface, and flexible application, by using the above-described advantages.

From the viewpoint of applying to molding into a portion with a curved surface and applying to flexible applications, the film thickness of the optical laminate according to the embodiment of the present invention is preferably in a range of 40 to 150 μm, more preferably in a range of 45 to 100 μm, and still more preferably in a range of 50 to 70 km.

[Optical Laminate to which Unevenness has been Imparted]

From the viewpoint of suppressing blocking caused by contact between smooth surfaces, it is preferable that surface unevenness with an arithmetic surface roughness Ra of 35 to 125 nm is imparted to the optical laminate according to the embodiment of the present invention. The arithmetic surface roughness Ra of the surface unevenness is more preferably in a range of 50 to 110 nm and still more preferably in a range of 65 to 95 nm. By setting the arithmetic surface roughness Ra to 35 nm or greater, it is possible to prevent films from being attached to each other during lamination of the optical film, and film adhesion marks are unlikely to remain. Further, the viewing angle narrowed by the optical film according to the embodiment of the present invention can be maintained by setting the arithmetic surface roughness Ra to 125 nm or less particularly in a case where the optical laminate is used as a privacy film.

The arithmetic average roughness Ra is an arithmetic average roughness in conformity with JIS B 0601: 2001. The arithmetic average roughness Ra can be measured using a stylus type surface roughness meter (for example, a surface roughness measuring machine SJ-401, manufactured by Mitutoyo Corporation). In the present specification, an arithmetic surface roughness Ra measured using a stylus type surface roughness meter (surface roughness measuring machine SJ-401, manufactured by Mitutoyo Corporation) is described.

As a method of imparting the surface roughness, the optical laminate may be bonded to other optical films having surface unevenness, a surface uneven layer may be further laminated on the optical laminate, or unevenness may be directly imparted to a barrier layer or the like which is provided on the outermost surface of the optical laminate according to the embodiment of the present invention. Examples of other optical films having surface unevenness include (A) styrene-methyl methacrylate copolymer resin particles having an average particle diameter of 1.0 to 3.0 μm and a refractive index of 1.50 to 1.54, (B) a curable compound having two or more curable groups in a molecule, (C) a smectite type clay organic composite in which a quaternary ammonium salt represented by General Formula (1R) is intercalated with smectite type clay, and (D) an antiglare film formed of a compound containing a volatile organic solvent, described in JP5909454B.

General formula (1R)

$$[(R^1)_3(R^2)N]^+ \cdot X^- \quad (1R)$$

(In the formula, $R^1$ and $R^2$ may be the same as each other, $R^1$ represents an alkyl group, alkenyl group, or alkynyl group having 4 to 24 carbon atoms, $R^2$ represents an alkyl group, alkenyl group, or alkynyl group having 1 to 10 carbon atoms, and $X^-$ represents an anion.)

The other optical films having surface unevenness may be bonded using a pressure sensitive adhesive, or the outermost layer of the optical film according to the embodiment of the present invention may be coated with only the surface uneven layer described in JP5909454B.

Further, examples of other optical films having surface unevenness include a film, which is formed of a cured substance of a curable composition containing a fluorine-based leveling agent consisting of a polymer formed of a (meth)acrylic resin containing a polymerizable group and a cellulose derivative, a curable resin precursor, and a resin containing a radical polymerizable group and a branched fluoroaliphatic hydrocarbon group and has a surface uneven layer having a phase separation structure, described in JP6093153B. The optical films may be bonded using a pressure sensitive adhesive, or the optical film according to the embodiment of the present invention may be further coated with only the surface uneven layer having a phase separation structure.

It is preferable that the above-described film with surface uneven has a low internal scattering property, and the internal haze is preferably 5% or less, more preferably 3% or less, and still more preferably 1% or less. The viewing angle narrowed by the optical film according to the embodiment of the present invention can be maintained by setting the internal haze to 5% or less particularly in a case where the optical film is used as a privacy film.

<Image Display Device>

An image display device according to the embodiment of the present invention includes the above-described optical film according to the embodiment of the present invention or the above-described optical laminate according to the embodiment of the present invention.

The display element used in the image display device according to the embodiment of the present invention is not particularly limited, and examples thereof include a liquid crystal cell, an organic electroluminescence (hereinafter, abbreviated as "EL") display panel, and a plasma display panel.

Among these, a liquid crystal cell or an organic EL display panel is preferable, and a liquid crystal cell is more preferable. That is, in the image display device according to the embodiment of the present invention, a liquid crystal display device formed of a liquid crystal cell as a display element or an organic EL display device formed of an organic EL display panel as a display element is preferable, and a liquid crystal display device is more preferable.

[Liquid Crystal Display Device]

As a liquid crystal display device which is an example of the image display device according to the embodiment of the present invention, an aspect of a liquid crystal display device including the above-described optical film according to the embodiment of the present invention and a liquid crystal cell is preferable. An aspect of a liquid crystal display device including the above-described optical laminate according to the embodiment of the present invention (here, the laminate does not include a λ/4 plate) and a liquid crystal cell is more preferable.

In the present invention, between the polarizers provided on both sides of the liquid crystal cell, it is preferable that the optical laminate according to the embodiment of the present invention is used as a front-side polarizer and more preferable that the optical laminate according to the embodiment of the present invention is used as a front-side polarizer and a rear-side polarizer.

Hereinafter, the liquid crystal cell constituting the liquid crystal display device will be described in detail.

(Liquid Crystal Cell)

It is preferable that the liquid crystal cell used for the liquid crystal display device is in a vertical alignment (VA) mode, an optically compensated bend (OCB) mode, an in-plane-switching (IPS) mode, or a twisted nematic (TN) mode, but the present invention is not limited thereto.

In the liquid crystal cell in a TN mode, rod-like liquid crystal molecules are substantially horizontally aligned at the time of no voltage application and further twistedly aligned at 600 to 120°. The liquid crystal cell in a TN mode is most likely used as a color thin film transistor (TFT) liquid crystal display device and is described in multiple documents.

In the liquid crystal cell in a VA mode, rod-like liquid crystal molecules are substantially vertically aligned at the time of no voltage application. The concept of the liquid crystal cell in a VA mode includes (1) a liquid crystal cell in a VA mode in a narrow sense where rod-like liquid crystal molecules are aligned substantially vertically at the time of no voltage application and substantially horizontally at the time of voltage application (described in JP1990-176625A (JP-H2-176625A)), (2) a liquid crystal cell (in an MVA mode) (SID97, described in Digest of tech. Papers (proceedings) 28 (1997) 845) in which the VA mode is formed to have multi-domain in order to expand the viewing angle, (3) a liquid crystal cell in a mode (n-ASM mode) in which rod-like liquid crystal molecules are substantially vertically aligned at the time of no voltage application and twistedly multi-domain aligned at the time of voltage application (described in proceedings of Japanese Liquid Crystal Conference, p. 58 to 59 (1998)), and (4) a liquid crystal cell in a SURVIVAL mode (presented at LCD International 98). Further, the liquid crystal cell in a VA mode may be of any of a patterned vertical alignment (PVA) type, a photo-alignment (optical alignment) type, or a polymer-sustained alignment (PSA) type. Details of these modes are described in JP2006-215326A and JP2008-538819A.

In the liquid crystal cell in an IPS mode, rod-like liquid crystal molecules are aligned substantially parallel to the substrate, and the liquid crystal molecules respond planarly through application of an electric field parallel to the substrate surface. In the IPS mode, black display is carried out in a state where no electric field is applied, and absorption axes of a pair of upper and lower polarizing plates are orthogonal to each other. A method of reducing leakage light during black display in an oblique direction and improve the viewing angle using an optical compensation sheet is disclosed in JP1998-54982A (JP-H10-54982A), JP1999-202323A (JP-H11-202323A), JP1997-292522A (JP-H9-292522A), JP1999-133408A (JP-H11-133408A), JP1999-305217A (JP-H11-305217A), and JP1998-307291A (JP-H10-307291A).

[Organic EL Display Device]

As an organic EL display device which is an example of the image display device according to the embodiment of the present invention, an aspect of a display device including the above-described polarizer according to the embodiment of the present invention, a λ/4 plate, and an organic EL display panel in this order from the viewing side is suitably exemplified.

An aspect of a display device including the above-described optical laminate according to the embodiment of the present invention which includes a λ/4 plate and an organic EL display panel in this order from the viewing side is more suitably exemplified. In this case, the optical laminate is formed such that a base material, an alignment film, the polarizer according to the embodiment of the present invention, a barrier layer provided as necessary, and a λ/4 plate are disposed in this order from the viewing side.

Further, the organic EL display panel is a display panel formed using an organic EL element having an organic light-emitting layer (organic electroluminescence layer) interposed between electrodes (between a cathode and an anode). The configuration of the organic EL display panel is not particularly limited, and a known configuration is employed.

[Curved Surface Image Display Device]

Examples of the curved surface image display device according to the embodiment of the present invention include those disclosed in JP2017-181821A, JP2017-181819A, JP2017-102456A, and JP2014-95901A.

EXAMPLES

Hereinafter, the present invention will be described in detail based on examples. The materials, the reagents, the amounts of materials, and the proportions of the materials, the operations, and the like shown in the following examples can be appropriately changed within a range not departing from the scope of the present invention. Therefore, the present invention is not limited to the following examples.

Example 1

[Formation of Alignment Film]

A surface of a cellulose acylate film (TAC base material having a thickness of 40 μm; TG40, FUJIFILM Corporation) was saponified with an alkaline solution and coated with the following composition 1 for forming an alignment film using a wire bar. The support on which the coating film was formed was dried with hot air at 60° C. for 60 seconds and further dried with hot air at 100° C. for 120 seconds to form an alignment film AL1, thereby obtaining a TAC film 1 with an alignment film. The film thickness of the alignment film AL1 was 1 μm.

| | |
|---|---|
| Modified polyvinyl alcohol PVA-1 shown below | 3.80 parts by mass |
| IRGACURE 2959 | 0.20 parts by mass |
| Water | 70 parts by mass |
| Methanol | 30 parts by mass |

Modified polyvinyl alcohol PVA-1

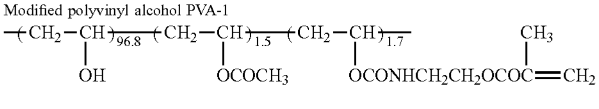

[Formation of Light Absorption Anisotropic Layer P1]

The obtained TAC film 1 with an alignment film was continuously coated with the following composition P1 for forming a light absorption anisotropic layer using a wire bar, heated at 120° C. for 60 seconds, and cooled to room temperature (23° C.).

Next, the coating layer was heated at 80° C. for 60 seconds and cooled to room temperature again.

Thereafter, the coating layer was irradiated with an LED lamp (center wavelength of 365 nm) for 2 seconds under an irradiation condition of an illuminance of 200 $mW/cm^2$, thereby preparing a light absorption anisotropic layer P1 on the alignment film AL1.

The film thickness of the light absorption anisotropic layer P1 was 3.5 m.

| | |
|---|---|
| Dichroic substance D-1 shown below | 0.63 parts by mass |
| Dichroic substance D-2 shown below | 0.17 parts by mass |
| Dichroic substance D-3 shown below | 1.13 parts by mass |
| Polymer liquid crystal compound P-1 shown below | 8.18 parts by mass |
| IRGACURE OXE-02 (manufactured by BASF SE) | 0.16 parts by mass |
| Compound E-1 shown below | 0.12 parts by mass |
| Compound E-2 shown below | 0.12 parts by mass |
| Surfactant F-1 shown below | 0.005 parts by mass |
| Cyclopentanone | 85.00 parts by mass |
| Benzyl alcohol | 4.50 parts by mass |

Dichroic substance D-1

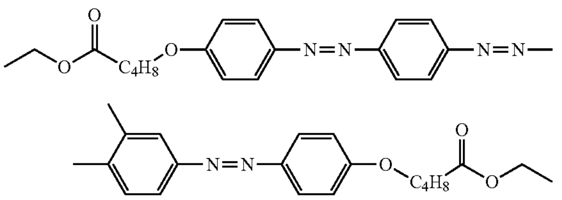

Dichroic substance D-2

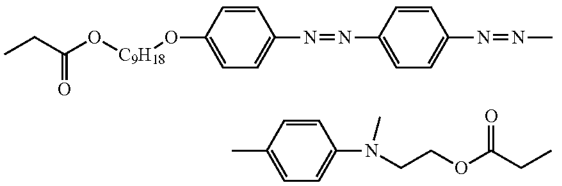

Dichroic substance D-3

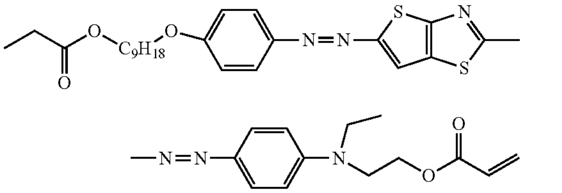

Polymer liquid crystal compound P-1

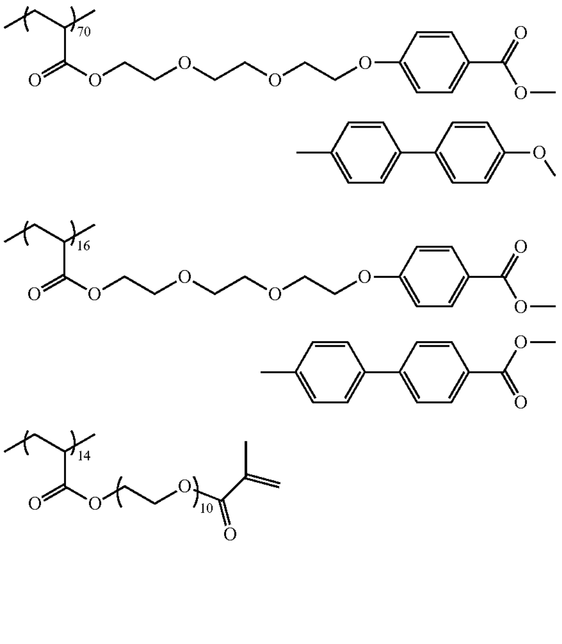

-continued

Compound E-1

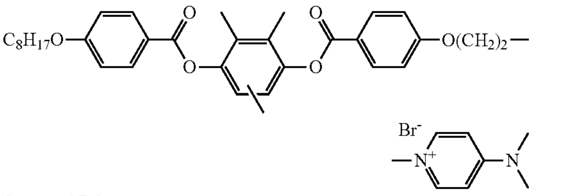

Compound E-2

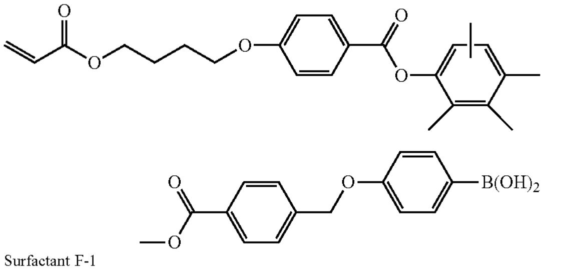

Surfactant F-1

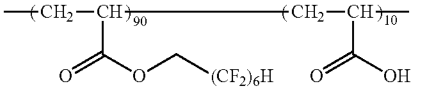

Polymer Liquid Crystal Compound P-1

[Formation of Tint Adjusting Layer C1]

The obtained light absorption anisotropic layer P1 was continuously coated with the following composition C1 for forming a tint adjusting layer using a wire bar, thereby forming a coating film.

Next, the support on which the coating film was formed was dried with hot air at 60° C. for 60 seconds and further dried with hot air at 100° C. for 120 seconds to form a tint adjusting layer C1, thereby obtaining an optical film 1. The film thickness of the tint adjusting layer was 0.5 μm.

| | |
|---|---|
| Modified polyvinyl alcohol PVA-1 shown above | 3.80 parts by mass |
| IRGACURE 2959 | 0.20 parts by mass |
| Coloring agent compound G-1 shown below | 0.08 parts by mass |
| Water | 70 parts by mass |
| Methanol | 30 parts by mass |

Coloring agent compound G-1

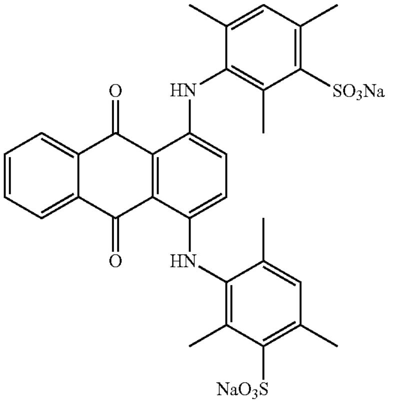

[Preparation of Optical Laminate A1]

A polarizing plate 1 in which the thickness of the polarizer was 8 m and one surface of the polarizer was exposed was prepared by the same method as that for a polarizing plate 02 with a one-surface protective film described in WO2015/166991A.

The surface of the polarizing plate 1 in which the polarizer was exposed and the surface of the light absorption anisotropic layer of the prepared optical film 1 were subjected to a corona treatment, and both surfaces were bonded to each other using the above-described PVA adhesive 1, thereby preparing an optical laminate A1.

(Preparation of PVA Adhesive 1)

20 parts by mass of methylol melamine with respect to 100 parts by mass of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7% by mass.

[Preparation of Image Display Device I1]

A Wi-Fi model iPad Air (registered trademark, manufactured by APPLE, Inc.) with a capacity of 16 GB, which is an IPS mode liquid crystal display device, was disassembled to take out the liquid crystal cell. The viewing-side polarizing plate was peeled off from the liquid crystal cell, the optical laminate A1 prepared above was bonded to the surface formed by peeling the viewing-side polarizing plate such that the polarizing plate 1 side was the liquid crystal cell side, using the following pressure sensitive adhesive sheet 1. At this time, the bonding was carried out such that the direction of the absorption axis of the polarizing plate 1 was the same as the direction of the absorption axis of the viewing-side polarizing plate bonded to the product. After the bonding, the device was assembled again, thereby preparing an image display device I1.

(Preparation of Pressure Sensitive Adhesive Sheet 1)

Next, an acrylate-based polymer was prepared according to the following procedures.

95 parts by mass of butyl acrylate and 5 parts by mass of acrylic acid were mixed and polymerized by a solution polymerization method in a reaction container equipped with a cooling pipe, a nitrogen introduction pipe, a thermometer, and a stirrer, thereby obtaining an acrylate-based polymer PL1 with an average molecular weight of 2000000 and a molecular weight distribution (Mw/Mn) of 3.0.

Next, the obtained acrylate-based polymer PL1 (100 parts by mass), coronate L (75 mass % ethyl acetate solution of trimethylolpropane adduct of tolylene isocyanate, number of isocyanate groups in one molecule: 3, manufactured by Nippon Polyurethane Industry Co., Ltd.) (1.0 parts by mass), and a silane coupling agent KBM-403 (manufactured by Shin-Etsu Chemical Co., Ltd.) (0.2 parts by mass) were mixed with each other, and ethyl acetate was finally added to the mixture such that the concentration of the total solid contents reached 10% by mass, thereby preparing a composition for forming a pressure sensitive adhesive. A separate film subjected to a surface treatment with a silicone-based release agent was coated with the composition using a die coater and dried in an environment of 90° C. for 1 minute, thereby obtaining an acrylate-based pressure sensitive adhesive sheet. The film thickness of the pressure sensitive adhesive sheet was 25 m, and the storage modulus was 0.1 MPa.

Example 2

An optical film 2 of Example 2 was prepared in the same manner as in Example 1 except that the composition C1 for forming a tint adjusting layer was changed to the following composition C2 for forming a tint adjusting layer in the optical film 1 of Example 1.

| | |
|---|---|
| Modified polyvinyl alcohol PVA-1 shown above | 3.80 parts by mass |
| IRGACURE 2959 | 0.20 parts by mass |
| Coloring agent compound G-2 shown below | 0.01 parts by mass |
| Water | 70 parts by mass |
| Methanol | 30 parts by mass |

Coloring agent compound G-2

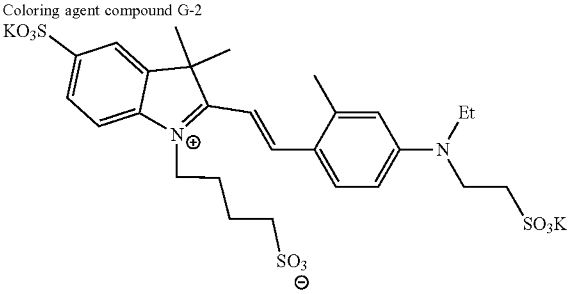

Example 3

An optical film 3 was prepared in the same manner as in Example 1 except that the composition P2 for forming a light absorption anisotropic layer in which the dichroic substance D-3 was changed to the dichroic substance D-4 was used in place of the composition P1 for forming a light absorption anisotropic layer of Example 1.

Coloring agent compound D-4

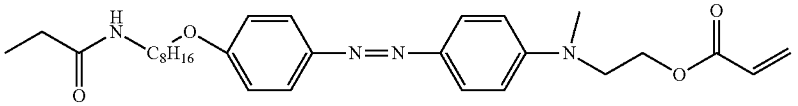

Example 4

An optical film 4 was prepared in the same manner as in Example 1 except that the composition P3 for forming a light absorption anisotropic layer was used in place of the composition P1 for forming a light absorption anisotropic layer of Example 1.

| | |
|---|---|
| Dichroic substance D-1 shown above | 0.63 parts by mass |
| Dichroic substance D-2 shown above | 0.17 parts by mass |
| Dichroic substance D-5 shown below | 1.13 parts by mass |
| Liquid crystal compound L-1 shown below | 5.45 parts by mass |
| Liquid crystal compound L-2 shown below | 2.72 parts by mass |
| IRGACURE OXE-02 (manufactured by BASF SE) | 0.16 parts by mass |
| Compound E-1 shown above | 0.12 parts by mass |
| Compound E-2 shown above | 0.12 parts by mass |
| Surfactant F-1 shown above | 0.005 parts by mass |
| Cyclopentanone | 85.00 parts by mass |
| Benzyl alcohol | 4.50 parts by mass |

-continued

Dichroic substance D-5

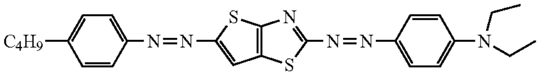

Liquid crystal compound L-1

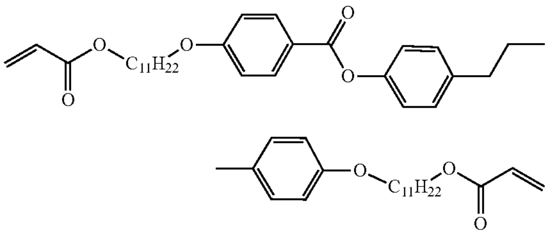

Liquid crystal compound L-1

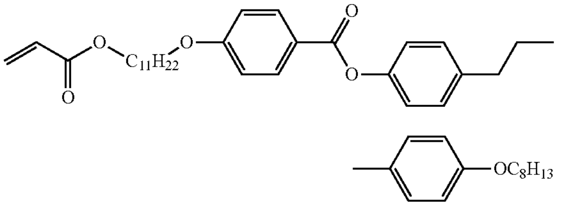

Example 5

An optical film 5 was prepared in the same manner as in Example 1 except that the composition C1 for forming a tint adjusting layer was changed to the composition C3 for forming a tint adjusting layer in the optical film 1 of Example 1.

| | |
|---|---|
| Modified polyvinyl alcohol PVA-1 shown above | 3.80 parts by mass |
| IRGACURE 2959 | 0.20 parts by mass |
| Coloring agent compound G-3 shown below | 0.16 parts by mass |
| Water | 70 parts by mass |
| Methanol | 30 parts by mass |

Coloring agent compound G-3

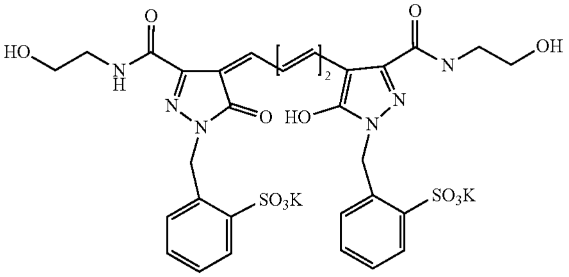

Comparative Example 1

An optical film 6 was prepared in the same manner as in Example 1 except that the tint adjusting layer was not provided in the optical film 1 of Example 1.

Comparative Example 2

An optical film 7 was prepared in the same manner as in Comparative Example 1 except that the composition for forming a light absorption anisotropic layer was changed to the following P4 in the optical film 6 of Comparative Example 1.

| | |
|---|---|
| Dichroic substance D-1 shown above | 0.75 parts by mass |
| Dichroic substance D-2 shown above | 0.34 parts by mass |
| Dichroic substance D-3 shown above | 1.13 parts by mass |
| Polymer liquid crystal compound P-1 shown above | 7.88 parts by mass |
| IRGACURE OXE-02 (manufactured by BASF SE) | 0.16 parts by mass |
| Compound E-1 shown above | 0.12 parts by mass |
| Compound E-2 shown above | 0.12 parts by mass |
| Surfactant F-1 shown above | 0.005 parts by mass |
| Cyclopentanone | 85.00 parts by mass |
| Benzyl alcohol | 4.50 parts by mass |

Comparative Example 3

An optical film 8 was prepared in the same manner as in Example 3 except that the tint adjusting layer was not provided in the optical film 3 of Example 3.

Example 6

[Formation of Photo-Alignment Layer]

A TAC film 1 with an alignment film was prepared in the same manner as in Example 1, and the alignment film AL1 was coated with the following composition liquid E1 for forming a photo-alignment layer and dried at 60° C. for 2 minutes. Thereafter, the obtained coating film was irradiated with ultraviolet rays (irradiation amount: 2000 $mJ/cm^2$) in a direction of a polar angle of 15° with reference to the film normal direction as a reference using an ultraviolet exposure device, thereby preparing a photo-alignment layer E1 having a thickness of 0.03 m.

[Preparation of Composition Liquid E1 for Forming Photo-Alignment Layer]

A composition liquid E1 for forming a photo-alignment layer was prepared with the following composition, dissolved for 1 hour while being stirred, and filtered through 0.45 m filter after the dissolution, thereby obtaining a composition liquid E1 for forming a photo-alignment layer.

| | |
|---|---|
| Photo-alignment material E-3 shown below | 0.3 parts by mass |
| 2-Butoxyethanol | 41.6 parts by mass |
| Dipropylene glycol monomethyl ether | 41.6 parts by mass |
| Pure water | 16.5 parts by mass |

Photo-alignment material E-3

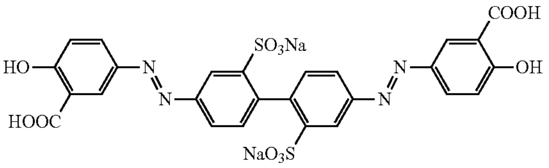

[Formation of Light Absorption Anisotropic Layer P9]

The obtained photo-alignment layer E1 was continuously coated with the composition P1 for forming a light absorption anisotropic layer using a wire bar, heated at 120° C. for 60 seconds, and cooled to room temperature (23° C.).

Next, the coating layer was heated at 80° C. for 60 seconds and cooled to room temperature again.

Thereafter, the coating layer was irradiated with an LED lamp (center wavelength of 365 nm) for 2 seconds under an irradiation condition of an illuminance of 200 $mW/cm^2$, thereby preparing a light absorption anisotropic layer P9 on the alignment film AL1.

The film thickness of the light absorption anisotropic layer P9 was 3.5 m. The angle between the transmittance central axis of the light absorption anisotropic layer P9 and the film normal line was 15 degrees.

[Formation of Tint Adjusting Layer C9]

An optical film 9 was obtained in the same manner as in Example 1 by coating the obtained light absorption anisotropic layer P9 with the composition C1 for forming a tint adjusting layer.

Examples 7 to 10

Each of optical films 10 to 13 was prepared in the same manner as in Example 1 except that the film thickness d(C) of the tint adjusting layer was changed and the value represented by (c(C)×d(C))/(c(P)×d(P)) in Expression (7) was adjusted to the value listed in Table 2 in the optical film 1 of Example 1.

Example 11

An optical film 14 of Example 11 was prepared in the same manner as in Example 1 except that the light absorption anisotropic layer P1 was formed, an alignment film was formed in the same manner as that for the alignment film AL1 using the composition 1 for forming an alignment film again, and the composition C1 for forming a tint adjusting layer was changed to the composition C4 for forming a tint adjusting layer in the optical film 1 of Example 1.

| | |
|---|---|
| Dichroic substance D-3 shown above | 1.13 parts by mass |
| Polymer liquid crystal compound P-1 shown above | 9.22 parts by mass |
| IRGACURE OXE-02 (manufactured by BASF SE) | 0.16 parts by mass |
| Surfactant F-1 | 0.005 parts by mass |
| Cyclopentanone | 85.00 parts by mass |
| Benzyl alcohol | 4.50 parts by mass |

<Evaluation>

[Evaluation of Alignment Degree]

(Light Absorption Anisotropic Layer)

The alignment degree of the obtained light absorption anisotropic layer at a wavelength of 550 nm was calculated by the following method.

In the measurement, the Mueller matrix at a wavelength of 550 nm at each polar angle was measured while the polar angle which was the angle with respect to the normal direction of the light absorption anisotropic layer was changed for every 5° from 0° to 900 using AxoScan OPMF-1 (manufactured by Opto Science, Inc.), and the minimum transmittance (Tmin) was derived. Next, after removal of the influence of surface reflection, Tmin at a polar angle at which Tmin is highest is defined as Tm (0), and Tmin in a direction in which the polar angle is further increased by 400 from the polar angle at which Tmin is highest is defined as Tm (40). The absorbance (A) was calculated by the following equation based on the obtained Tm (0) and Tm (40), and A (0) and A (40) were calculated.

$$A = -\log(Tm)$$

Here, Tm represents the transmittance and A represents the absorbance.

An alignment degree $S_P$ at a wavelength of 550 nm which was defined by the following equation was calculated based on the calculated A (0) and A (40).

$$S = (4.6 \times A(40) - A(0))/(4.6 \times A(40) + 2 \times A(0))$$

By changing the wavelength from 550 nm to 420 nm or 650 nm, the alignment degrees SP at wavelengths of 420 nm and 650 nm were calculated.

(Tint Adjusting Layer)

Only the tint adjusting layer was transferred from the obtained optical film to a cellulose acylate film (TAC base material having thickness of 40 μm; TG40; FUJIFILM Corporation) via a pressure sensitive adhesive. The alignment degree $S_C$ of the tint adjusting layer was acquired in the same manner as that of the light absorption anisotropic layer using this transferred film.

[Evaluation of Transmittance and Tint]

In the prepared image display device I1, a brightness Y (0) A1 of the transmittance central axis of a white display screen, a brightness Y (30) A1 in a direction deviated by 30° (oblique direction) from the transmittance central axis in the plane with the transmittance central axis and the film normal line, a tint a* (0) A1 of the transmittance central axis, b* (0) A1, a tint a* (30) A1 in a direction deviated by 30° from the transmittance central axis in the plane with the transmittance central axis and the film normal line, and b* (30) A1 were measured using a measuring machine (EZ-Contrast XL88, manufactured by ELDIM).

Further, an image display device B was prepared in the same manner as in Example 1 except that the optical laminate without the light absorption anisotropic layer was bonded to the liquid crystal cell in the preparation of the image display device I1, and a brightness Y (0) B at a polar angle of 0° (front direction) on the white display screen was measured in the same manner as described above. A front transmittance T (0) was acquired by comparing with the brightness of the image display device B that did not have the light absorption anisotropic layer.

Specifically, the front transmittance T (0) was calculated using the following equation.

$$T(0) = Y(0)A1/Y(0)B$$

The transmittance and the tint were respectively evaluated according to the following evaluation standards.

(Evaluation Standard for Transmittance)

A: T (0) was 75% or greater

B: T (0) was 65% or greater and less than 75%

C: T (0) was less than 65%

(Evaluation Standard for Tint)

A: |a* (0)| was less than 3

B: |a* (0)| was 3 or greater and less than 5.

C: |a* (0)| was 5 or greater

Further, b* (0), a* (30), and b* (30) were also evaluated in the same manner as described above.

Further, the image display devices prepared by replacing the optical film 1 with the optical films 2 to 8 were respectively defined as 12 to 18, and the transmittance and the tint were evaluated by the same methods as described above.

The evaluation results are listed in Table 1.

In Table 1, "polar angle" denotes an angle of the transmittance central axis of the optical film with respect to the normal direction of the optical film.

In Table 1, the notation "A" in the columns of "alignment degree" denotes that all the alignment degrees $S_C$ of the tint adjusting layer measured at 450 nm, 550 nm, and 650 nm using the above-described method were less than 0.1. That is, the notation "A" in the columns of "alignment degree" denotes that all the above-described requirements 1 to 3 were satisfied. Further, in Table 1, the notation "B" in the columns of "alignment degree of tint adjusting layer" denotes that any of the alignment degree $S_C$ of the tint adjusting layer measured at 450 nm, 550 nm, or 650 nm was 0.1 or greater.

In Table 1, "$S_P$ (450)", "$S_P$ (550)", and "$S_P$ (650)" each represent the alignment degree of the optical film measured at 450 nm, 550 nm, and 650 nm.

In Table 1, the notation "A" in the columns of "$S_P$ (450)<$S_P$ (550)" and "$S_P$ (450)<$S_P$ (650)" denotes that each inequality was established, and the notation "B" denotes that each inequality was not established. Further, "$S_P$ (450)<$S_P$ (550)" and "$S_P$ (450)<$S_P$ (650)" respectively correspond to Expression (1) and Expression (2).

Table 2 shows the results of evaluation of Formula (7) and the tint of Examples 1 and 7 to 10 and Comparative Example 1.

The alignment degree of the tint adjusting layer was 0 regardless of whether it was measured at 420 nm, 550 nm, or 650 nm.

In Table 2, the notation of "(c(C)×d(C))/(c(P)×d(P))" is a value corresponding to Formula (7).

TABLE 2

| | (c(C) × d(C))/(c(P) × d(P)) | Tint a* (0) | Tint b* (0) | Tint a* (30) | Tint b* (30) | Transmittance T (0) |
|---|---|---|---|---|---|---|
| Comparative example 1 | 0 | A | C | A | A | A |
| Example 7 | 0.003 | A | B | A | A | A |
| Example 8 | 0.006 | A | A | A | A | A |
| Example 1 | 0.015 | A | A | A | A | A |
| Example 9 | 0.055 | A | A | A | A | B |
| Example 10 | 0.07 | B | B | A | B | C |

TABLE 1

| | Optically anisotropic layer Dichroic substance | | | Tint adjusting layer Coloring agent compound | Tint adjusting layer Absorption peak wavelength (nm) | Tint adjusting layer Alignment degree | Tint a* (0) | Tint b* (0) | Tint a* (30) | Tint b* (30) | Transmittance T (0) | Polar angle θ (°) | $S_P$ (450) < $S_P$ (550) | $S_P$ (450) < $S_P$ (650) |
|---|---|---|---|---|---|---|---|---|---|---|---|---|---|---|
| Example 1 | D-1 | D-2 | D-3 | G-1 | 630 | A | A | A | A | A | A | 0 | A | A |
| Example 2 | D-1 | D-2 | D-3 | G-2 | 580 | A | A | A | A | A | A | 0 | A | A |
| Example 3 | D-1 | D-2 | D-4 | G-1 | 630 | A | A | A | A | A | B | 0 | B | B |
| Example 4 | D-1 | D-2 | D-5 | G-1 | 630 | A | A | A | A | A | B | 0 | A | A |
| Example 5 | D-1 | D-2 | D-3 | G-3 | 670 | A | B | A | B | A | A | 0 | A | A |
| Comparative example 1 | D-1 | D-2 | D-3 | None | — | — | A | C | A | A | A | 0 | A | A |
| Comparative example 2 | D-1 | D-2 | D-3 | None | — | — | A | C | C | A | A | 0 | A | A |
| Comparative example 3 | D-I | D-2 | D-4 | None | — | — | B | B | B | B | B | 0 | B | B |
| Example 6 | D-1 | D-2 | D-3 | G-1 | 630 | A | A | A | A | A | A | 15 | A | A |
| Example 11 | D-1 | D-2 | D-3 | D-3 | 590 | B | A | A | A | B | A | 0 | A | A |

As listed in Table 1, it was confirmed that the optical film of each example had an excellent property of suppressing a wide-angle tint based on the comparison between the results of the examples and the comparative examples.

As listed in Table 1, it was confirmed that the optical film had a more excellent transmittance in a case where the light absorption anisotropic layer satisfied Expressions (1) and (2) based on the comparison between the results of the examples.

As listed Table 1, it was confirmed that the optical film had a more excellent transmittance in a case where at least one of the dichroic coloring agent compounds contained in the light absorption anisotropic layer was a dichroic coloring agent compound represented by Formula (3).

As listed in Table 1, it was confirmed that the optical film had a more excellent property of suppressing a wide-angle tint in a case where the tint adjusting layer satisfied the above-described requirements 1 to 3.

As listed in Table 1, it was confirmed that the optical film had a more excellent property of suppressing a wide-angle tint in a case where the absorption peak wavelength of the organic coloring agent compound contained in the tint adjusting layer was in a range of 500 to 650 nm.

As listed in Table 2, it was confirmed that the optical film had a more excellent property of suppressing a wide-angle tint in a case where the optical film satisfied Formula (7).

(Confirmation of Appropriateness for Curved Surface Processing)

[Appropriateness of Curved Surface Processing]

The optical laminate A1 prepared in Example 1 was bonded to the display screen of a smartphone (Galaxy Note 9, manufactured by Samsung Electronics Co., Ltd.) having a curved surface such that the optical film 1 was on the side of the display screen using a commercially available pressure sensitive adhesive SK2057 (manufactured by Soken Chemical & Engineering Co., Ltd.). The optical laminate A1 had a film thickness of 100 μm or less and had high flexibility and thus could be finely bonded to the display screen without entrance of bubbles even in the curved surface portion of the display screen.

Subsequently, a louver-type optical film (3M (registered trademark) security/privacy filter PF12 H2 Series) having the same performance as the optical film according to the embodiment of the present invention and widely used in the market was bonded onto the display screen of the smartphone using a commercially available pressure sensitive adhesive SK2057 (manufactured by Soken Chemical & Engineering Co., Ltd.). Since the louver-type optical film had a film thickness of 500 μm and had low flexibility, bubbles entered the curved surface portion of the display screen, and thus the optical film could not be cleanly bonded to the display screen.

[Evaluation of Pattern Forming Product]

A light absorption anisotropic layer having a pattern of the region A and the region B was prepared as follows and evaluated.

(Formation of Patterned Light Absorption Anisotropic Layer)

The alignment film AL1 of Example 1 was continuously coated with the above-described composition P1 for forming a light absorption anisotropic layer using a wire bar, thereby forming a coating layer P1.

Next, the coating layer P1 was heated at 140° C. for 30 seconds, and the coating layer P1 was cooled to room temperature (23° C.).

Next, the coating layer was heated at 80° C. for 60 seconds and cooled to room temperature again.

Thereafter, the obtained coating layer was irradiated with light emitted by a high-pressure mercury lamp under an irradiation condition of an illuminance of 28 $mW/cm^2$ for 60 seconds via a mask, thereby preparing a light absorption anisotropic layer having a cured region and an uncured region of a liquid crystal compound in the plane of the alignment film AL1. Further, a mask pattern having a light shielding portion (region B) and a light transmitting portion with a rectangular light transmitting portion having a length of 10 mm and a width of 50 mm as the region A was used as the mask.

The prepared film having a polarizing layer having a cured region (region A) and an uncured region (region B) of the liquid crystal compound in the plane was immersed in ethanol for 3 minutes, and the non-polymerized liquid crystal compound was washed and removed, thereby forming a patterned optical film 10 having a patterned light absorption anisotropic layer with the region A and the region B having different degrees of polarization in the plane. In the region A, the polar angle 30° transmittance was 10% or less, and the front transmittance was 80% or greater. In the region B, both the polar angle 30° transmittance and the front transmittance were 80% or greater.

—Preparation of Optical Laminate A10—

The surface of the polarizing plate 1 on which the polarizer was exposed and the surface of the light absorption anisotropic layer of the prepared patterned optical film 10 were bonded together using the pressure sensitive adhesive sheet 1, thereby preparing an optical laminate A10.

—Preparation of Image Display Device I10—

The optical laminate A1 was changed to the optical laminate A10 to prepare an image display device I10 in the same manner as that for the image display device I1. Only a portion of the region A had a narrow viewing angle and was clearly visually recognized only from the front.

[Evaluation of Products to which Surface Unevenness was Imparted]

The above-described optical laminate to which surface unevenness was imparted was prepared as follows and evaluated.

(Preparation of Image Display Device I11)

In order to impart surface unevenness with an Ra of 90 nm, the film with surface unevenness described in Example 3 of JP6093153B was bonded to the surface of the polarizing plate 1 on which the polarizer was exposed, using the pressure sensitive adhesive sheet 1, thereby preparing an optical laminate A11.

The optical laminate A1 was changed to the optical laminate A11 to prepare an image display device I11 in the same manner as that for the image display device I1.

(Preparation of Image Display Device I12)

In order to impart surface unevenness with an Ra of 50 nm, the film with surface unevenness described in Example 101 of JP5909454B was bonded to the surface of the polarizing plate 1 on which the polarizer was exposed, using the pressure sensitive adhesive sheet 1, thereby preparing an optical laminate A12.

The optical laminate A1 was changed to the optical laminate A12 to prepare an image display device I12 in the same manner as that for the image display device I1.

(Preparation of Image Display Device I13)

In order to impart surface unevenness with an Ra of 130 nm, the film with surface unevenness described in Example 7 of JP6093153B was bonded to the surface of the polarizing plate 1 on which the polarizer was exposed, using the pressure sensitive adhesive sheet 1, thereby preparing an optical laminate A13.

The optical laminate A1 was changed to the optical laminate A13 to prepare an image display device I13 in the same manner as that for the image display device I1.

(Evaluation: Blocking Resistance)

In each of the optical laminates of the examples, the bonding properties in a case where the outermost surfaces of the optical laminates were bonded to each other were evaluated according to the following evaluation standards. The bonded optical laminate is the optical laminates of the same example. For example, the optical laminate A1 was formed by bonding two sheets of the optical laminates A1. In this manner, since the evaluation was performed by bonding the optical laminates of the same example, the blocking resistance of the optical laminate was more accurately evaluated without being affected by the physical properties of other surfaces to be bonded, as compared with a case where the blocking resistance was evaluated by bonding the optical laminate with a different surface.

The blocking resistance was evaluated according to the following evaluation standards.

—Evaluation Standard for Blocking Resistance—

A: There was no sticky feeling at all.

B: There was almost no sticky feeling.

C: Sticky feeling was strong.

(Evaluation: Narrow Viewing Angle Property)

The narrow viewing angle property of each of the image display devices of the examples in a case where the image display device was visually recognized from the front and a case where the image display device was visually recognized with an inclination of 20 degrees in the lateral direction was evaluated according to the following evaluation standards.

—Evaluation Standard for Narrow Viewing Angle Property—

A: There was a clear difference in visibility between the front direction and the oblique direction.

B: There was a difference in visibility between the front direction and the oblique direction.

C: The visual recognition was made even in the oblique direction.

The evaluation results of the blocking resistances of the optical laminates A1, A11, A12, and A13 and the narrow viewing angle properties of the image display devices I1, I11, I12, and I13 are listed in Table 3 as Examples 1, 11, 12, and 13.

TABLE 3

| | | Ra (nm) | Blocking resistance | Narrow viewing angle property |
|---|---|---|---|---|
| Example 1 | Optical laminate A1 | 2 | C | A |
| Example 11 | Optical laminate A11 | 90 | A | A |
| Example 12 | Optical laminate A12 | 50 | B | A |
| Example 13 | Optical laminate A13 | 130 | A | B |

As listed in Table 3, it was confirmed that in a case where the arithmetic surface roughness Ra of the surface unevenness of the optical laminate according to the embodiment of the present invention was 50 nm or greater, the blocking resistance in a case where the films were laminated was excellent. In addition, it was confirmed that in a case where the arithmetic surface roughness Ra of the surface unevenness was less than 130 nm, the narrow viewing angle property was more excellent.

What is claimed is:

1. An optical film comprising:

a light absorption anisotropic layer in which an angle θ between a transmittance central axis and a normal direction of a layer surface is in a range of 0° to 45°; and a tint adjusting layer containing at least one organic coloring agent compound, wherein the light absorption anisotropic layer contains a liquid crystal compound and at least one dichroic coloring agent compound, the transmittance central axis is the direction in which the highest transmittance is exhibited in a case where the transmittance is measured by changing the inclination angle and the inclination direction with respect to the normal direction of the surface of the light absorption anisotropic layer, and Expression (7) is satisfied, $$0.005 \leq (c(C)\times d(C))/(c(p)\times d(P)) \leq 0.06 \qquad \text{Expression (7)}$$

in Expression (7), c(C) represents a mass ratio of the organic coloring agent compound in the tint adjusting layer with respect to a total mass of the tint adjusting layer, in Expression (7), d(C) represents a film thickness (μm) of the tint adjusting layer, in Expression (7), c (P) represents a mass ratio of the dichroic coloring agent compound in the light absorption anisotropic layer with respect to a total mass of the light absorption anisotropic layer, and in Expression (7), d (P) represents a film thickness (μm) of the light absorption anisotropic layer.

2. The optical film according to claim 1, wherein the light absorption anisotropic layer satisfies both Expressions (1) and (2), $$S_P(420\text{ nm}) < S_P(550\text{ nm}) \qquad \text{Expression (1)}$$

$$S_P(420\text{ nm}) < S_P(650\text{ nm}) \qquad \text{Expression (2)}$$

where $S_P$ (λ nm) represents an alignment degree of the light absorption anisotropic layer, which is measured at a wavelength of 2 nm.

3. The optical film according to claim 1, wherein at least one dichroic coloring agent compound contained in the light absorption anisotropic layer is represented by Formula (3), (3)

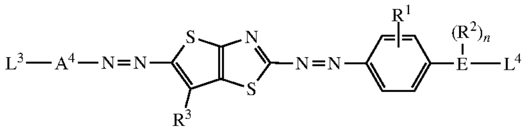

in Formula (3), $A^4$ represents a divalent aromatic group which may have a substituent, in Formula (3), $L^3$ and $L^4$ each independently represent a substituent, in Formula (3), E represents any of a nitrogen atom, an oxygen atom, or a sulfur atom, in Formula (3), $R^1$ represents a hydrogen atom, a halogen atom, an alkyl group which may have a substituent, or an alkoxy group which may have a substituent, in Formula (3), $R^2$ represents a hydrogen atom or an alkyl group which may have a substituent, in Formula (3), $R^3$ represents a hydrogen atom or a substituent, and in Formula (3), n represents 0 or 1, where n is 1 in a case where E represents a nitrogen atom, and n is 0 in a case where E represents an oxygen atom or a sulfur atom.

4. The optical film according to claim 1, wherein the tint adjusting layer satisfies any one of the following requirements 1 to 3, Requirement 1: $S_C$ (420 nm)<0.1

Requirement 2: $S_C$ (550 nm)<0.1

Requirement 3: $S_C$ (650 nm)<0.1 where $S_C$ (λ nm) represents an alignment degree of the tint adjusting layer, which is measured at a wavelength of λ nm.

5. The optical film according to claim 1, wherein an absorption peak wavelength of the organic coloring agent compound contained in the tint adjusting layer is in a range of 500 to 650 nm.

6. The optical film according to claim 1, wherein the organic coloring agent compound contained in the tint adjusting layer has at least one structure of a benzene ring or a heterocyclic ring in a molecule.

7. The optical film according to claim 1, wherein the organic coloring agent compound contained in the tint adjusting layer has an anthraquinone structure.

8. The optical film according to claim 1, wherein a transmittance of light having a wavelength of 550 nm in a direction along the transmittance central axis is 65% or greater.

9. An optical laminate comprising:

the optical film according to claim 1; and a polarizer layer in which a dichroic substance is aligned horizontally to a film surface.

10. An optical laminate comprising:

the optical film according to claim 1; and an uneven layer having an arithmetic average roughness Ra of 35 to 125 nm.

11. An image display device comprising:

the optical film according to claim 1.

12. An image display device comprising:

the optical laminate according to claim 9.

13. An optical film comprising:

a light absorption anisotropic layer in which an angle θ between a transmittance central axis and a normal direction of a layer surface is in a range of 0° to 45°; and a tint adjusting layer containing at least one organic coloring agent compound, wherein the light absorption anisotropic layer contains a liquid crystal compound and at least one dichroic coloring agent compound, the transmittance central axis is the direction in which the highest transmittance is exhibited in a case where the transmittance is measured by changing the inclination angle and the inclination direction with respect to the normal direction of the surface of the light absorption anisotropic layer, and a transmittance of light having a wavelength of 550 nm in a direction along the transmittance central axis is 65% or greater.

14. The optical film according to claim 13, wherein the light absorption anisotropic layer satisfies both Expressions (1) and (2), $$S_P(420\text{ nm}) < S_P(550\text{ nm}) \quad \text{Expression (1)}$$

$$S_P(420\text{ nm}) < S_P(650\text{ nm}) \quad \text{Expression (2)}$$

where $S_P$ (λ nm) represents an alignment degree of the light absorption anisotropic layer, which is measured at a wavelength of λ nm.

15. The optical film according to claim 13, wherein at least one dichroic coloring agent compound contained in the light absorption anisotropic layer is represented by Formula (3), (3)

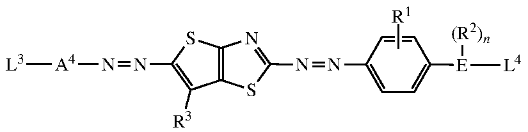

in Formula (3), $A^4$ represents a divalent aromatic group which may have a substituent, in Formula (3), $L^3$ and $L^4$ each independently represent a substituent, in Formula (3), E represents any of a nitrogen atom, an oxygen atom, or a sulfur atom, in Formula (3), $R^1$ represents a hydrogen atom, a halogen atom, an alkyl group which may have a substituent, or an alkoxy group which may have a substituent, in Formula (3), $R^2$ represents a hydrogen atom or an alkyl group which may have a substituent, in Formula (3), $R^3$ represents a hydrogen atom or a substituent, and in Formula (3), n represents 0 or 1, where n is 1 in a case where E represents a nitrogen atom, and n is 0 in a case where E represents an oxygen atom or a sulfur atom.

16. The optical film according to claim 13, wherein the tint adjusting layer satisfies any one of the following requirements 1 to 3, Requirement 1: $S_C$ (420 nm)<0.1

Requirement 2: $S_C$ (550 nm)<0.1

Requirement 3: $S_C$ (650 nm)<0.1 where $S_C$ (λ nm) represents an alignment degree of the tint adjusting layer, which is measured at a wavelength of λ nm.

17. The optical film according to claim 13, wherein an absorption peak wavelength of the organic coloring agent compound contained in the tint adjusting layer is in a range of 500 to 650 nm.

18. The optical film according to claim 13, wherein the organic coloring agent compound contained in the tint adjusting layer has at least one structure of a benzene ring or a heterocyclic ring in a molecule.

19. The optical film according to claim 13, wherein the organic coloring agent compound contained in the tint adjusting layer has an anthraquinone structure.

* * * * *